United States Patent
Bosque-Pardos et al.

(10) Patent No.: US 12,441,693 B2
(45) Date of Patent: Oct. 14, 2025

(54) TARGETING STAT SUMOYLATION TO ENHANCE IMMUNE RESPONSES

(71) Applicants: THE GEORGE WASHINGTON UNIVERSITY, Washington, DC (US); University of Utah Research Foundation, Salt Lake City, UT (US)

(72) Inventors: Alberto Bosque-Pardos, Washington, DC (US); Amanda Beatriz Rodrigues Barreto De Macedo, Washington, DC (US); Eric S. Sorensen, Washington, DC (US); Vicente Planelles, Salt Lake City, UT (US)

(73) Assignees: The George Washington University, Washington, DC (US); University of Utah Research Foundation, Salt Lake City, UT (US)

(*) Notice: Subject to any disclaimer, the term of this patent is extended or adjusted under 35 U.S.C. 154(b) by 1187 days.

(21) Appl. No.: 17/125,900

(22) Filed: Dec. 17, 2020

(65) Prior Publication Data

US 2021/0114999 A1 Apr. 22, 2021

Related U.S. Application Data

(63) Continuation of application No. PCT/US2019/039336, filed on Jun. 26, 2019.

(60) Provisional application No. 62/799,524, filed on Jan. 31, 2019, provisional application No. 62/690,629, filed on Jun. 27, 2018.

(51) Int. Cl.
| | |
|---|---|
| *C07D 255/02* | (2006.01) |
| *A61K 40/11* | (2025.01) |
| *A61K 40/15* | (2025.01) |
| *A61K 40/42* | (2025.01) |
| *A61K 40/46* | (2025.01) |
| *C12N 5/0783* | (2010.01) |
| *A61K 40/50* | (2025.01) |
| *C07K 14/54* | (2006.01) |
| *C07K 14/55* | (2006.01) |

(52) U.S. Cl.
CPC ............ *C07D 255/02* (2013.01); *A61K 40/11* (2025.01); *A61K 40/15* (2025.01); *A61K 40/42* (2025.01); *A61K 40/46* (2025.01); *C12N 5/0636* (2013.01); *A61K 40/50* (2025.01); *A61K 2239/48* (2023.05); *C07K 14/5418* (2013.01); *C07K 14/5434* (2013.01); *C07K 14/5443* (2013.01); *C07K 14/55* (2013.01)

(58) Field of Classification Search
CPC .................................................. C12N 5/0636
See application file for complete search history.

(56) References Cited

U.S. PATENT DOCUMENTS

| | | | |
|---|---|---|---|
| 9,730,928 B2 * | 8/2017 | Planelles | A61K 31/437 |
| 2010/0168004 A1 | 7/2010 | Williams et al. | |
| 2016/0151365 A1 * | 6/2016 | Planelles | C07D 231/54 |
| | | | 514/359 |
| 2017/0008887 A1 | 1/2017 | Eastman et al. | |

OTHER PUBLICATIONS

Uddin, Shahab, et al. "Role of Stat5 in Type I interferon-signaling and transcriptional regulation." Biochemical and Biophysical Research Communications. 308 (2003), pp. 325-330. (Year: 2003).*
Kishton, Rigel J., et al. "Metabolic Regulation of T cell Longevity and Function in Tumor Immunotherapy." Cell Metabolism. (Jul. 5, 2017), vol. 26). (Year: 2017).*
Kim et al. 'Getting the "Kill" into "Shock and Kill": Strategies to Eliminate Latent HIV', Cell Host & Microbe, Jan. 10, 2018 (Jan. 10, 2018), vol. 23, pp. 12-26.
Kane et al. 'Identification of Interferon-Stimulated Genes with Antiretroviral Activity', Cell Host & Microbe, Sep. 14, 2016 (Sep. 14, 2016), vol. 20, pp. 392-405.
Begley et al. 'Preliminary study hints that genetically modified T cells might fight HIV', STATnews, Jan. 2, 2018 (Jan. 2, 2018), pp. 1-5 retrieved on Dec. 17, 2020 from https://www.statnews.com/2018/01/02/car-t-cells-hiv-treatment).
Roberts et al. 'The role of activation-induced cell death in the differentiation of T-helper-cell subsets', Immunologic Research, Dec. 2003, vol. 28, pp. 285-293.
Kim et al., "TopHat2: Accurate alignment of transcriptomes in the presence of insertions, deletions and gene fusions". Genome Biol. 2013;14:R36.
Liao et al., "featureCounts: an efficient general-purpose program for assigning sequence reads to genomic features." Bioinformatics, 30(7):923-30, 2014.
Love et al., "Moderated estimation of fold change and dispersion for RNA-seq data with DESeq2." Genome Biol. 2014;15:550.
Miklossy et al., "Therapeutic modulators of STAT signalling for human diseases." Nat Rev Drug Discov. Aug. 2013;12(8):611-29.
Risso et al., "Normalization of RNA-seq data using factor analysis of control genes or samples." Nature Biotechnology, 32(9), 896-902, 2014.
Bosque et al., "Benzotriazoles Reactivate Latent HIV-1 through Inactivation of STAT5 SUMOylation." Cell Rep. Jan. 31, 2017;18(5):1324-1334.

* cited by examiner

*Primary Examiner* — John S Kenyon
(74) *Attorney, Agent, or Firm* — Kory D. Christensen

(57) ABSTRACT

The present disclosure generally relates to compositions and methods for ex vivo expansion of immune cells isolated from a subject, wherein gene expression can be modulated to enhance immune cell activity in the resulting expanded immune cell culture. Modulation of gene expression in an expanded immune cell culture allows for an immune cell therapy contains genetically chemically modified immune cells suitable for the adoptive cell transfer into a subject in need thereof.

8 Claims, 32 Drawing Sheets

| STAT | Cellular Functions | Major Diseases |
|---|---|---|
| 1 | • Cell growth and apoptosis<br>• $T_h1$ cell-specific cytokine production<br>• Antimicrobial defence | • Atherosclerosis<br>• Infection<br>• Immune disorders |
| 2 | • Mediation of IFNα/IFNβ signalling | • Cancer<br>• Infection<br>• Immune disorders |
| 3 | • Cell proliferation and survival<br>• Inflammation<br>• Immune response<br>• Embryonic development<br>• Cell motility | • Cancer |
| 4 | • $T_h1$ cell differentiation<br>• Inflammatory responses<br>• Cell proliferation | • Experimental autoimmune encephalomyelitis (multiple sclerosis)<br>• Systemic lupus erythematosus |
| 5A | • Cell proliferation and survival<br>• IL-2Rα expression in T lymphocytes<br>• Mammary gland development<br>• Lactogenic signalling | • Cancer<br>• Chronic myelogenous leukaemia |
| 5B | • Cell proliferation and survival<br>• IL-2Rα expression in T lymphocytes<br>• Sexual dimorphism of body growth rate<br>• NK cell cytolytic activity | • Cancer<br>• Chronic myelogenous leukaemia |
| 6 | • Inflammatory and allergic immune response<br>• B cell and T cell proliferation<br>• $T_H2$ cell differentiation | • Asthma<br>• Allergy |

FIG. 1B

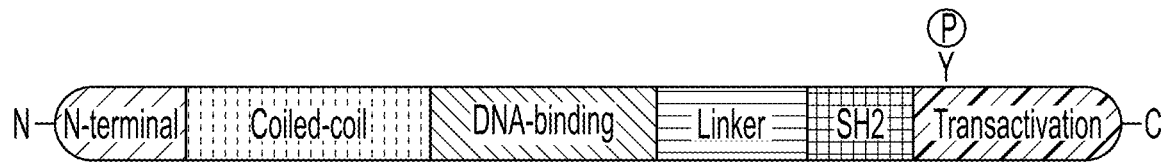

FIG. 1C

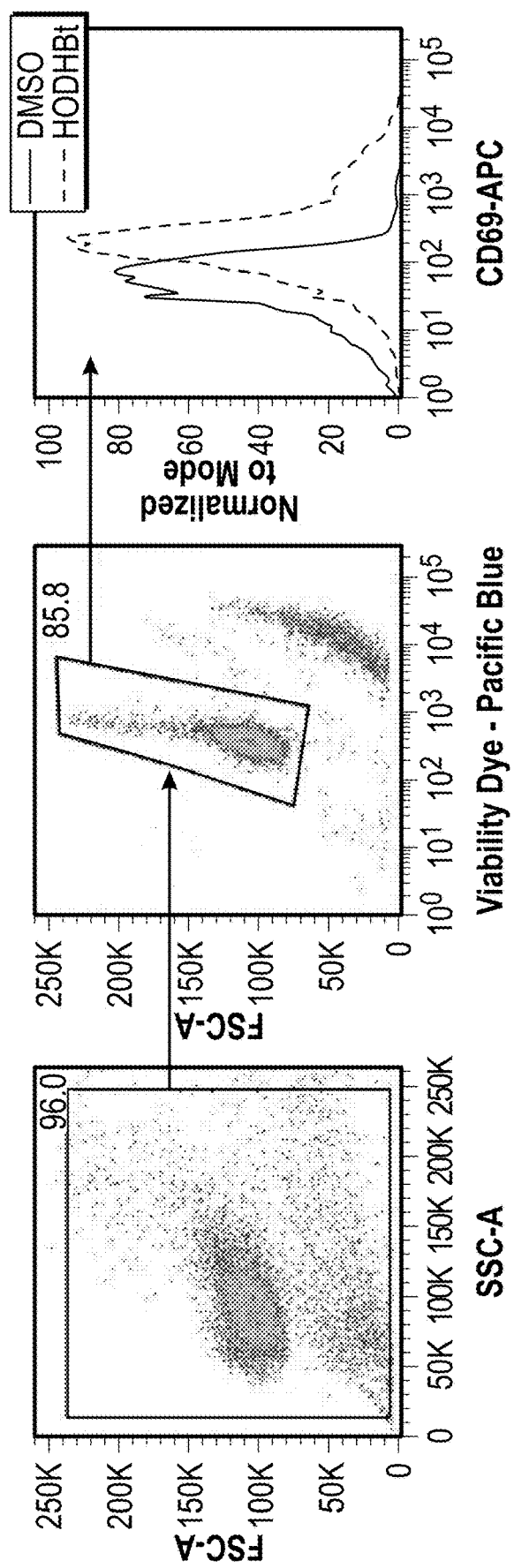

Possible bezotriazine derivatives with enhance activity based on SAR

CD4 Polyclonal Proliferation
-CD4 T Cell Activated with αCD3αCD28 Beads for 3 Days
-Media, IL-2 and HODHBt Added at Day 3 and Replaced Every 2-3 Days.

CD8 Polyclonal Proliferation
-CD8 T Cell Activated with αCD3αCD28 Beads for 3 Days
-Media, IL-2 and HODHBt Added at Day 3 and Replaced Every 2-3 Days.

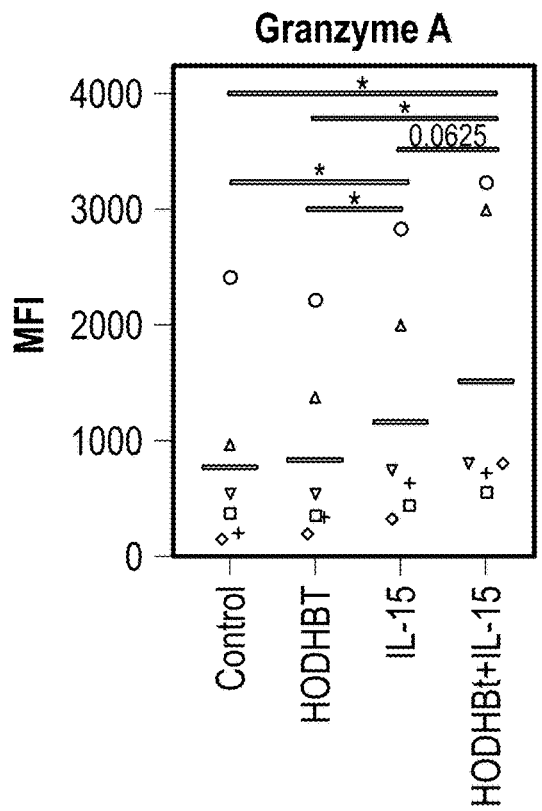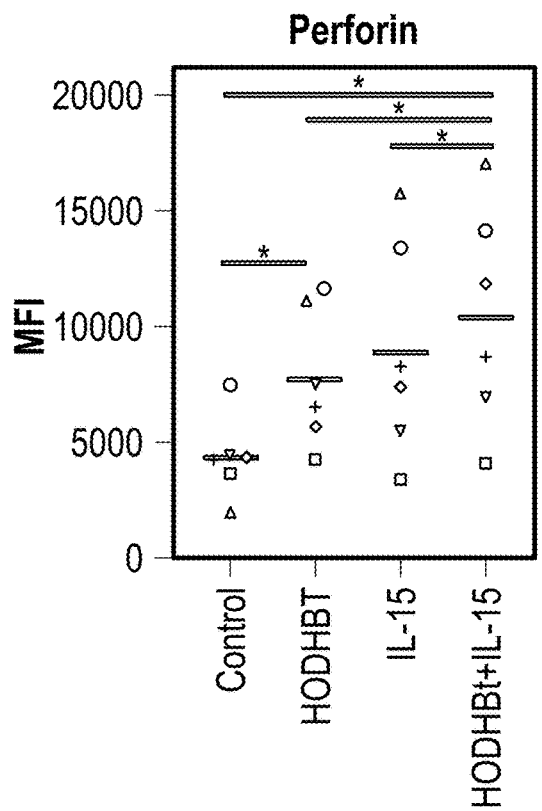
FIG. 18A
FIG. 18B
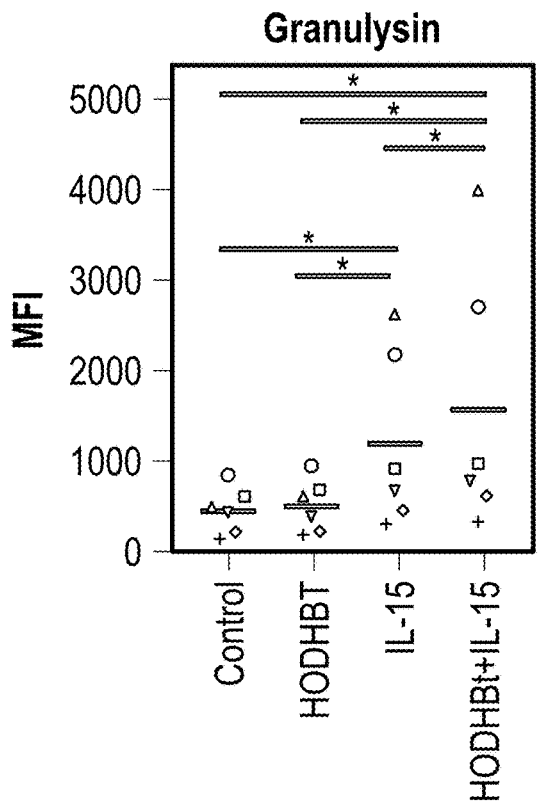
FIG. 18C

In Vitro Model to Assess the Cytolytic Potential of NK Cells

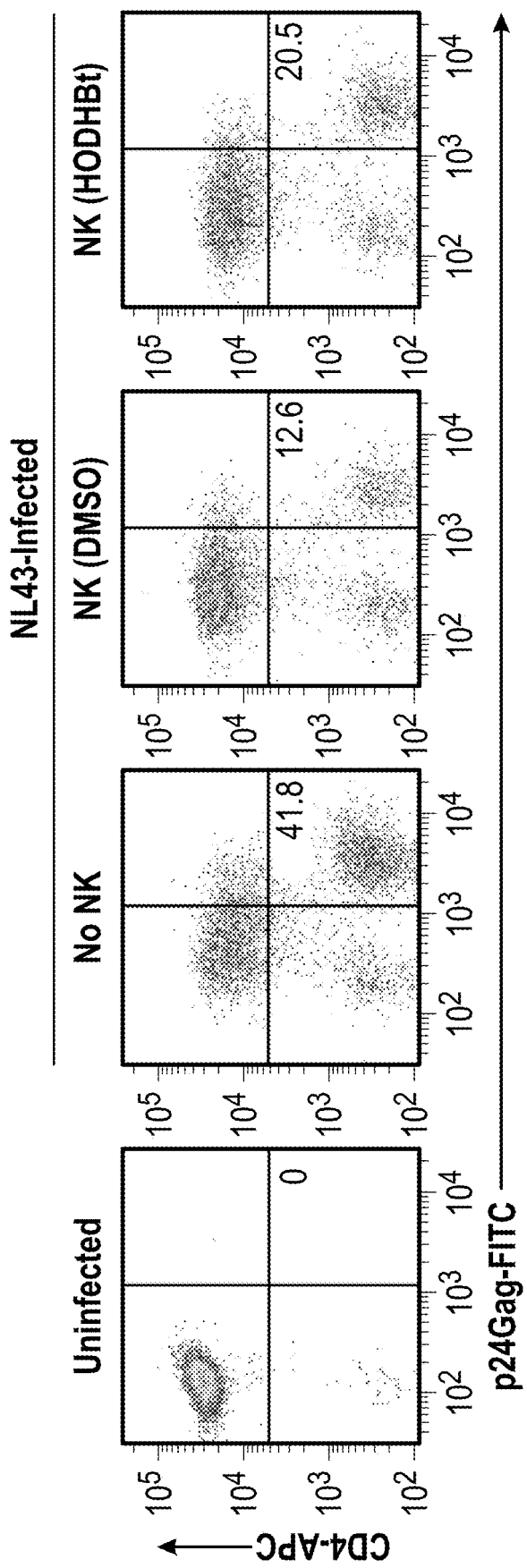

TARGETING STAT SUMOYLATION TO ENHANCE IMMUNE RESPONSES

CROSS REFERENCE TO RELATED APPLICATION

This application is a continuation of PCT Application No. PCT/US19/39336, filed Jun. 26, 2019, which claims the benefit of U.S. Provisional Application No. 62/690,629, filed on Jun. 27, 2018, and U.S. Provisional Application No. 62/799,524, filed on Jan. 31, 2019, the disclosures of which are hereby incorporated by reference in their entireties.

GOVERNMENTAL RIGHTS

This invention was made with government support under R33AI116212 awarded by the National Institutes of Health. The government has certain rights in the invention.

FIELD

The present disclosure generally relates to compositions and methods for ex vivo expansion of immune cells isolated from a subject, wherein gene expression can be modulated to enhance immune cell activity in the resulting expanded immune cell culture. Modulation of gene expression in an expanded immune cell culture allows for an immune cell therapy suitable for the adoptive cell transfer into a subject in need thereof.

BACKGROUND

Cell-based immunotherapies have shown to be effective for treating a variety of immune-related diseases, including cancers, infectious diseases, such as HIV, and autoimmunity such as graft-versus-host disease and induction of transplant tolerance.

Cytokine immunotherapies, such as administration of interleukin-2 (IL-2) and or interleukin-15 (IL-15), have been actively pursued in the clinic to enhance immune responses. Specially, these therapies aim to stimulate immune effector functions from the subject's own CD4 T cells, CD8 T cells, and natural killer (NK) cells to facilitate cytolytic activity.

Recent studies have explored harnessing a subject's own immune cells to mediate antitumor and antiviral responses by employing adoptive cell transfer. Specifically, autologous immune cells (i.e., CD4 T cells, CD8 T cells, and/or NK cells) can be harvested for ex vivo expansion, followed by infusion of the expanded cell product into the subject. In some instances, the harvested cells may be genetically modified during ex vivo expansion to, for example, express a tissue-specific antigen for targeted therapy or enhance immune cell function to overcome intrinsic immunosuppression.

Clinical experience thus far demonstrates the success of treating subjects with genetically modified immune cell-based therapeutics with and without co-administration of cytokine immunotherapies. Unfortunately, the most common methods for modulating gene expression in immune cells are labor intensive and require large amounts of resources and time. As such, there is a need to develop faster, scalable methods of generating immune cell-based therapeutics.

SUMMARY

In an aspect, the disclosure provides methods of modulating gene expression in an immune cell isolated from a subject, the method encompassing ex vivo treatment of the immune cell isolated from the subject with a compound of formula I, formula I encompassing:

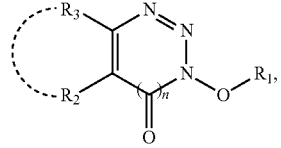

wherein n is 0 or 1; wherein $R^1$ is selected from H, C1-C4 alkyl, C1-C6 aryl, C(O)Ar, C(O)N(CH$_3$)$_2$, SO$_2$N(CH$_3$)$_2$, fluorenylmethyloxycarbonyl, N-((dimethylamino)methylene)-N-methylmethanaminium tetrafluoroborate, N-((dimethylamino)methylene)-N-methylmethanaminium hexafluorophosphate (V), tri(pyrrolidin-1-yl)phosphonium hexafluorophosphate (V), tris(dimethylamino)phosphonium hexafluorophosphate (V), 1-(pyrrolidine-1-ylmethylene) pyrrolidin-1-ium hexafluorophosphate (V), and 1-(piperidin-1-ylmethylene)piperidin-1-ium hexafluorophosphate (V); wherein $R^2$ is selected from H and C1-C4 alkyl; and wherein $R^3$ is selected from H and C1-C4 alkyl; or wherein $R^2$ and $R^3$ are covalently bonded and, together with the intermediate atoms, comprise phenyl substituted with 0, 1, 2, or 3 groups independently selected from Cl, CH$_3$, and NO$_2$ or unsubstituted pyridinyl.

The method of modulating gene expression in an immune cell generates an immune cell that elevates at least one immune effector process when compared to a native immune cell. Specifically, the immune cell can elevate at least one immune effector process when compared to a native immune cell by about 50%. The least one immune effector process can be selected from the group of phagocytosis, cytolysis, chemotaxis, opsonization, immune clearance, or inflammation. Specifically, the at least one immune effector process can be cytolysis.

The method of modulating gene expression in an immune cell generates an immune cell encompassing elevated expression at least one gene that contributes to an immune effector process when compared to a native immune cell. Specifically, the immune cell can express at least one gene that contributes to an immune effector process when compared to a native immune cell by about 50%. The at least one gene that contributes to an immune effector process can be an interferon stimulated gene. The at least one gene that contributes to an immune effector process can be selected from the group of Fas Ligand (FasL), perforin, granzyme, myxovirus resistance 1 (Mx1), TNF-related apoptosis-inducing ligand (TRAIL), or granulysin.

The method of modulating gene expression in an immune cell generates an immune cell wherein the immune cell can be a lymphocyte. The lymphocyte can be a natural killer (NK) cell, a CD4 T cell, or a CD8 T cell.

In another aspect, the disclosure provides methods of treating a subject in need thereof, the method encompassing the steps of: a) isolating immune cells from a donor subject; b) inducing immune cells ex vivo to proliferate and differentiate into effector cells in the presence of a compound selected from formula I; and c) administering to the subject in need thereof, an effective amount of the ex vivo expanded immune cells from step b).

The method of treating a subject in need thereof can encompass inducing immune cells ex vivo to proliferate and differentiate into effector cells in the presence of the compound

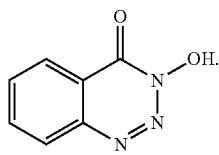

The method of treating a subject in need thereof can encompass isolating immune cells from a donor subject where the donor subject is the subject in need thereof. The method of treating a subject in need thereof can encompass isolating immune cells from a donor subject where the donor subject is not the subject in need thereof. The method of treating a subject in need thereof can encompass isolating immune cells from a donor subject where the donor subject and the subject in need thereof are the same species.

The method of treating a subject in need thereof can encompass administering to the subject in need thereof, an effective amount of the ex vivo expanded immune cells by infusion.

The method of treating a subject in need thereof can encompass administering to the subject in need thereof ex vivo expanded immune cells stored for up to 6 months. The method of treating a subject in need thereof can encompass thawing the stored ex vivo expanded immune cells and then growing the ex vivo expanded immune cells in the presence of a compound selected from formula I. The compound of formula I can be

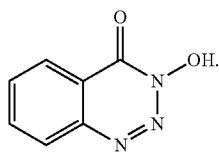

The method of treating a subject in need thereof with an effective amount of ex vivo expanded immune cells can encompass treatment of a cancer, an autoimmune disorder, a viral disease, or a combination thereof.

In another aspect, the disclosure provides immune cell therapy compositions of genetically modified ex vivo expanded immune cells wherein the genetically modified immune cells were expanded with a compound selected from formula I for the duration of ex vivo expansion. The compound selected from formula I can be

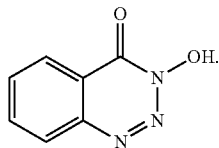

The immune cell therapy composition can encompass immune cells isolated from a mammal. The immune cell therapy composition can encompass immune cells isolated from a human. The immune cell therapy composition can encompass immune cells that are allogeneic, autologous, or a combination thereof. The immune cell therapy composition can encompass isolated immune cells that are autologous to the subject in need thereof. The immune cell therapy composition can encompass isolated immune cells that are allogeneic to the subject in need thereof. The immune cell therapy composition can encompass immune cells isolated from peripheral blood mononuclear cells (PBMC), tumor infiltrating lymphocytes, or a combination thereof. The immune cell therapy composition can encompass isolated immune cells that are lymphocytes. Specifically, lymphocytes can be NK cells, CD4 T cells, CD8 T cells, or a combination thereof.

The immune cell therapy composition can be an infusion formulation. The immune cell therapy composition can further encompass at least one pharmaceutically acceptable excipient. The immune cell therapy composition can be stored for up to 6 months.

In another aspect, the disclosure provides a kit for chemical modification during ex vivo immune cell expansion wherein the kit can encompass culture medium and a compound selected from formula I. The kit can be used to chemically modify immune cells isolated from a mammal during ex vivo immune cell expansion. The kit can be used to chemically modify immune cells isolated from a human during ex vivo immune cell expansion. The kit can be used to chemically modify isolated immune cells that are allogeneic, autologous, or a combination thereof. The isolated immune cells can be autologous to a subject in need thereof. The isolated immune cells can be allogeneic to a subject in need thereof. The isolated immune cells can be obtained from peripheral blood mononuclear cells (PBMC), cord blood, tumor infiltrating lymphocytes, or a combination thereof. The isolated immune cells can be lymphocytes. The isolated lymphocytes can be NK cells, CD4 T cells, CD8 T cells, or a combination thereof.

The kit for chemical modification during ex vivo immune cell expansion can further encompass feeder cells. The kit for chemical modification during ex vivo immune cell expansion where the kit does not require feeder cells.

The kit for chemical modification during ex vivo immune cell expansion can expand genetically modified or not immune cells by at least 20-fold within 4 weeks of culture.

The kit for chemical modification during ex vivo immune cell expansion can elevate in at least one immune effector process when compared to unmodified immune cells. The at least one immune effector process is selected from the group of phagocytosis, cytolysis, chemotaxis, opsonization, immune clearance, or inflammation. Specifically, at least one immune effector process is cytolysis.

The kit for chemical modification during ex vivo immune cell expansion can elevate expression of at least one gene that contributes to an immune effector process when compared to unmodified immune cells. The kit for chemical modification during ex vivo immune cell expansion can elevate expression of at least one gene that contributes to an immune effector process by about 50% when compared to unmodified immune cells. The at least one gene that contributes to an immune effector process is selected from the group of Fas Ligand (FasL), perforin, granzyme, myxovirus resistance 1 (Mx1), TNF-related apoptosis-inducing ligand (TRAIL), or granulysin.

The kit for chemical modification during ex vivo immune cell expansion can further encompass genetically modified immune cells. The kit for chemical modification during ex vivo immune cell expansion can further encompass at least one cytokine. The at least one cytokine can be interleukin-2, interleukin-15, interleukin-7, interleukin-12, interleukin-18, interleukin-21, or a combination thereof.

BRIEF DESCRIPTION OF THE FIGURES

FIG. 1B depicts a schematic showing the cellular functions and disease implication involving STAT-dependent induction of gene expression.

FIG. 1C depicts a schematic showing the domain regions and tyrosine phosphorylation site common to all STATs.

FIGS. 2D-2F depict images of flow cytometry panels used in the screening of benzotriazole and benzotriazin derivatives in primary human CD4 T cells, wherein flow cytometry was performed to isolate activated cells (FIG. 2D), which were expanded in the presence of DMSO or a compound of interest (FIG. 2E), and screened for changes in the expression of CD69 (FIG. 2F).

FIGS. 18A-18E depict graphs showing the levels of Granzyme A (FIG. 18A), Perforin (FIG. 18B), Granulysin (FIG. 18C), TRAIL (FIG. 18D) and Fas ligand (FASL) (FIG. 18E), as measured by flow cytometry, in isolated human NK cells that were incubated for 3 days with either medium, IL-15, HODHBt, or HODHBt+IL-15.

FIGS. 20D-20G depict images of flow cytometry panels measuring the cytolytic capacity of NK cells over uninfected and untreated cultured $T_{CM}$ cells (FIG. 20D), untreated HIV-infected cultured $T_{CM}$ cells (FIG. 20E), HIV-infected cultured $T_{CM}$ cells treated with autologous NK cells expanded in the absence of HODHBt (FIG. 20F), and HIV-infected cultured $T_{CM}$ cells treated with autologous NK cells expanded in the presence of HODHBt (FIG. 20G).

DETAILED DESCRIPTION

Figure 1A:
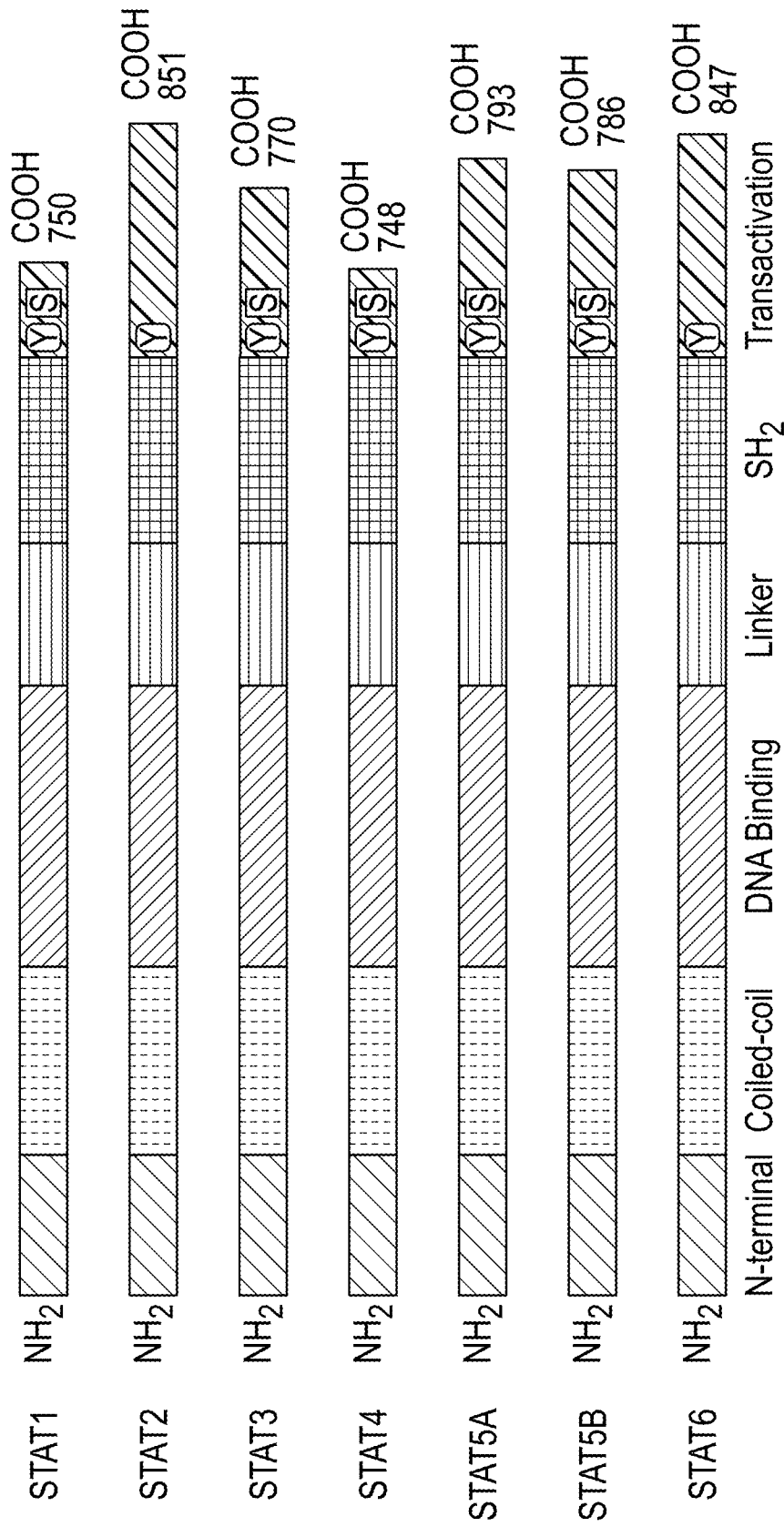
FIG. 1A depicts a schematic showing the domain structures of the seven members of the signal transducer and activator of transcription (STAT) protein family: STAT1, STAT2, STAT3, STAT4, STAT5A, STAT5B and STAT6.

Aspects of the present disclosure include compositions encompassing at least one immune cell with modulated gene expression and methods of making thereof which are detailed below. As used herein, the term "modulated gene expression" refers to over-expression of at least one gene native to an immune cell, under-expression of at least one gene native to an immune cell, knockout of at least one gene native to an immune cell, or a combination thereof. As used herein, the term "native" or "native cell" refers to the state of a cell in the context of a multicellular organism or in a natural environment.

In general, compositions disclosed herein include at least one immune cell with modulated gene expression, wherein modulation of gene expression can increase immune cell activity, enhance immune response, increase rate of immune cell expansion, or a combination thereof compared to a native immune cell. In various embodiments, compositions of the present disclosure include at least one immune cell with modulated gene expression, wherein modulation of gene expression can transiently increase expression of at least one cytotoxic gene. As used herein, the term "cytotoxic gene" refers to any gene that can cause or contribute to cell death. In various embodiments, compositions of the present disclosure comprise an immune cell with modulated gene expression, wherein gene expression can be modulated by a compound of formula I, formula I encompassing:

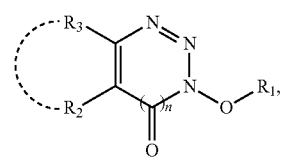

I wherein n is 0 or 1; wherein $R^1$ is selected from H, C1-C4 alkyl, C1-C6 aryl, C(O)Ar, C(O)N(CH$_3$)$_2$, SO$_2$N(CH$_3$)$_2$, fluorenylmethyloxycarbonyl, N-((dimethylamino)methylene)-N-methylmethanaminium tetrafluoroborate, N-((dimethylamino)methylene)-N-methylmethanaminium hexafluorophosphate (V), tri(pyrrolidin-1-yl)phosphonium hexafluorophosphate (V), tris(dimethylamino)phosphonium hexafluorophosphate (V), 1-(pyrrolidine-1-ylmethylene)pyrrolidin-1-ium hexafluorophosphate (V), and 1-(piperidin-1-ylmethylene)piperidin-1-ium hexafluorophosphate (V); wherein $R^2$ is selected from H and C1-C4 alkyl; and wherein $R^3$ is selected from H and C1-C4 alkyl; or wherein $R^2$ and $R^3$ are covalently bonded and, together with the intermediate atoms, comprise phenyl substituted with 0, 1, 2, or 3 groups independently selected from Cl, CH$_3$, and NO$_2$ or unsubstituted pyridinyl. In various embodiments, compositions and methods of the present disclosure may be used to treat a subject in need thereof. In various embodiments, compositions and methods of the present disclosure may be used to expand isolated native immune cells, isolated immune cells with modulated gene expression, or a combination thereof ex vivo.

(I) Compositions

Aspects of the present disclosure include compositions encompassing at least one immune cell with modulated gene expression. Compositions disclosed herein may encompass at least one immune cell with modulated gene expression wherein modulation of gene expression can be a result of treatment with a compound disclosed herein. Compositions disclosed herein may encompass at least one immune cell with modulated gene expression wherein modulation of gene expression wherein modulation of gene expression can increase immune cell activity, enhance immune response, increase rate of immune cell expansion, or a combination thereof compared to a native immune cell (a) Immune Cells In various embodiments, compositions disclosed herein can include at least one immune cell. As used herein an "immune cell" refers to a cell of the immune system. Immune cells can be categorized as lymphocytes, neutrophils, granulocytes, mast cells, monocytes/macrophages, and dendritic cells. In some aspects, compositions disclosed herein can include at least one lymphocyte. In some aspects, lymphocytes can be T-cells (CD4 T cells and/or CD8 T cells), B-cells, and natural killer (NK) cells are categorized as lymphocytes. In other aspects, an immune cell disclosed herein can be cytotoxic lymphocyte. As used herein, a "cytotoxic lymphocyte" refers to a lymphocyte capable cytolysis. For example, but not limited to, a cytotoxic lymphocyte can be capable of killing cancer cells, cells that are infected (particularly with viruses), and cells that are damaged in one or more other ways. In some aspects, a cytotoxic lymphocyte can be a NK cell or a CD8 T cell.

In various embodiments, an immune cell can be isolated from a subject. In some aspects, an immune cell can be isolated from peripheral blood, umbilical cord blood, and/or bone marrow. In other aspects, an immune cell can be isolated from peripheral blood mononuclear cells (PBMCs). In still other aspects, an immune cell can be isolated from a leukapheresis sample. In yet other aspects, an immune cell can be isolated from tumor-infiltrated lymphocytes, tissue-infiltrated lymphocytes, lymph nodes, thymus, and/or secondary lymphoid organs.

In various embodiments, an immune cell can be isolated from autologous peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs. As used herein, the term "autologous" refers to peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs obtained from the same subject to be treated with the compositions disclosed herein. In other embodiments, an immune cell can be isolated from allogeneic peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs. As used herein, the term "allogeneic" refers to peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs obtained from a different subject of the same species as the subject to be treated with the compositions disclosed herein. In some aspects, an immune cell can be isolated from haploidentical allogeneic peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs.

In various embodiments, at least one immune cell can be subjected to ex vivo expansion following isolation from peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs. In some aspects, immune cells at an amount of about $0.5 \times 10^6$ cells/milliliter (ml) to about $1 \times 10^7$ cells/ml, about $1 \times 10^6$ cells/milliliter (ml) to about $9 \times 10^6$ cells/ml, or about $2 \times 10^6$ cells/milliliter (ml) to about $8 \times 10^6$ cells/ml can be subjected to ex vivo expansion following isolation from a subject. In other aspects, immune cells at an amount of about $0.5 \times 10^6$ cells/ml, about $1 \times 10^6$ cells/ml, about $2 \times 10^6$ cells/ml, about $3 \times 10^6$ cells/ml, about $4 \times 10^6$ cells/ml, about $5 \times 10^6$ cells/ml, about $6 \times 10^6$ cells/ml, about $7 \times 10^6$ cells/ml, about $8 \times 10^6$ cells/ml, about $9 \times 10^6$ cells/ml, or about $1 \times 10^7$ cells/ml can be subjected to ex vivo expansion following isolation from a subject. In preferred aspects, immune cells at an amount of about $3 \times 10^6$ cells/ml can be subjected to ex vivo expansion following isolation from a subject.

In various embodiments, gene expression of an immune cell as disclosed herein may be modulated to alter expression of at least one gene native to an immune cell. In some aspects, modulating gene expression of an immune cell as disclosed herein may alter expression of at least one gene native to an immune cell by about 1% to about 100%, about 5% to about 95%, about 10% to about 90%, about 15% to about 85%, or about 20% to about 80%. In some aspects, modulating gene expression of an immune cell as disclosed herein may prevent expression of at least one gene native to the immune cell. In other aspects, modulating gene expression of an immune cell as disclosed herein may lower expression of at least one gene native to the immune cell. In still other aspects, modulating gene expression of an immune cell as disclosed herein may increase expression of at least one gene native to the immune cell.

In various embodiments, modulating gene expression of an immune cell as disclosed herein may alter expression of at least one gene that modifies at least one native immune response. As used herein, the term "immune response" refers to one or more physiological responses caused by the immune system being activated by antigens. Non-limiting examples of immune responses can include immunity to pathogenic microorganisms and its products, allergies, graft rejections, autoimmunity to self-antigens, and the like. In some aspects, modulating gene expression of an immune cell as disclosed herein may alter expression of at least one gene that modifies native innate immune responses, native adaptive immune responses, or a combination thereof. In some aspects, modulating gene expression of an immune cell as disclosed herein may alter expression of at least one gene that prevents an immune response. In some aspects, modulating gene expression of an immune cell as disclosed herein may alter expression of at least one gene that decreases immune response compared to a native immune response. In some aspects, modulating gene expression of an immune cell as disclosed herein may alter expression of at least one gene that increases immune response compared to a native immune response. In other aspects, modulating gene expression of an immune cell as disclosed herein may alter expression of at least one gene that increases immune response by about 1% to about 100% compared to a native immune response.

In various embodiments, modulating gene expression of an immune cell as disclosed herein may alter expression of at least one gene that modifies at least one immune effector process. As used herein, the term "immune effector process" refers to any process of the immune system that can potentially contribute to an immune response. In some aspects, modulating gene expression of an immune cell as disclosed herein may alter expression of at least one gene that prevents an immune effector process. In other aspects, modulating gene expression of an immune cell as disclosed herein may alter expression of at least one gene that decreases an immune effector process compared to a native immune response. In still other aspects, modulating gene expression of an immune cell as disclosed herein may alter expression of at least one gene that increases an immune effector process compared to a native immune response. In yet other aspects, modulating gene expression of an immune cell as disclosed herein may alter expression of at least one gene that increases an immune effector process by about 1% to about 100%, about 10% to about 90%, or about 20% to about 80% compared to a native immune response. In some aspects, modulating gene expression of an immune cell as disclosed herein may alter expression of at least one gene that increases an immune effector process by about 1%, about 10%, about 20%, about 30%, about 40%, about 50%, about 60%, about 70%, about 80%, about 90%, or about 100%.

In various embodiments, a gene that contributes to an immune effector process that can be subject to modulation of gene expression in an immune cell as disclosed herein can be at least one interferon stimulated gene. In other embodiments, a gene that contributes to an immune effector process that can be subject to modulation of gene expression in an immune cell as disclosed herein can be Fas Ligand (FasL), perforin, granzyme, myxovirus resistance 1 (Mx1), TNF-related apoptosis-inducing ligand (TRAIL), or granulysin.

In some aspects, gene expression of FasL in an immune cell with modified gene expression as disclosed herein may be about 1% to about 100%, about 10% to about 90%, or about 20%, to about 80% higher than gene expression of FasL in a native immune cell. In other aspects, gene expression of FasL in an immune cell with modified gene expression as disclosed herein may be about 1% higher, about 5% higher, about 10% higher, about 20% higher, about 30% higher, about 40% higher, about 50% higher, about 60% higher, about 70% higher, about 80% higher, about 90% or about 100% higher than gene expression of FasL in a native immune cell.

In some aspects, gene expression of perforin in an immune cell with modified gene expression as disclosed herein may be about 1% to about 100%, about 10% to about 90%, or about 20%, to about 80% higher than gene expression of perforin in a native immune cell. In other aspects, gene expression of perforin in an immune cell with modified gene expression as disclosed herein may be about 1% higher, about 5% higher, about 10% higher, about 20% higher, about 30% higher, about 40% higher, about 50% higher, about 60% higher, about 70% higher, about 80% higher, about 90% or about 100% higher than gene expression of perforin in a native immune cell.

In some aspects, gene expression of granzyme A, granzyme B, or total in an immune cell with modified gene expression as disclosed herein may be about 1% to about 100%, about 10% to about 90%, or about 20% to about 80% higher than gene expression of granzyme A, granzyme B, or total granzyme in a native immune cell. In other aspects, gene expression of granzyme A, granzyme B, or total granzyme in an immune cell with modified gene expression as disclosed herein may be about 1% higher, about 5% higher, about 10% higher, about 20% higher, about 30% higher, about 40% higher, about 50% higher, about 60% higher, about 70% higher, about 80% higher, about 90%, or about 100% higher than gene expression of granzyme A, granzyme B, or total granzyme in a native immune cell.

In some aspects, gene expression of Mx1 in an immune cell with modified gene expression as disclosed herein may be about 1% to about 100%, about 10% to about 90%, or about 20%, to about 80% higher than gene expression of Mx1 in a native immune cell. In other aspects, gene expression of Mx1 in an immune cell with modified gene expression as disclosed herein may be about 1% higher, about 5% higher, about 10 higher, about 20% higher, about 30% higher, about 40% higher, about 50% higher, about 60% higher, about 70% higher, about 80% higher, about 90%, or about 100% higher than gene expression of Mx1 in a native immune cell.

In some aspects, gene expression of TRAIL in an immune cell with modified gene expression as disclosed herein may be about 1% to about 100%, about 10% to about 90%, or about 20%, to about 80% higher than gene expression of TRAIL in a native immune cell. In other aspects, gene expression of TRAIL in an immune cell with modified gene expression as disclosed herein may be about 1% higher, about 5% higher, about 10% higher, about 20% higher, about 30% higher, about 40% higher, about 50% higher, about 60% higher, about 70% higher, about 80% higher, about 90% higher, or about 100% than gene expression of TRAIL in a native immune cell.

In some aspects, gene expression of granulysin in an immune cell with modified gene expression as disclosed herein may be about 1% to about 100%, about 10% to about 90%, or about 20%, to about 80% higher than gene expression of granulysin in a native immune cell. In other aspects, gene expression of granulysin in an immune cell with modified gene expression as disclosed herein may be about 1% higher, about 5% higher, about 10% higher, about 20% higher, about 30% higher, about 40% higher, about 50% higher, about 60% higher, about 70% higher, about 80% higher, about 90%, or about 100% higher than gene expression of granulysin in a native immune cell.

In some aspects, an immune effector process can be phagocytosis, cytolysis, chemotaxis, opsonization, immune clearance, or inflammation. In preferred aspects, an immune effector process can be cytolysis.

In various embodiments, modulating gene expression in an immune cell as disclosed herein may alter expression of at least one gene that increases cytolysis by about 1% to about 100%, about 10% to about 90%, or about 20% to about 80% compared to a native immune cell. In some aspects, modulating gene expression in an immune cell as disclosed herein may alter expression of at least one gene that increases cytolysis by about 1%, about 10%, about 20%, about 30%, about 40%, about 50%, about 60%, about 70%, about 80%, about 90%, or about 100% compared to a native immune cell.

In various embodiments, gene expression in an immune cell disclosed herein can be modulated by exposure to a compound of formula I for the duration of ex vivo expansion. In some aspects, gene expression in an immune cell disclosed herein can be modulated by exposure to a compound of formula I for at least about 1 day to about 40 days, about 5 days to about 35 days, or about 10 days to about 30 days. In other aspects, gene expression in an immune cell disclosed herein can be modulated by exposure to a compound of formula I for at least about 1 day, about 5 days, about 10 days, about 15 days, about 20 days, about 25 days, about 30 days, about 35 days, or about 40 days.

In various embodiments, gene expression in an immune cell disclosed herein can be modulated by exposure to a compound of formula I at a constant amount for the duration of ex vivo expansion. In some aspects, a constant amount of a compound of formula I may be about 1 μM to about 1 mM. about 5 μM to about 900 μM, or about 10 μM to about 800 μM. In other aspects, a constant amount of a compound of formula I may be about 1 μM, about 5 μM, about 10 μM, about 20 μM, about 30 μM, about 40 μM, about 50 μM, about 60 μM, about 70 μM, about 80 μM, or about 90 μM, about 100 μM, about 200 μM, about 300 μM, about 400 μM, about 500 μM, about 600 μM, about 700 μM, about 800 μM, about 900 μM, or about 1 mM. In some embodiments, gene expression in an immune cell disclosed herein can be modulated by exposure to a compound of formula I at increasing amounts for the duration of ex vivo expansion. In other embodiments, gene expression in an immune cell disclosed herein can be modulated by exposure to a compound of formula I at decreasing amounts for the duration of ex vivo expansion.

In various embodiments, an immune cell with modulated gene expression may be genetically modified. As used herein, the term "genetically modified" refers to manipulation of an immune cell genome using genetic engineering techniques. Non-limiting examples of genetic engineering techniques that can be used for genetic modification include chemical mutagenesis, x-ray mutagenesis, recombinant DNA techniques, virus-mediated delivery of DNA, and gene editing. Examples of gene editing methods include, but are not limited to, CRISPRs, TALENs and Zinc Finger Nucleases.

In various embodiments, immune cells with modulated gene expression and/or native immune cells may have one or more genetic modifications to enable expression of chimeric antigen receptors (CARs). In some aspects, immune cells with modulated gene expression may express at least one CAR with one or more genetic modifications to an extracellular antigen recognition domain of the single-chain Fragment variant (scFv) of the CAR, a transmembrane domain of the CAR, an intracellular activation domain of the CAR, or a combination thereof.

In various embodiments, immune cells with modulated gene expression and/or native immune cells may have one or more genetic modifications to T-cell receptors (TCRs). In some aspects, immune cells with modulated gene expression and/or native immune cells may have one or more genetic modifications to an alpha-chain of a TCR, a beta-chain of a TCR, or a combination thereof.

In various embodiments, immune cells with modulated gene expression and/or native immune cells may have one or more genetic modifications to increase secretion of one or more antibodies, one or more cytokines, one or more proteins, or a combination thereof.

(b) Compounds

In various embodiments, at least one immune cell as disclosed herein can be exposed to a compound of formula I, formula I encompassing:

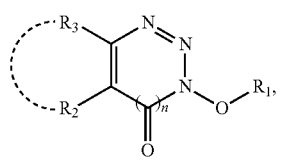

I wherein n is 0 or 1; wherein $R^1$ is selected from H, C1-C4 alkyl, C1-C6 aryl, C(O)Ar, C(O)N(CH$_3$)$_2$, SO$_2$N(CH$_3$)$_2$, fluorenylmethyloxycarbonyl, N-((dimethylamino)methylene)-N-methylmethanaminium tetrafluoroborate, N-((dimethylamino)methylene)-N-methylmethanaminium hexafluorophosphate (V), tri(pyrrolidin-1-yl)phosphonium hexafluorophosphate (V), tris(dimethylamino)phosphonium hexafluorophosphate (V), 1-(pyrrolidine-1-ylmethylene) pyrrolidin-1-ium hexafluorophosphate (V), and 1-(piperidin-1-ylmethylene)piperidin-1-ium hexafluorophosphate (V); wherein $R^2$ is selected from H and C1-C4 alkyl; and wherein $R^3$ is selected from H and C1-C4 alkyl; or wherein $R^2$ and $R^3$ are covalently bonded and, together with the intermediate atoms, comprise phenyl substituted with 0, 1, 2, or 3 groups independently selected from Cl, CH$_3$, and NO$_2$ or unsubstituted pyridinyl.

As used herein, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

In various embodiments, at least one immune cell as disclosed herein can be exposed to a benzotriazin derivative, a benzotriazole derivative, or a combination thereof. In some aspects, benzotriazole derivatives suitable for use herein may be

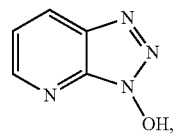

II

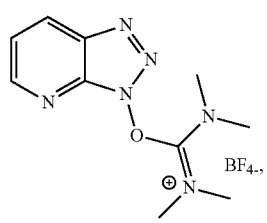

III

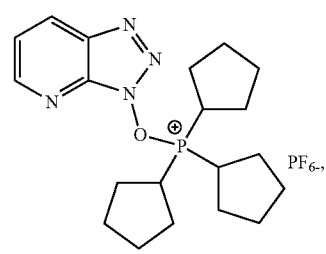

IV

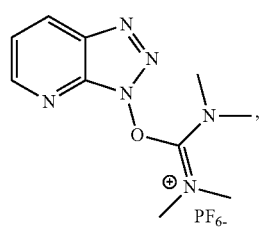

V or a combination thereof. A compound of formula II is referred to as "HOAT." A compound of formula III is referred to as "TATU." A compound of formula IV is referred to as "PyAOP." A compound of formula V is referred to as "HATU." In some aspects, benzotriazin derivatives suitable for use herein may be

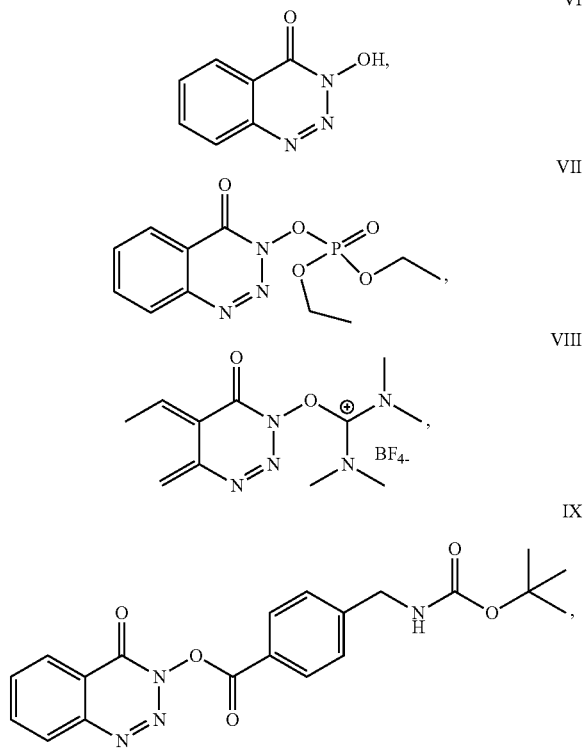

or a combination thereof. A compound of formula VI is referred to as "HODHBt." A compound of formula VII is referred to as "DEPBT." A compound of formula VIII is referred to as "TDBTU." A compound of formula IX is referred to as "BIN024." In preferred aspects, compound suitable for use herein may be

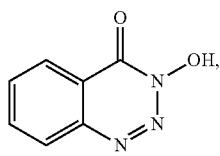

wherein a compound of formula VI is referred to as "HODHBt".

In various embodiments, compounds disclosed herein can be present as a solvate. In some aspects, a solvent used to prepare the solvate can be an aqueous solution, and the solvate can then often referred to as a hydrate. In other aspects, compounds can be present as a hydrate, which can be obtained, for example but not limited to, by crystallization from a solvent or from aqueous solution. In this connection, one, two, three or any arbitrary number of solvate or water molecules can combine with the compounds according to the invention to form solvates and hydrates. Unless stated to the contrary, the compounds disclosed herein can include all such possible solvates.

In some aspects, compounds disclosed herein can be present in one or more different polymorphic forms. In some aspects, a polymorphic form may be metastable. Unless stated to the contrary, the compounds disclosed herein can include all possible polymorphic forms.

In various embodiments, compounds disclosed herein can increase phosphorylation of one or more of the signal transducer and activator of transcription (STAT) family of proteins in an immune cell. In some aspects, compounds disclosed herein can increase phosphorylation of STAT1, STAT2, STAT3, STAT4, STAT5A, STAT5B, STAT6, or a combination thereof in an immune cell. In preferred aspects, compounds disclosed herein can increase phosphorylation of STAT5A, STAT5B, or a combination thereof in an immune cell.

In other aspects, compounds disclosed herein can increase phosphorylation of one or more of the STAT family of proteins in an immune cell by about 1% to about 100%, about 10% to about 90%, or about 20% to about 80%. In still other aspects, compounds disclosed herein can increase phosphorylation of one or more of the STAT family of proteins in an immune cell by about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%.

In various embodiments, compounds disclosed herein can block SUMOylation of one or more of the STAT family of proteins in an immune cell. In some aspects, compounds disclosed herein can block SUMOylation of STAT1, STAT2, STAT3, STAT4, STAT5A, STAT5B, STAT6, or a combination thereof in an immune cell. In preferred aspects, compounds disclosed herein can block SUMOylation of STAT5A, STAT5B, or a combination thereof in an immune cell.

In various embodiments, immune cells exposed compounds disclosed herein may have higher proliferation rates compared to native, unexposed immune cells. In some aspects, immune cells exposed to compounds disclosed herein may have about a 1.5-fold to about 100-fold, about a 10-fold to about 90-fold, or about a 20-fold to 80-fold increase in proliferation rates compared to native, unexposed immune cells. In other aspects, immune cells exposed to compounds disclosed herein may have about a 1.5-fold, about a 2-fold, about a 4-fold, about a 6-fold, about a 8-fold, about a 10-fold, about a 20-fold, about a 30-fold, about a 40-fold, about a 50-fold, about a 60-fold, about a 70-fold, about a 80-fold, about a 90-fold, or about a 100-fold increase in proliferation rates compared to native, unexposed immune cells.

In still other aspects, immune cells exposed to a compound disclosed herein for about 1 day to about 40 days, about 2 days to 39 days, about 3 days to about 38 days, or about 4 days to about 37 days may have higher proliferation rates than native, unexposed immune cells. In yet other aspects, immune cells exposed to a compound disclosed herein for about 1 day, about 2 days, about 3 days, about 4 days, about 5 days, about 7 days, about 9 days, about 11 days, about 13 days, about 15 days, about 17 days, about 19 days, about 21 days, about 22 days, about 23 days, about 24 days, about 25 days, about 25 days, about 27 days, about 28 days, about 29 days, about 30 days, about 31 days, about 32 days, about 33 days, about 34 days, about 35 days, about 36 days, about 37 days, about 38 days, about 39 days, or about 40 days may have higher proliferation rates than native, unexposed immune cells.

In various embodiments, CD8 T cells exposed compounds disclosed herein may have higher proliferation rates compared to native, unexposed CD8 T cells. In some aspects, CD8 T cells exposed to compounds disclosed herein may have about a 1.5-fold to about 100-fold, about a 10-fold to about 90-fold, or about a 20-fold to 80-fold increase in proliferation rates compared to native, unexposed CD8 T cells. In other aspects, CD8 T cells exposed to compounds disclosed herein may have about a 1.5-fold, about a 2-fold, about a 4-fold, about a 6-fold, about a 8-fold, about a 10-fold, about a 20-fold, about a 30-fold, about a 40-fold, about a 50-fold, about a 60-fold, about a 70-fold, about a 80-fold, about a 90-fold, or about a 100-fold increase in proliferation rates compared to native, unexposed CD8 T cells.

In still other aspects, CD8 T exposed to a compound disclosed herein for about 1 day to about 40 days, about 2 days to 39 days, about 3 days to about 38 days, or about 4 days to about 37 days may have higher proliferation rates than native, unexposed CD8 T cells. In yet other aspects, CD8 T cells exposed to a compound disclosed herein for about 1 day, about 2 days, about 3 days, about 4 days, about 5 days, about 7 days, about 9 days, about 11 days, about 13 days, about 15 days, about 17 days, about 19 days, about 21 days, about 22 days, about 23 days, about 24 days, about 25 days, about 25 days, about 27 days, about 28 days, about 29 days, about 30 days, about 31 days, about 32 days, about 33 days, about 34 days, about 35 days, about 36 days, about 37 days, about 38 days, about 39 days, or about 40 days may have higher proliferation rates than native, unexposed CD8 T cells.

In various embodiments, CD4 T cells exposed compounds disclosed herein may have higher proliferation rates compared to native, unexposed CD4 T cells. In some aspects, CD4 T cells exposed to compounds disclosed herein may have about a 1.5-fold to about 100-fold, about a 10-fold to about 90-fold, or about a 20-fold to 80-fold increase in proliferation rates compared to native, unexposed CD4 T cells. In other aspects, CD4 T cells exposed to compounds disclosed herein may have about a 1.5-fold, about a 2-fold, about a 4-fold, about a 6-fold, about a 8-fold, about a 10-fold, about a 20-fold, about a 30-fold, about a 40-fold, about a 50-fold, about a 60-fold, about a 70-fold, about a 80-fold, about a 90-fold, or about a 100-fold increase in proliferation rates compared to native, unexposed CD4 T cells.

In still other aspects, CD4 T exposed to a compound herein for about 1 day to about 40 days, about 2 days to 39 days, about 3 days to about 38 days, or about 4 days to about 37 days may have higher proliferation rates than native, unexposed CD4 T cells. In yet other aspects, CD4 T cells exposed to a compound disclosed herein for about 1 day, about 2 days, about 3 days, about 4 days, about 5 days, about 7 days, about 9 days, about 11 days, about 13 days, about 15 days, about 17 days, about 19 days, about 21 days, about 22 days, about 23 days, about 24 days, about 25 days, about 25 days, about 27 days, about 28 days, about 29 days, about 30 days, about 31 days, about 32 days, about 33 days, about 34 days, about 35 days, about 36 days, about 37 days, about 38 days, about 39 days, or about 40 days may have higher proliferation rates than native, unexposed CD4 T cells.

In various embodiments, NK cells exposed compounds disclosed herein may have higher proliferation rates compared to native, unexposed NK cells. In some aspects, NK cells exposed to compounds disclosed herein may have about a 1.5-fold to about 100-fold increase in proliferation rates compared to native, unexposed NK cells. In other aspects, NK cells exposed to compounds disclosed herein may have about a 1.5-fold, about a 2-fold, about a 4-fold, about a 6-fold, about a 8-fold, about a 10-fold, about a 20-fold, about a 30-fold, about a 40-fold, about a 50-fold, about a 60-fold, about a 70-fold, about a 80-fold, about a 90-fold, or about a 100-fold increase in proliferation rates compared to native, unexposed NK cells In still other aspects, NK exposed to a compound disclosed herein for about 1 day to about 40 days, about 2 days to 39 days, about 3 days to about 38 days, or about 4 days to about 37 days may have higher proliferation rates than native, unexposed NK cells. In yet other aspects, NK cells exposed to a compound disclosed herein for about 1 day, about 2 days, about 3 days, about 4 days, about 5 days, about 7 days, about 9 days, about 11 days, about 13 days, about 15 days, about 17 days, about 19 days, about 21 days, about 22 days, about 23 days, about 24 days, about 25 days, about 25 days, about 27 days, about 28 days, about 29 days, about 30 days, about 31 days, about 32 days, about 33 days, about 34 days, about 35 days, about 36 days, about 37 days, about 38 days, about 39 days, or about 40 days may have higher proliferation rates than native, unexposed NK cells.

In various embodiments, immune cells exposed compounds disclosed herein may have higher activation compared to native, unexposed immune cells. In some aspects, immune cells exposed to compounds disclosed herein may have about a 1.5-fold to about 100-fold, about a 10-fold to about 90-fold, or about a 20-fold to 80-fold increase in activation compared to native, unexposed immune cells. In other aspects, immune cells exposed to compounds disclosed herein may have about a 1.5-fold, about a 2-fold, about a 4-fold, about a 6-fold, about a 8-fold, about a 10-fold, about a 20-fold, about a 30-fold, about a 40-fold, about a 50-fold, about a 60-fold, about a 70-fold, about a 80-fold, about a 90-fold, or about a 100-fold increase in activation compared to native, unexposed immune cells.

In still other aspects, immune cells exposed to a compound disclosed herein for about 1 day to about 40 days, about 2 days to 39 days, about 3 days to about 38 days, or about 4 days to about 37 days may have higher activation than native, unexposed immune cells. In yet other aspects, immune cells exposed to a compound disclosed herein for about 1 day, about 2 days, about 3 days, about 4 days, about 5 days, about 7 days, about 9 days, about 11 days, about 13 days, about 15 days, about 17 days, about 19 days, about 21 days, about 22 days, about 23 days, about 24 days, about 25 days, about 25 days, about 27 days, about 28 days, about 29 days, about 30 days, about 31 days, about 32 days, about 33 days, about 34 days, about 35 days, about 36 days, about 37 days, about 38 days, about 39 days, or about 40 days may have higher activation than native, unexposed immune cells.

In various embodiments, CD8 T cells exposed compounds disclosed herein may have higher activation compared to native, unexposed CD8 T cells. In some aspects, CD8 T cells exposed to compounds disclosed herein may have about a 1.5-fold to about 100-fold, about a 10-fold to about 90-fold, or about a 20-fold to 80-fold increase in activation compared to native, unexposed CD8 T cells. In other aspects, CD8 T cells exposed to compounds disclosed herein may have about a 1.5-fold, about a 2-fold, about a 4-fold, about a 6-fold, about a 8-fold, about a 10-fold, about a 20-fold, about a 30-fold, about a 40-fold, about a 50-fold, about a 60-fold, about a 70-fold, about a 80-fold, about a 90-fold, or about a 100-fold increase in activation compared to native, unexposed CD8 T cells.

In still other aspects, CD8 T exposed to a compound disclosed herein for about 1 day to about 40 days, about 2 days to 39 days, about 3 days to about 38 days, or about 4 days to about 37 days may have higher activation than native, unexposed CD8 T cells. In yet other aspects, CD8 T cells exposed to a compound disclosed herein for about 1 day, about 2 days, about 3 days, about 4 days, about 5 days, about 7 days, about 9 days, about 11 days, about 13 days, about 15 days, about 17 days, about 19 days, about 21 days, about 22 days, about 23 days, about 24 days, about 25 days, about 25 days, about 27 days, about 28 days, about 29 days, about 30 days, about 31 days, about 32 days, about 33 days, about 34 days, about 35 days, about 36 days, about 37 days, about 38 days, about 39 days, or about 40 days may have higher activation than native, unexposed CD8 T cells.

In various embodiments, CD4 T cells exposed compounds disclosed herein may have higher activation compared to native, unexposed CD4 T cells. In some aspects, CD4 T cells exposed to compounds disclosed herein may have about a 1.5-fold to about 100-fold, about a 10-fold to about 90-fold, or about a 20-fold to 80-fold increase in activation compared to native, unexposed CD4 T cells. In other aspects, CD4 T cells exposed to compounds disclosed herein may have about a 1.5-fold, about a 2-fold, about a 4-fold, about a 6-fold, about a 8-fold, about a 10-fold, about a 20-fold, about a 30-fold, about a 40-fold, about a 50-fold, about a 60-fold, about a 70-fold, about a 80-fold, about a 90-fold, or about a 100-fold increase in activation compared to native, unexposed CD4 T cells.

In still other aspects, CD4 T exposed to a compound herein for about 1 day to about 40 days, about 2 days to 39 days, about 3 days to about 38 days, or about 4 days to about 37 days may have higher activation than native, unexposed CD4 T cells. In yet other aspects, CD4 T cells exposed to a compound disclosed herein for about 1 day, about 2 days, about 3 days, about 4 days, about 5 days, about 7 days, about 9 days, about 11 days, about 13 days, about 15 days, about 17 days, about 19 days, about 21 days, about 22 days, about 23 days, about 24 days, about 25 days, about 25 days, about 27 days, about 28 days, about 29 days, about 30 days, about 31 days, about 32 days, about 33 days, about 34 days, about 35 days, about 36 days, about 37 days, about 38 days, about 39 days, or about 40 days may have higher activation than native, unexposed CD4 T cells.

In various embodiments, NK cells exposed compounds disclosed herein may have higher activation compared to native, unexposed NK cells. In some aspects, NK cells exposed to compounds disclosed herein may have about a 1.5-fold to about 100-fold increase activation compared to native, unexposed NK cells. In other aspects, NK cells exposed to compounds disclosed herein may have about a 1.5-fold, about a 2-fold, about a 4-fold, about a 6-fold, about a 8-fold, about a 10-fold, about a 20-fold, about a 30-fold, about a 40-fold, about a 50-fold, about a 60-fold, about a 70-fold, about a 80-fold, about a 90-fold, or about a 100-fold increase in activation compared to native, unexposed NK cells.

In still other aspects, NK exposed to a compound disclosed herein for about 1 day to about 40 days, about 2 days to 39 days, about 3 days to about 38 days, or about 4 days to about 37 days may have higher activation than native, unexposed NK cells. In yet other aspects, NK cells exposed to a compound disclosed herein for about 1 day, about 2 days, about 3 days, about 4 days, about 5 days, about 7 days, about 9 days, about 11 days, about 13 days, about 15 days, about 17 days, about 19 days, about 21 days, about 22 days, about 23 days, about 24 days, about 25 days, about 25 days, about 27 days, about 28 days, about 29 days, about 30 days, about 31 days, about 32 days, about 33 days, about 34 days, about 35 days, about 36 days, about 37 days, about 38 days, about 39 days, or about 40 days may have higher activation than native, unexposed NK cells.

(c) Cytokines

In various embodiments, gene expression in an immune cell disclosed herein can be modulated by exposure to a compound of formula I in addition to one or more cytokines for the duration of ex vivo expansion. In some aspects, cytokines suitable for ex vivo expansion as disclosed herein may be interferon gamma (IFN-γ), tumor necrosis factor-alpha (TNF-α), interleukin-2 (IL-2), interleukin-12 (IL-12), type I interferons, interferon alpha (INF-α), interferon beta (INF-β), granulocyte-macrophage colony-stimulating factor (GM-CSF), interleukin 1 alpha (IL-1α), interleukin-4 (IL-4), interleukin-6 (IL-6), interleukin-7 (IL-7), interleukin-9 (IL-9), interleukin-15 (IL-15), interleukin-18 (IL-18), interleukin-21 (IL-21), leukemia inhibitory factor (LIF), or a combination thereof. In preferred aspects, cytokines suitable for ex vivo expansion as disclosed herein may IL-2, IL-15, IL-7, IL-12, IL-18, IL-21 or a combination thereof.

In some aspects, a cytokine in an amount of about 1 ng/ml to about 1000 µg/ml, about 10 ng/ml to about 750 µg/ml, or about 25 ng/ml to about 500 µg/ml may be added for the duration of ex vivo expansion as disclosed herein. In other aspects, a cytokine in an amount of about 1 ng/ml, about 10 ng/ml, about 25 ng/ml, about 50 ng/ml, about 75 ng/ml, about 100 ng/ml, about 250 ng/ml, about 500 ng/ml, about 750 ng/ml, about 1 µg/ml, about 10 µg/ml, about 25 µg/ml, about 50 µg/ml, about 75 µg/ml, about 100 µg/ml, about 250 µg/ml, about 500 µg/ml, about 750 µg/ml, or about 1000 µg/ml may be added during ex vivo expansion as disclosed herein.

(d) Immune Cell Therapy

In various embodiments, an immune cell therapy composition disclosed herein can include at least one immune cell with modulated gene expression. As used herein, the term "immune cell therapy" or "immunotherapy" refers to a therapeutic approach of activating or suppressing the immune system for the treatment of disease. In various embodiments, an immune cell therapy composition disclosed herein encompasses adoptive cell therapy. As used herein, the term "adoptive cell therapy" refers to the transfer of ex vivo grown immune cells into a subject for treatment of a disease.

In various embodiments, immune cell therapy compositions disclosed herein include at least one lymphocyte with modulated gene expression. In some aspects, a lymphocyte with modulated gene expression for use in an immune cell therapy composition can be a cytotoxic lymphocyte. In other aspects, a cytotoxic lymphocyte for use in an immune cell therapy composition can be a NK cell, a CD4 T cell, or a CD8 T cell.

In various embodiments, immune cell therapy compositions disclosed herein can be administered to a subject in need thereof. A suitable subject includes a mammal, a human, a livestock animal, a companion animal, a lab animal, or a zoological animal. In some embodiments, the subject may be a rodent, e.g., a mouse, a rat, a guinea pig, etc. In another embodiment, the subject may be a livestock animal. Non-limiting examples of suitable livestock animals may include pigs, cows, horses, goats, sheep, llamas and alpacas. In yet other embodiments, the subject may be a companion animal. Non-limiting examples of companion animals may include pets such as dogs, cats, rabbits, and birds. In yet another embodiment, the subject may be a zoological animal. As used herein, a "zoological animal" refers to an animal that may be found in a zoo. Such animals may include non-human primates, large cats, wolves, and bears. In a specific embodiment, the animal is a laboratory animal. Non-limiting examples of a laboratory animal may include rodents, canines, felines, and non-human primates.

In certain embodiments, the animal is a rodent. Non-limiting examples of rodents may include mice, rats, guinea pigs, etc. In preferred embodiments, the subject is a human.

In various embodiments, a subject in need thereof may have been diagnosed with a cancer. By example, but not limited to, a subject may have been diagnosed with nasopharyngeal cancer, synovial cancer, hepatocellular cancer, renal cancer, cancer of connective tissues, melanoma, lung cancer, bowel cancer, colon cancer, rectal cancer, colorectal cancer, brain cancer, throat cancer, oral cancer, liver cancer, bone cancer, pancreatic cancer, choriocarcinoma, gastrinoma, pheochromocytoma, prolactinoma, T-cell leukemia/lymphoma, neuroma, von Hippel-Lindau disease, Zollinger-Ellison syndrome, adrenal cancer, anal cancer, bile duct cancer, bladder cancer, ureter cancer, brain cancer, oligodendroglioma, neuroblastoma, meningioma, spinal cord tumor, bone cancer, osteochondroma, chondrosarcoma, Ewing's sarcoma, cancer of unknown primary site, carcinoid, carcinoid of gastrointestinal tract, fibrosarcoma, breast cancer, Paget's disease, cervical cancer, colorectal cancer, rectal cancer, esophagus cancer, gall bladder cancer, head cancer, eye cancer, neck cancer, kidney cancer, Wilms' tumor, liver cancer, Kaposi's sarcoma, prostate cancer, lung cancer, testicular cancer, Hodgkin's disease, non-Hodgkin's lymphoma, oral cancer, skin cancer, mesothelioma, multiple myeloma, ovarian cancer, endocrine pancreatic cancer, glucagonoma, pancreatic cancer, parathyroid cancer, penis cancer, pituitary cancer, soft tissue sarcoma, retinoblastoma, small intestine cancer, stomach cancer, thymus cancer, thyroid cancer, trophoblastic cancer, hydatidiform mole, uterine cancer, endometrial cancer, vagina cancer, vulva cancer, acoustic neuroma, mycosis fungoides, insulinoma, carcinoid syndrome, somatostatinoma, gum cancer, heart cancer, lip cancer, meninges cancer, mouth cancer, nerve cancer, palate cancer, parotid gland cancer, peritoneum cancer, pharynx cancer, pleural cancer, salivary gland cancer, tongue cancer, tonsil cancer, or a combination thereof.

In various embodiments, a subject in need thereof may have been diagnosed with an infectious disease. By example, but not limited to, a subject may have been diagnosed with chickenpox, common cold, diphtheria, *E. coli*, giardiasis, HIV/AIDS, infectious mononucleosis, influenza, Lyme disease, malaria, measles, meningitis, mumps, poliomyelitis (polio), pneumonia, Rocky mountain spotted fever, rubella (German measles), *Salmonella* infections, severe acute respiratory syndrome (SARS), sexually transmitted diseases, shingles (herpes zoster), tetanus, toxic shock syndrome, tuberculosis, viral hepatitis, West Nile virus, whooping cough (pertussis), or a combination thereof.

In various embodiments, a subject in need thereof may have been diagnosed with an autoimmune disease. By example, but not limited to, a subject may have been diagnosed with diabetes (Type 1), lupus, multiple sclerosis, rheumatoid arthritis, celiac disease, or a combination thereof.

In various embodiments, a subject in need thereof may have been diagnosed with an immune deficiency disease. By example, but not limited to, a subject may have been diagnosed with autoimmune lymphoproliferative syndrome (ALPS), autoimmune polyglandular syndrome type 1 (APS-1), BENTA disease, caspase eight deficiency state (CEDS), CARD9 deficiency and other syndromes of susceptibility to Candidiasis, chronic granulomatous disease (CGD), common variable immunodeficiency (CVID), congenital neutropenia syndromes, CTLA4 deficiency, DOCK8 deficiency, GATA2 deficiency, hyper-immunoglobulin E syndrome (HIES), hyper-immunoglobulin M (IgM) syndrome, leukocyte adhesion deficiency (LAD), LRBA deficiency, PI3 kinase disease, PLAID and/or PLAID-like disease, severe combined immunodeficiency (SCID), STAT3 gain-of-function disease, Warts, Hypogammaglobulinemia, Infections, and Myelokathexis (WHIM) Syndrome, Wiskott-Aldrich syndrome (WAS), X-linked agammaglobulinemia (XLA), XMEN disease, or a combination thereof.

In various embodiments, an immune cell therapy composition disclosed herein may increase cytolytic activity in immune cells with modulated gene expression as disclosed herein compared to cytolytic activity of native immune cells. In some aspects, an immune cell therapy composition disclosed herein may increase cytolytic activity immune cells with modulated gene expression as disclosed herein by about 1% to about 100%, about 10% to about 90%, or about 20% to about 80% compared to native immune cells. In other aspects, an immune cell therapy composition disclosed herein may increase cytolytic activity in immune cells with modulated gene expression as disclosed herein by about 1%, about 5%, about 10%, about 20%, about 30%, about 40%, about 50%, about 60%, about 70%, about 80%, about 90%, or about 100% compared to native immune cells.

In still other aspects, an immune cell therapy composition disclosed herein may increase cytolytic activity of immune cells with modulated gene expression as disclosed herein against leukemia cells, lymphoma cells, tumor cells, metastasizing cells of solid tumors compared to cytolytic activity of native immune cells. In yet other aspects, an immune cell therapy composition disclosed herein may increase cytolytic activity of immune cells with modulated gene expression as disclosed herein from subjects with viral, mycotic or bacterial infectious diseases compared to cytolytic activity of native immune cells.

(e) Dose Formulations

In various embodiments, an immune cell therapy composition disclosed herein can include at least one immune cell with modulated gene expression formulated for parenteral administration by injection. In some aspects, parenteral administration by injection can be by infusion. In some aspects, an immune cell therapy formulation disclosed herein can encompass immune cells with modulated gene expression wherein modulation of gene expression can occur during ex vivo expansion of isolated immune cells. In other aspects, an immune cell therapy formulation disclosed herein can encompass immune cells with modulated gene expression wherein modulation of gene expression can be by a compound of formula I during ex vivo expansion of isolated immune cells. In other aspects, an immune cell therapy formulation disclosed herein can encompass immune cells with modulated gene expression wherein modulation of gene expression can be by HODHBt during ex vivo expansion of isolated immune cells.

In various embodiments, an immune cell therapy formulation disclosed herein cannot encompass a compound of formula I. In various embodiments, an immune cell therapy formulation disclosed herein cannot encompass HODHBt.

In various embodiments, immune cell therapy formulations disclosed herein can encompasses a combination of ex vivo expanded immune cells with modulated gene expression as disclosed herein and at least one additional component selected from the group consisting of pharmaceutically acceptable excipients, adjuvants, diluents, preservatives, antibiotics, and combinations thereof.

In some embodiments, immune cell therapy formulations disclosed herein may be formulated in a conventional manner using one or more physiologically acceptable carriers including excipients and auxiliaries which can facilitate processing of active components into preparations which can be used pharmaceutically. In other embodiments, proper formulation of immune cell therapy formulations disclosed herein may be dependent upon the route of administration chosen. In an aspect, any of the well-known techniques, carriers, and excipients may be used as suitable and as understood in the art. A summary of carriers, and excipients suitable for use in immune cell therapy formulations described herein may be found, for example, in Remington: The Science and Practice of Pharmacy, Nineteenth Ed (Easton, Pa.: Mack Publishing Company, 1995); Hoover, John E., Remington's Pharmaceutical Sciences, Mack Publishing Co., Easton, Pa. 1975; Liberman, H. A. and Lachman, L., Eds., Pharmaceutical Dosage Forms, Marcel Decker, New York, N.Y., 1980; and Pharmaceutical Dosage Forms and Drug Delivery Systems, Seventh Ed. (Lippincott Williams & Wilkins 1999), herein incorporated by reference in their entirety for such disclosure.

"Adjuvants" as used herein are agents that enhance the immune response of an antigen. In one embodiment, one or more adjuvants may be a particulate adjuvant. In another embodiment, one or more adjuvants may be an emulsion. In some embodiments, one or more adjuvants may be a water-in-oil emulsion, oil-in-water emulsion, water-in-oil-in-water emulsion. The emulsion can be based in particular on light liquid paraffin oil (European Pharmacopea type); isoprenoid oil such as squalane or squalene oil resulting from the oligomerization of alkenes, in particular of isobutene or decene; esters of acids or of alcohols containing a linear alkyl group, more particularly plant oils, ethyl oleate, propylene glycol di-(caprylate/caprate), glyceryl tri-(caprylate/caprate) or propylene glycol dioleate; esters of branched fatty acids or alcohols, in particular isostearic acid esters. The oil is used in combination with emulsifiers to form the emulsion. The emulsifiers are preferably nonionic surfactants, in particular esters of sorbitan, of mannide (e.g. anhydromannitol oleate), of glycol, of polyglycerol, of propylene glycol and of oleic, isostearic, ricinoleic or hydroxystearic acid, which are optionally ethoxylated, and polyoxypropylene-polyoxyethylene copolymer blocks, in particular the Pluronic products, especially L121. See Hunter et al., The Theory and Practical Application of Adjuvants (Ed.Stewart-Tull, D. E. S.). JohnWiley and Sons, NY, pp 51-94 (1995) and Todd et al., Vaccine 15:564-570 (1997). In still another embodiment, one or more adjuvants may be a liposome. In yet another embodiment, one or more adjuvants may be a microsphere of biodegradable polymers. In another embodiment, one or more adjuvants may be an immunomodulator. In one embodiment, an adjuvant system of the present disclosure may be any combination of adjuvants and immunomodulators. Non-limiting examples of immunomodulators comprise monophosphoryl lipid A, bark-saponin Quil A, dsRNA analogues, and N-acetyl muramyl-L-alanyl-D-isoglutamine. Further suitable adjuvant systems useful to the present disclosure include, but are not limited to, the RIBI adjuvant system (Ribi Inc.), Block co-polymer (CytRx, Atlanta GA), SAF-M (Chiron, Emeryville CA), AS15, MF59, Avridine lipid-amine adjuvant, heat-labile enterotoxin from *E. coli* (recombinant or otherwise), cholera toxin, IMS 1314, GLA-SE, IC31, CAF01, ISCOMs, or muramyl dipeptide among many others.

In various embodiments, immune cell therapy formulations disclosed herein that are formulations for injection may be presented in unit dosage form. In some aspects, a unit dosage form may be in ampoules and or in multi-dose containers. In other aspects, immune cell therapy formulations disclosed herein may be suspensions, solutions or emulsions in oily or aqueous vehicles. In still other aspects, pharmaceutical compositions disclosed herein may contain formulatory agents such as suspending, stabilizing and/or dispersing agents. In other aspects, immune cell therapy formulations disclosed herein may be cryofrozen prior to storage. As used herein, "cryofrozen" refers to and/or describes cryopreservation biological samples frozen in a manner that maintains vitality and subsequently thawed out again as needed while maintaining vitality. In some aspects, immune cell therapy formulations disclosed herein may be cryofrozen and stored for up to 1 week, up to 4 weeks, up to 8 weeks, up to 16 weeks, up to 25 weeks, up to 50 weeks, up to 100 weeks, or up to 200 weeks while maintaining vitality.

In various embodiments, immune cell therapy formulations described herein for parenteral administration can include aqueous and non-aqueous (oily) sterile injection solutions of the compositions which may contain antioxidants, buffers, bacteriostats and solutes which render the formulation isotonic with the blood of the intended recipient; and aqueous and non-aqueous sterile suspensions which may include suspending agents and thickening agents. In some aspects, immune cell therapy formulations described herein may include lipophilic solvents or vehicles. Non-limiting examples of vehicles include fatty oils such as sesame oil, or synthetic fatty acid esters, such as ethyl oleate or triglycerides, or liposomes. In various embodiments, immune cell therapy formulations described herein may be aqueous injection suspensions. In some aspects, immune cell therapy formulations described herein may contain substances which increase the viscosity of the suspension, such as sodium carboxymethyl cellulose, sorbitol, or dextran. In other aspects, immune cell therapy formulations described herein may comprise suitable stabilizers or agents which increase the solubility of the enzymes and fining agents to allow for the preparation of highly concentrated solutions.

(II) Immune Cell Expansion Kits

In various embodiments, the present disclosure provides a kit including at least one or more compositions disclosed herein for ex vivo expansion of immune cells. In other embodiments, the present disclosure provides packaging including at least one or more compositions disclosed herein for ex vivo expansion of immune cells.

(a) Kits

The present disclosure may further encompass a kit, wherein the kit includes at least a compound of formula I as described herein. In various embodiments, a kit may further include at least one culture medium. In some aspects, the culture medium can be an initial culture medium. In other aspects, the culture medium can be a subculture medium.

In various embodiments, a kit can be used for ex vivo expansion of isolated immune cells. In some aspects, a kit can be used for modulating gene expression in isolated immune cells during ex vivo immune cell expansion. In other aspects, a kit can be used to increase rate of ex vivo expansion by modulation of gene expression in isolated immune cells during ex vivo immune cell expansion. In still other aspects, a kit can be used to enhance immune cell activation by modulation of gene expression in isolated immune cells during ex vivo immune cell expansion. In yet other aspects, a kit can be used to increase cytolytic activity by modulation of gene expression in isolated immune cells during ex vivo immune cell expansion.

In various embodiments, a kit can be used for ex vivo expansion of immune cells isolated from a mammal. In some aspects, a mammal is a human. In other aspects, isolated immune cells are allogeneic, autologous, or a combination thereof. In still other aspects, the isolated immune cells are autologous to the subject in need thereof. In yet other aspects, isolated immune cells are allogeneic to the subject in need thereof.

In various embodiments, a kit can be used for ex vivo expansion of immune cells obtained from peripheral blood, umbilical cord blood, and/or bone marrow. In some aspects, a kit can be used for ex vivo expansion of immune cells obtained from peripheral blood mononuclear cells (PBMC). In still other aspects, a kit can be used for ex vivo expansion of immune cells obtained from tumor infiltrating lymphocytes. In yet other aspects, a kit can be used for ex vivo expansion of immune cells obtained from a leukapheresis sample. In yet other aspects, an immune cell can be isolated from tumor-infiltrated lymphocytes, tissue-infiltrated lymphocytes, lymph nodes, thymus, and/or secondary lymphoid organs.

In various embodiments, a kit can be used for ex vivo expansion of isolated immune cells wherein the kit does not require use of feeder cells. In various embodiments, a kit can be used for ex vivo expansion of isolated immune cells wherein the kit does require use of feeder cells. As used herein, the term "feeder cells" refers to a layer of cells that provide extracellular secretions and/or structure to help an isolated immune cell to proliferate during ex vivo expansion. Non limiting examples of feeder cells can include HeLa cells, 3T3 cells, human dermal fibroblasts, adipose-derived mesenchymal stem cells, human bone marrow-derived mesenchymal cells, mouse embryonic fibroblasts, human fetal muscle cells, human fetal fibroblasts, human adult fallopian tubal epithelial cells, human amniotic mesenchymal cells, human amniotic epithelial cells, mouse bone marrow stromal cells, and murine amniocytes.

In various embodiments, a kit can be used to expand immune cells with modulated gene expression as disclosed herein by at least about 1-fold to about 500-fold, about 10-fold to about 400-fold, or about 50-fold to about 300-fold. In some aspects, genetically modified immune cells are expanded by about 1-fold, about 10-fold, about 50-fold, about 100-fold, about 150-fold, about 200-fold, about 250-fold, about 300-fold, about 350-fold, about 400-fold, about 450-fold, or about 500-fold.

In various embodiments, a kit can be used to expand immune cells with modulated gene expression as disclosed herein within about 1 week to about 6 weeks of culture, about 2 weeks to about 5 weeks of culture, or about 3 weeks to about 4 weeks of culture. In some aspects, a kit can be used to expand genetically modified immune cells within about 1 week, about 2 weeks, about 3 weeks, about 4 weeks, about 5 weeks, or about 6 weeks of culture. In preferred embodiments, a kit can be used to expand genetically modified immune cells by at least 20-fold within 4 weeks of culture.

In various embodiments, a kit can further include at least one cytokine. In some aspects, cytokines can be interferon gamma (IFN-γ), tumor necrosis factor-alpha (TNF-α), interleukin-2 (IL-2), interleukin-12 (IL-12), type I interferons, interferon alpha (INF-α), interferon beta (INF-β), granulocyte-macrophage colony-stimulating factor (GM-CSF), interleukin 1 alpha (IL-1α), interleukin-4 (IL-4), interleukin-6 (IL-6), interleukin-7 (IL-7), interleukin-9 (IL-9), interleukin-15 (IL-15), interleukin-18 (IL-18), interleukin-21 (IL-21), leukemia inhibitory factor (LIF), or a combination thereof. In preferred aspects, cytokines suitable use in kits disclosed herein may IL-2, IL-15, IL-7, IL-12, IL-18, IL-21 or a combination thereof.

In various embodiments, a kit can be used to expand immune cells with modulated gene expression as disclosed herein that have been stored. In some aspects, a kit can further contain immune cells with modulated gene expression as disclosed herein for ex vivo expansion.

In various embodiments, a kit may further comprise instructions for methods of use. In some aspects, instructions to be provided with a kit may be in a fixed form. Non-limiting examples of fixed form instructions include written, recorded onto an audiocassette, videocassette, compact disc, or digital videodisc. In other aspects, a kit may comprise a notice in the form prescribed by a government agency regulating the manufacture, use or sale of pharmaceutical products, which notice reflects approval by the agency of manufacture, use of sale for human administration. In other embodiments, a kit may further comprise a virtual package. As used herein, a "virtual package" refers to components of a kit that are associated by directions on one or more physical or virtual kit components instructing the user how to obtain the other components. A non-limiting example of a virtual package includes a bag or other container containing one component and directions instructing a subject to go to a website, contact a recorded message or a fax-back service, view a visual message, or contact a caregiver or instructor to obtain instructions on how to use the kit or safety or technical information about one or more components of a kit.

In other embodiments, a kit may be a single package. As used herein, the term "single package" means that the components of a kit are physically associated in or with one or more containers and considered a unit for manufacture, distribution, sale, or use. Examples of containers include, but are not limited to, bags, boxes, cartons, bottles, packages such as shrink-wrap packages, stapled or otherwise affixed components, or combinations thereof.

In some embodiments, a kit may comprise one or more components to assist with modulating gene expression during ex vivo immune cell expansion as described herein. In some aspects, such components may include culture flasks, antibiotics for culture medium, serum for culture medium, a control cell line, reagents for detection of immune cell markers, or a combination thereof.

In other aspects, a kit may comprise more components to assist with chemical modification of an isolated immune cell. In still other aspects, a kit may comprise more components to assist with genetic modification of an isolated immune cell. In yet other aspects, a kit may comprise more components to assist with enhancing activity of an isolated immune cell. In other aspects, a kit may comprise more components to assist with increasing rate of expansion of an isolated immune cell.

(b) Packaging

In various embodiments, compositions disclosed herein may be packaged. In some aspects, packaging of a composition may be for storage, shipment, display for sale, or a combination thereof. In various aspects, compositions may be packaged using one or more suitable materials known in the art. In other aspects, compositions may be packaged using one or more suitable methods known in the art. In some aspects, the choice of packaging material and/or packaging method is dependent on the dosage form of a composition disclosed herein to be packaged.

In some embodiments, compositions disclosed herein may be packaged wherein packaging increases the length of time a composition can be stored. As used herein, the "shelf-life" of a composition is the length of time after formulation that a composition can maintain one or more physiological effects following administration to a subject as detailed herein. In some aspects, compositions disclosed herein may be packaged wherein packaging increases the shelf-life of a composition by about 1 week, about 1 month, or about 6 months. In other embodiments, compositions disclosed herein may be packaged wherein packaging increases the length of time a composition can be stored at about −85° C. to about −75° C. In some aspects, kits disclosed herein may be packaged wherein packaging of at least one kit component increases the length of time that kit component can be stored at room temperature by about 1 week, about 1 month, or about 6 months. In other aspects, kits disclosed herein may be packaged wherein packaging of at least one kit component increases the length of time that kit component can be stored at about −85° C. to about −75° C. by about 1 week, about 1 month, or about 6 months.

(III) Methods

Aspects of the present disclosure include methods of ex vivo expansion of immune cells with modulated gene expression as disclosed herein. Other aspects of the present disclosure include methods of administering immune cell therapy compositions disclosed herein to a subject in need thereof.

(a) Methods of Ex Vivo Expansion of Genetically Modified Immune Cells

In various embodiments, methods of ex vivo expansion of immune cells with modulated gene expression as disclosed herein can encompass immune cells isolated from a subject. In some aspects, an immune cell for use in methods disclosed herein can be isolated from peripheral blood, umbilical cord blood, and/or bone marrow. In other aspects, an immune cell for use in methods disclosed herein can be isolated from peripheral blood mononuclear cells (PBMCs). In still other aspects, an immune cell can be isolated from a leukapheresis sample. In yet other aspects, an immune cell can be isolated from tumor-infiltrated lymphocytes, tissue-infiltrated lymphocytes, lymph nodes, thymus, and/or secondary lymphoid organs.

In various embodiments, an immune cell for use in methods disclosed herein can be isolated from autologous peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs. In other embodiments, an immune cell for use in methods disclosed herein can be isolated from allogeneic peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs. In some aspects, an immune cell for use in methods disclosed herein can be isolated from haploidentical allogeneic peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs.

In various embodiments, an isolated immune cell for use in methods disclosed herein may be categorized as lymphocytes, neutrophils, granulocytes, mast cells, monocytes/macrophages, and dendritic cells. In some aspects, an isolated immune cell for use in methods disclosed herein may be least one lymphocyte. In other aspects, an isolated immune cell for use in methods disclosed herein may be a lymphocyte. In some aspects, an isolated immune cell for use in methods disclosed herein may be a natural killer (NK) cell, a CD4 T cell, or a CD8 T cell.

In various embodiments, an immune cell isolated from a subject may be subjected to ex vivo expansion following isolation from a subject. In some aspects, methods of ex vivo expansion disclosed herein can encompass isolated immune cells at an amount of about $0.5 \times 10^6$ cells/milliliter (ml) to about $1 \times 10^7$ cells/ml, about $1 \times 10^6$ cells/milliliter (ml) to about $9 \times 10^6$ cells/ml, or about $2 \times 10^6$ cells/milliliter (ml) to about $8 \times 10^6$ cells/ml. In some aspects, methods of ex vivo expansion disclosed herein can encompass isolated immune cells at an amount of about $0.5 \times 10^6$ cells/ml, about $1 \times 10^6$ cells/ml, about $1 \times 10^6$ cells/ml, about $2 \times 10^6$ cells/ml, about $3 \times 10^6$ cells/ml, about $4 \times 10^6$ cells/ml, about $5 \times 10^6$ cells/ml, about $6 \times 10^6$ cells/ml, about $7 \times 10^6$ cells/ml, about $8 \times 10^6$ cells/ml, about $9 \times 10^6$ cells/ml, or about $1 \times 10^7$ cells/ml. In preferred aspects, methods of ex vivo expansion disclosed herein encompass isolated immune cells at an amount of about $3 \times 10^6$ cells/ml.

In various embodiments, methods of modulating gene expression in an isolated immune cell during ex vivo expansion encompasses exposing the isolated immune cell to a compound of formula I, formula I encompassing:

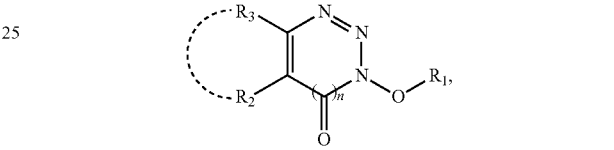

wherein n is 0 or 1; wherein $R^1$ is selected from H, C1-C4 alkyl, C1-C6 aryl, C(O)Ar, C(O)N(CH$_3$)$_2$, SO$_2$N(CH$_3$)$_2$, fluorenylmethyloxycarbonyl, N-((dimethylamino)methylene)-N-methylmethanaminium tetrafluoroborate, N-((dimethylamino)methylene)-N-methylmethanaminium hexafluorophosphate (V), tri(pyrrolidin-1-yl)phosphonium hexafluorophosphate (V), tris(dimethylamino)phosphonium hexafluorophosphate (V), 1-(pyrrolidine-1-ylmethylene) pyrrolidin-1-ium hexafluorophosphate (V), and 1-(piperidin-1-ylmethylene)piperidin-1-ium hexafluorophosphate (V); wherein $R^2$ is selected from H and C1-C4 alkyl; and wherein $R^3$ is selected from H and C1-C4 alkyl; or wherein $R^2$ and $R^3$ are covalently bonded and, together with the intermediate atoms, comprise phenyl substituted with 0, 1, 2, or 3 groups independently selected from Cl, CH$_3$, and NO$_2$ or unsubstituted pyridinyl, for the duration of ex vivo expansion.

In various embodiments, methods of modulating gene expression in an isolated immune cell during ex vivo expansion encompasses exposing the immune cell to a benzotriazin derivative, a benzotriazole derivative, or a combination thereof. In some aspects, benzotriazole derivatives suitable for methods disclosed herein may be

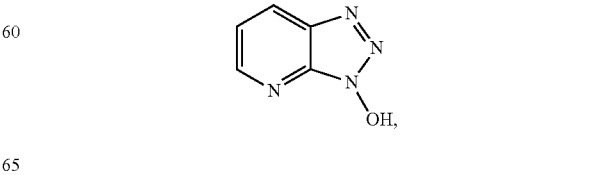

-continued

III

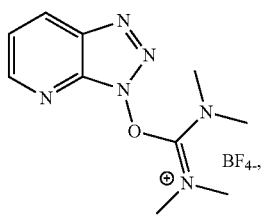

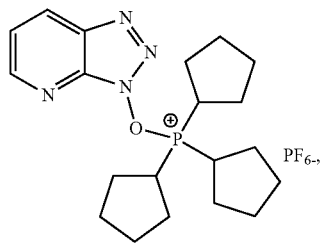

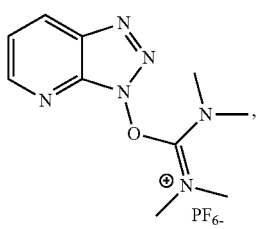

or a combination thereof. A compound of formula II is referred to as "HOAT." A compound of formula III is referred to as "TATU." A compound of formula IV is referred to as "PyAOP." A compound of formula V is referred to as "HATU." In some aspects, benzotriazin derivatives suitable for use herein may be

VI

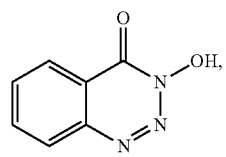

VII

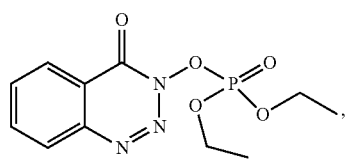

VIII

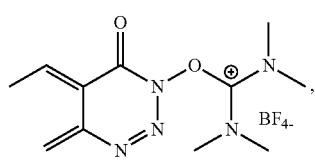

-continued

IX

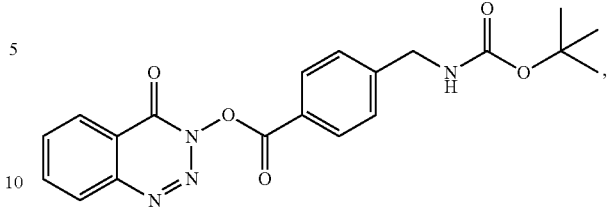

or a combination thereof. A compound of formula VI is referred to as "HODHBt." A compound of formula VII is referred to as "DEPBT." A compound of formula VIII is referred to as "TDBTU." A compound of formula IX is referred to as "BIN024." In preferred aspects, compound suitable for use herein may be

VI

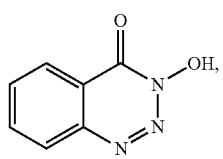

wherein a compound of formula VI is referred to as "HODHBt".

In various embodiments, a method of modulating gene expression in an isolated immune cell during ex vivo expansion encompasses exposing the isolated immune cell to a compound of formula I for the duration of ex vivo expansion. In some aspects, an immune cell cane be isolated from a subject and then genetically modified by exposing the immune cell to a compound of formula I for about 1 week to about 6 weeks of culture, about 2 weeks to about 5 weeks of culture, or about 3 weeks to about 4 weeks of culture. In some aspects, a kit can be used to expand genetically modified immune cells within about 1 week, about 2 weeks, about 3 weeks, about 4 weeks, about 5 weeks, or about 6 weeks of culture.

In various embodiments, gene expression of an immune cell isolated from a subject may be modulated by exposure to a compound of formula I at a constant amount for the duration of ex vivo expansion. In some aspects, a constant amount of a compound of formula I may be about 1 µM to about 1 mM, about 5 µM to about 900 µM, or about 10 µM to about 800 µM. In other aspects, a constant amount of a compound of formula I may be about 1 µM, about 5 µM, about 10 µM, about 20 µM, about 30 µM, about 40 µM, about 50 µM, about 60 µM, about 70 µM, about 80 µM, or about 90 µM, about 100 µM, about 200 µM, about 300 µM, about 400 µM, about 500 µM, about 600 µM, about 700 µM, about 800 µM, about 900 µM, or about 1 mM. In some embodiments, gene expression in an immune cell disclosed herein can be modulated by exposure to a compound of formula I at increasing amounts for the duration of ex vivo expansion. In other embodiments, gene expression in an immune cell disclosed herein can be modulated by exposure to a compound of formula I at decreasing amounts for the duration of ex vivo expansion.

In various embodiments, methods disclosed herein may modulate gene expression in an immune cell to alter expression of at least one gene native to the immune cell. In some aspects, methods of modulating gene expression in an immune cell disclosed herein may modify the expression of at least one gene native to the immune cell by about 1% to about 100%, about 5% to about 95%, about 10% to about 90%, about 15% to about 85%, or about 20% to about 80%. In some aspects, methods of modulating gene expression in an immune cell disclosed herein may to prevent expression of at least one gene native to the immune cell. In other aspects, methods of modulating gene expression in an immune cell disclosed herein may lower expression of at least one gene native to the immune cell. In still other aspects, methods of modulating gene expression in an immune cell disclosed herein may increase expression of at least one gene native to the immune cell.

In various embodiments, methods disclosed herein may modulate gene expression in an immune cell to alter expression of at least one gene that modifies at least one native immune response. In some aspects, methods of modulating gene expression in an immune cell disclosed herein may alter expression of at least one gene that modifies native innate immune responses, adaptive immune responses, or a combination thereof. In some aspects, methods of modulating gene expression in an immune cell disclosed herein may alter expression of at least one gene that prevents an immune response. In some aspects, methods of modulating gene expression in an immune cell disclosed herein may alter expression of at least one gene that decreases immune response compared to a native immune response. In some aspects, methods of modulating gene expression in an immune cell disclosed herein may alter expression of at least one gene that increases immune response compared to a native immune response. In other aspects, methods of modulating gene expression in an immune cell disclosed herein may alter expression of at least one gene that increases immune response by about 1% to about 100%, about 10% to about 90%, or about 20% to about 80% compared to a native immune response.

In various embodiments, methods of modulating gene expression in an immune cell disclosed herein may alter expression of at least one gene that modifies at least one immune effector process. In some aspects, methods of modulating gene expression in an immune cell disclosed herein may alter expression of at least one gene that prevents an immune effector process. In other aspects, methods of modulating gene expression in an immune cell disclosed herein may alter expression of at least one gene that decreases an immune effector process compared to a native immune response. In still other aspects, methods of modulating gene expression in an immune cell disclosed herein may alter expression of at least one gene that increases an immune effector process compared to a native immune response. In yet other aspects, methods of modulating gene expression in an immune cell disclosed herein may alter expression of at least one gene that increases an immune effector process by about 1% to about 100%, about 10% to about 90%, or about 20% to about 80% compared to a native immune response. In some aspects, methods of modulating gene expression in an immune cell disclosed herein may alter expression of at least one gene that increases an immune effector process by about 1%, about 10%, about 20%, about 30%, about 40%, about 50%, about 60%, about 70%, about 80%, about 90%, or about 100%.

In various embodiments, methods of modifying a gene that contributes to an immune effector process in an isolated immune cell can be any interferon stimulated gene. In other embodiments, a gene that contributes to an immune effector process that can be genetically modified by methods disclosed herein can be Fas Ligand (FasL), perforin, granzyme, myxovirus resistance 1 (Mx1), TNF-related apoptosis-inducing ligand (TRAIL), or granulysin.

In some aspects, gene expression of FasL in an isolated immune cell modulated by methods disclosed herein may be about 1% to about 100%, about 10% to about 90%, or about 20%, to about 80% higher than gene expression of FasL in a native immune cell. In other aspects, gene expression of FasL in an isolated immune cell modulated by methods disclosed herein may be about 1%, about 5% higher, about 10% higher, about 20% higher, about 30% higher, about 40% higher, about 50% higher, about 60% higher, about 70% higher, about 80% higher, about 90%, or about 100% higher than gene expression of FasL in a native immune cell.

In some aspects, gene expression of perforin in an isolated immune cell modulated by methods disclosed herein may be about 1% to about 100%, about 10% to about 90%, or about 20%, to about 80% higher than gene expression of perforin in a native immune cell. In other aspects, gene expression of perforin in an isolated immune cell modulated by methods disclosed herein may be about 1%, about 5% higher, about 10% higher, about 20% higher, about 30% higher, about 40% higher, about 50% higher, about 60% higher, about 70% higher, about 80% higher, about 90%, or about 100% higher than gene expression of perforin in a native immune cell.

In some aspects, gene expression of granzyme A, granzyme B, or total granzyme in an isolated immune cell modulated by methods disclosed herein may be about 1% to about 100%, about 10% to about 90%, or about 20%, to about 80% higher than gene expression of granzyme A, granzyme B, or total granzyme in a native immune cell. In other aspects, gene expression of granzyme A, granzyme B, or total granzyme in an isolated immune cell modulated by methods disclosed herein may be about 1%, about 5% higher, about 10% higher, about 20% higher, about 30% higher, about 40% higher, about 50% higher, about 60% higher, about 70% higher, about 80% higher, about 90%, or about 100% higher than gene expression of granzyme A, granzyme B, or total granzyme in a native immune cell.

In some aspects, gene expression of Mx1 in an isolated immune cell modulated by methods disclosed herein may be about 1% to about 100%, about 10% to about 90%, or about 20%, to about 80% higher than gene expression of Mx1 in a native immune cell. In other aspects, gene expression of Mx1 in an isolated immune cell modulated by methods disclosed herein may be about 1%, about 5% higher, about 10% higher, about 20% higher, about 30% higher, about 40% higher, about 50% higher, about 60% higher, about 70% higher, about 80% higher, about 90%, or about 100% higher than gene expression of Mx1 in a native immune cell.

In some aspects, gene expression of TRAIL in an isolated immune cell modulated by methods disclosed herein may be about 1% to about 100%, about 10% to about 90%, or about 20%, to about 80% higher than gene expression of TRAIL in a native immune cell. In other aspects, gene expression of TRAIL in an isolated immune cell modulated by methods disclosed herein may be about 1%, about 5% higher, about 10% higher, about 20% higher, about 30% higher, about 40% higher, about 50% higher, about 60% higher, about 70% higher, about 80% higher, about 90%, or about 100% higher than gene expression of TRAIL in a native immune cell.

In some aspects, gene expression of granulysin in an isolated immune cell modulated by methods disclosed herein may be about 1% to about 100%, about 10% to about 90%, or about 20%, to about 80% higher than gene expression of granulysin in a native immune cell. In other aspects, gene expression of granulysin in an isolated immune cell modulated by methods disclosed herein may be about 1%, about 5% higher, about 10% higher, about 20% higher, about 30% higher, about 40% higher, about 50% higher, about 60% higher, about 70% higher, about 80% higher, about 90%, or about 100% higher than gene expression of granulysin in a native immune cell.

In some aspects, an immune effector process can be phagocytosis, cytolysis, chemotaxis, opsonization, immune clearance, or inflammation. In preferred aspects, an immune effector process can be cytolysis.

In various embodiments, methods disclosed herein may modulate expression of at least one gene in an isolated immune cell that increases cytolysis by about 1% to about 100%, about 10% to about 90%, or about 20% to about 80% compared to a native immune response. In some aspects, methods disclosed herein may modulate expression of at least one gene in an isolated immune cell that increases cytolysis by about 1%, about 10%, about 20%, about 30%, about 40%, about 50%, about 60%, about 70%, about 80%, about 90%, or about 100%.

(b) Methods of Administration

In various embodiments, immune cell therapy compositions disclosed herein may be administered by parenteral administration. As used herein, "by parenteral administration" refers to administration of immune cell therapy compositions disclosed herein via a route other than through the digestive tract. In some embodiments, immune cell therapy compositions disclosed herein may be administered by parenteral injection. In some aspects, administration of the disclosed immune cell therapy compositions by parenteral injection may be by subcutaneous, intramuscular, intravenous, intraperitoneal, intracardiac, intraarticular, or intracavernous injection. In other aspects, administration of the disclosed immune cell therapy compositions by parenteral injection may be by slow or bolus methods as known in the field. In some embodiments, the route of administration by parenteral injection can be determined by the target location. In some aspects, compositions disclosed herein may be administered to a solid tumor.

In various embodiments, the dose of immune cell therapy compositions disclosed herein to be administered are not particularly limited, and may be appropriately chosen depending on conditions such as a purpose of preventive and/or therapeutic treatment, a type of a disease, the body weight or age of a subject, severity of a disease and the like. In other embodiments, administration of a dose of an immune cell therapy composition disclosed herein may comprise an effective amount of the composition disclosed herein. As used herein, the term "effective amount" refers to an amount of administered composition that treats an infectious disease, an autoimmune disease, an immune deficiency disease, a cancer, graft-versus-host disease (GVHD), transplant intolerance, or a combination thereof.

An effective amount of an immune cell therapy composition disclosed herein to be delivered to a subject may be an amount that does not result in undesirable systemic side effects. In various embodiments, immune cell therapy compositions administered as disclosed herein may comprise about 5% to about 95%, about 15% to about 85%, or about 25% to about 75% total genetically modified immune cells by total weight of the composition. In other embodiments, immune cell therapy compositions administered as disclosed herein may comprise about 5% to about 95%, about 15% to about 85%, or about 25% to about 75% total genetically modified immune cells with increased cytolytic activity by total weight of the composition. In still other embodiments, immune cell therapy compositions administered as disclosed herein may comprise about 5% to about 95%, about 15% to about 85%, or about 25% to about 75% total genetically modified immune cells with increase cytolytic gene expression by total weight of the composition.

(c) Frequency of Administration

In some embodiments, an immune cell therapy composition disclosed herein may be administered to a subject in need thereof once. In some embodiments, an immune cell therapy composition disclosed herein may be administered to a subject in need thereof more than once. In other embodiments, a first administration of an immune cell therapy composition disclosed herein may be followed by a second administration of an immune cell therapy composition disclosed herein. In some embodiments, a first administration of an immune cell therapy composition disclosed herein may be followed by a second and third administration of an immune cell therapy composition disclosed herein. In some embodiments, a first administration of an immune cell therapy composition disclosed herein may be followed by a second, third, and fourth administration of an immune cell therapy composition disclosed herein. In some embodiments, a first administration of an immune cell therapy composition disclosed herein may be followed by a second, third, fourth, and fifth administration of an immune cell therapy composition disclosed herein.

The number of times a composition may be administered to a subject in need thereof can depend on the discretion of a medical professional, the severity of the disease, and the subject's response to the formulation. In some embodiments, an immune cell therapy composition disclosed herein may be administered continuously; alternatively, the dose of immune cell therapy composition being administered may be temporarily reduced or temporarily suspended for a certain length of time (i.e., a "drug holiday"). In some aspects, the length of the drug holiday can vary between 2 days and 1 year, including by way of example only, 2 days, 1 week, 1 month, 6 months, and 1 year. In another aspect, dose reduction during a drug holiday may be from 10%-100%, including by way of example only 10%, 25%, 50%, 75%, and 100%.

In various embodiments, the desired daily dose of immune cell therapy compositions disclosed herein may be presented in a single dose or as divided doses administered simultaneously (or over a short period of time) or at appropriate intervals. In other embodiments, administration of an immune cell therapy composition disclosed herein may be administered to a subject about once a day, about twice a day, about three times a day. In still other embodiments, administration of an immune cell therapy composition disclosed herein may be administered to a subject at least once a day, at least once a day for about 2 days, at least once a day for about 3 days, at least once a day for about 4 days, at least once a day for about 5 days, at least once a day for about 6 days, at least once a day for about 1 week, at least once a day for about 2 weeks, at least once a day for about 3 weeks, at least once a day for about 4 weeks, at least once a day for about 8 weeks, at least once a day for about 12 weeks, at least once a day for about 16 weeks, at least once a day for about 24 weeks, at least once a day for about 52 weeks and thereafter. In a preferred embodiment, administration of an immune cell therapy composition disclosed herein may be administered to a subject once about 4 weeks.

In some embodiments, an immune cell therapy composition as disclosed may be initially administered followed by a subsequent administration of one for more different compositions or treatment regimens. In other embodiments, an immune cell therapy composition as disclosed may be administered after administration of one for more different compositions or treatment regimens. In some aspects, different compositions may be cytokines.

EXAMPLES

The following examples are included to demonstrate preferred embodiments of the disclosure. It should be appreciated by those of skill in the art that the techniques disclosed in the examples that follow represent techniques discovered by the inventors to function well in the practice of the present disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the present disclosure.

Introduction to Examples 1-8

Signal Transducers and Activators of Transcription (STATs) encompass a known family of 7 proteins involved in communicating signals from the environment to the cell to initiate a transcriptional response (FIG. 1A). STATs control several cellular functions and are involved in major diseases, as detailed in FIG. 1B by Miklossy et al., NAT REV DRUG DISCOV. 2013; 12(8):611-29, the disclosure of which is hereby incorporated by reference in its entirety. STAT proteins are activated by tyrosine phosphorylation at their C-terminal domains (FIG. 1C). Phosphorylated STATs enter the nucleus and activate target genes. Beyond tyrosine phosphorylation, post-translation modifications, such as SUMOylation, can also modulate of STAT signaling. As activated STATs have been linked to a variety of physiological functions and disorders (FIG. 1B), manipulation of STAT function by SUMOylation is an attractive therapeutic target towards enhancing immune responses against viral or bacterial infections as well as cancer.

Figure 2A:
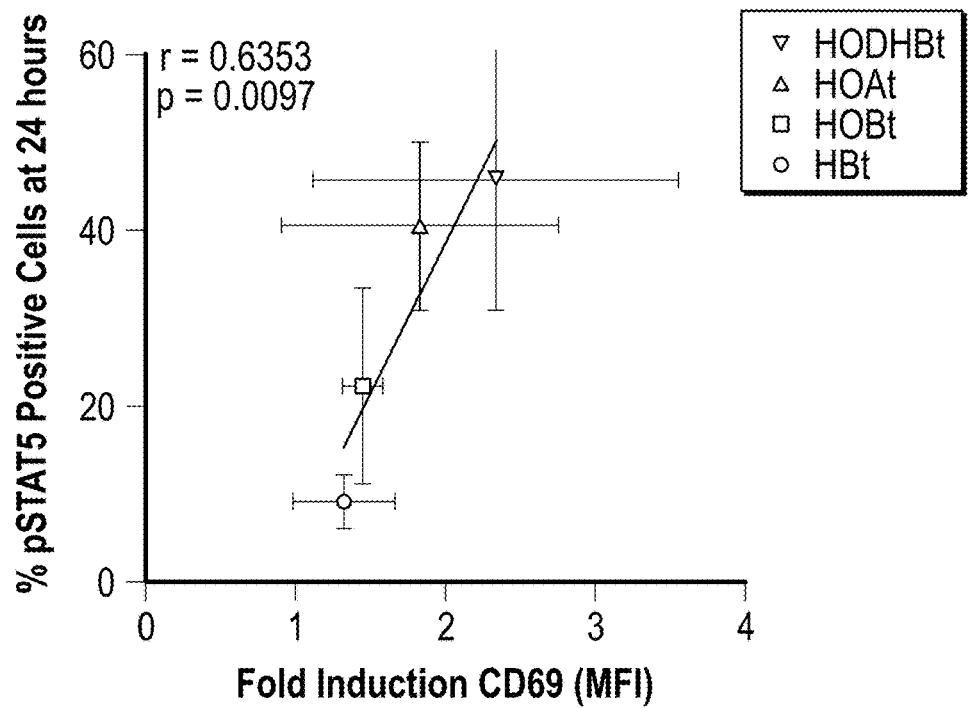
FIGS. 2A-2B depict graphs showing the ability of benzotriazole and benzotriazin derivatives to increase STAT5 phosphorylation correlated with the ability to induce the expression of CD69 (FIG. 2A) but not CD25 (FIG. 2B) on the surface of primary human CD4 T cells.
Figure 2B:
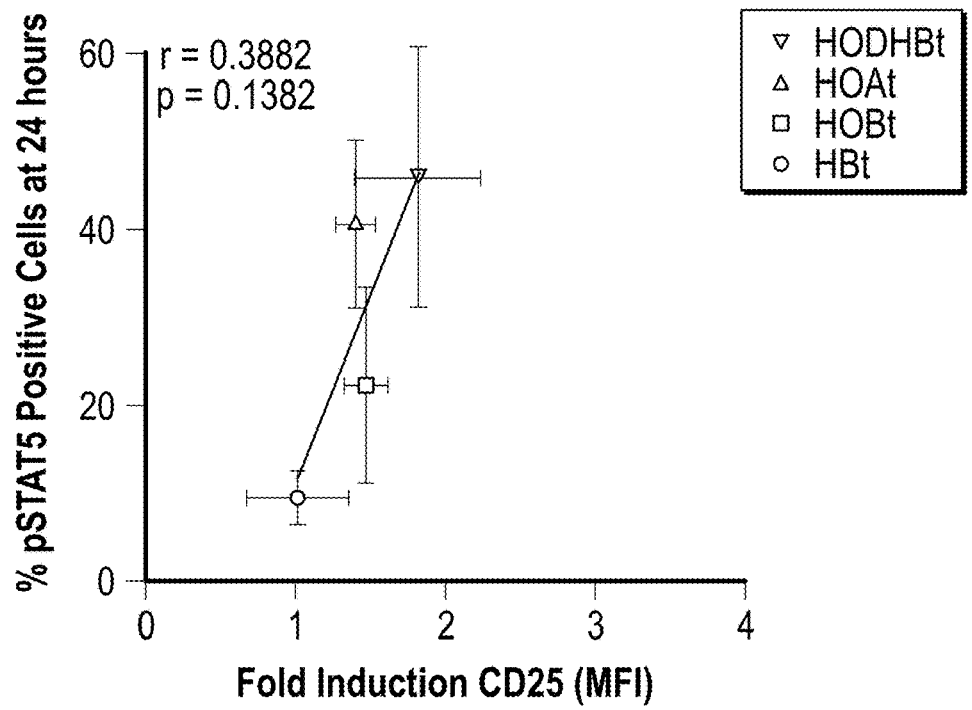
Figure 2C:
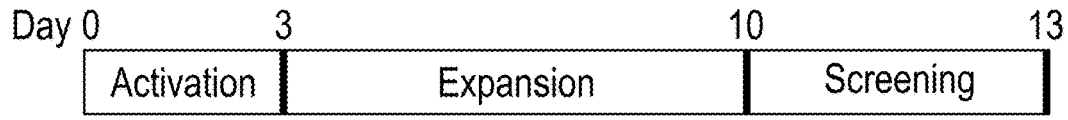
FIG. 2C depicts a schematic showing a time line used for screening benzotriazole and benzotriazin derivatives in CD4 T cells.

Example 1. Primary Cell Model System to Test Efficacy Inhibitors of STAT SUMOylation It was observed that the ability of different benzotriazole and benzotriazin derivatives to increase STAT5 phosphorylation correlated with the ability of the compounds to induce the expression of CD69 (a STAT5 target gene) (FIG. 2A) but not CD25 (FIG. 2B) in the surface of human CD4 T cells. Based on these findings, a primary cell screening assay was set up according to FIG. 2C to identify derivatives with similar activity. As an example, flow cytometry was performed to isolated activated cells (FIG. 2D), which were expanded in the presence of DMSO or a compound of interest (FIG. 2E), and screened for changes in the expression of CD69 (FIG. 2F).

Figure 3A:
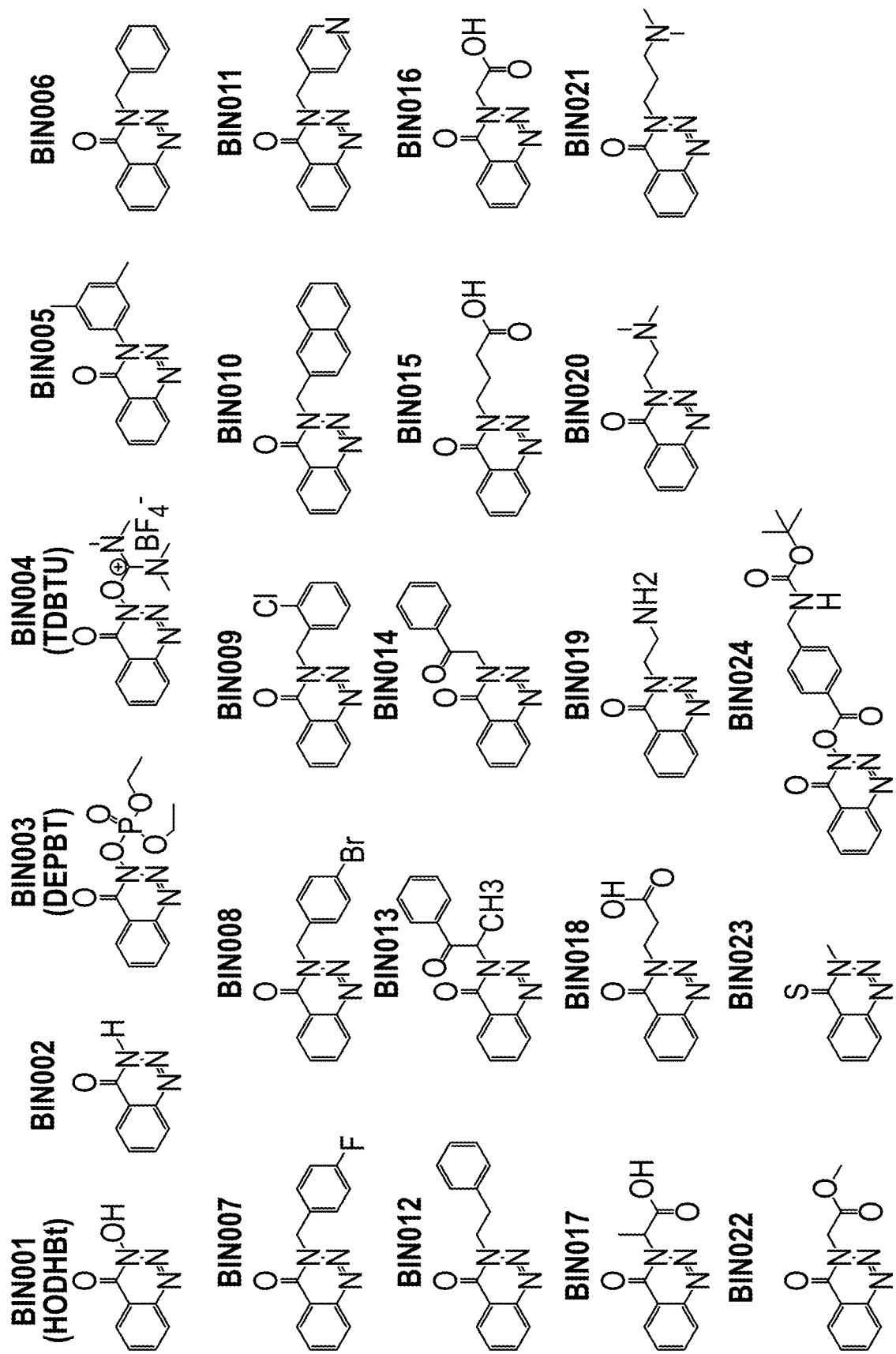
FIG. 3A depicts an image of the benzotriazin derivative compounds screened for increased transcriptional activity of STAT5 in primary human CD4 T cells.
Figure 3B:
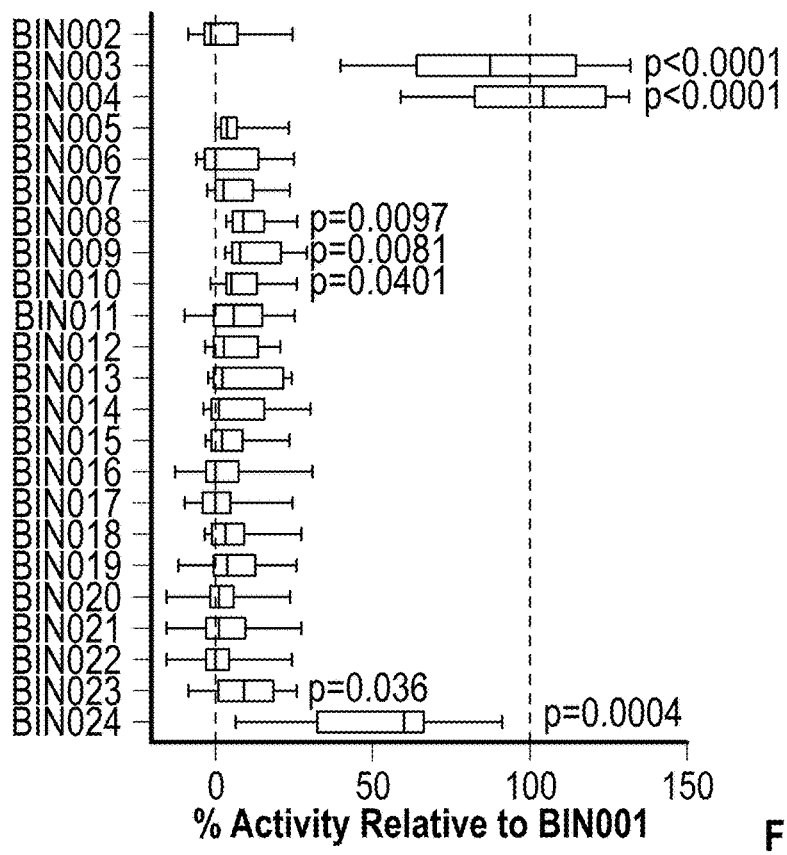
FIGS. 3B-3C depict graphs showing the percent STAT5 transcriptional activity of benzotriazin derivative compounds relative to HODHBt, the compound with the strongest activity in primary human CD4 T cells (FIG. 3B), and the viability of primary human CD4 T cells in the presence of benzotriazin derivative compounds (FIG. 3C).
Figure 3C:
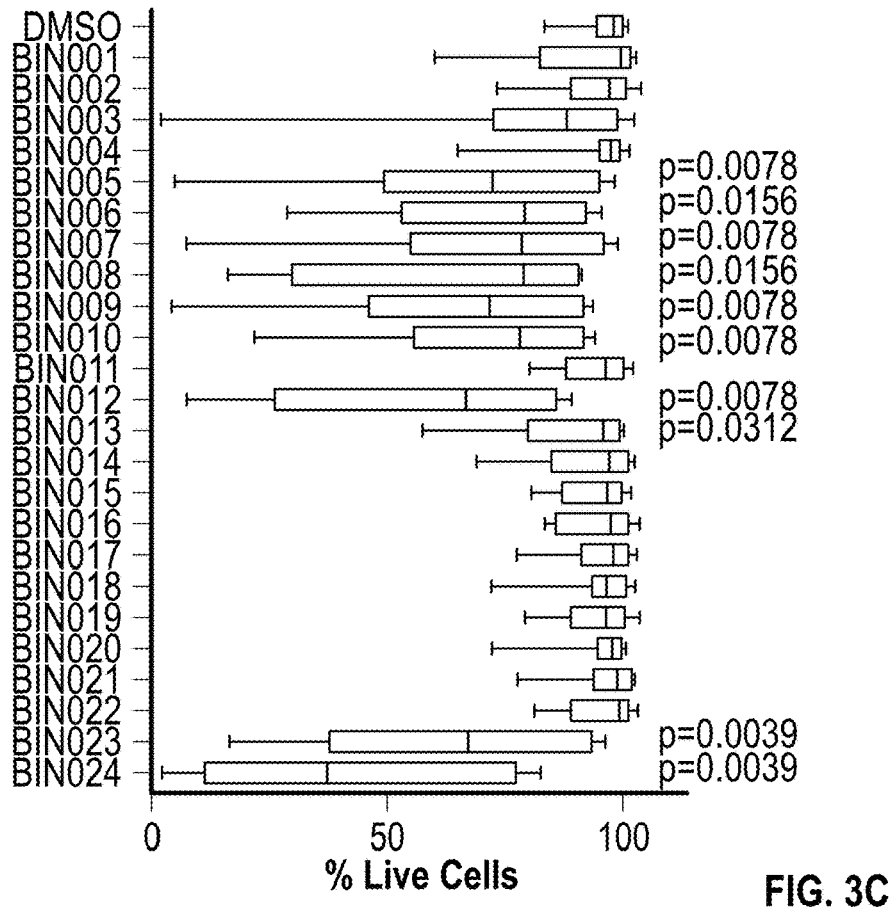
Figure 4A:
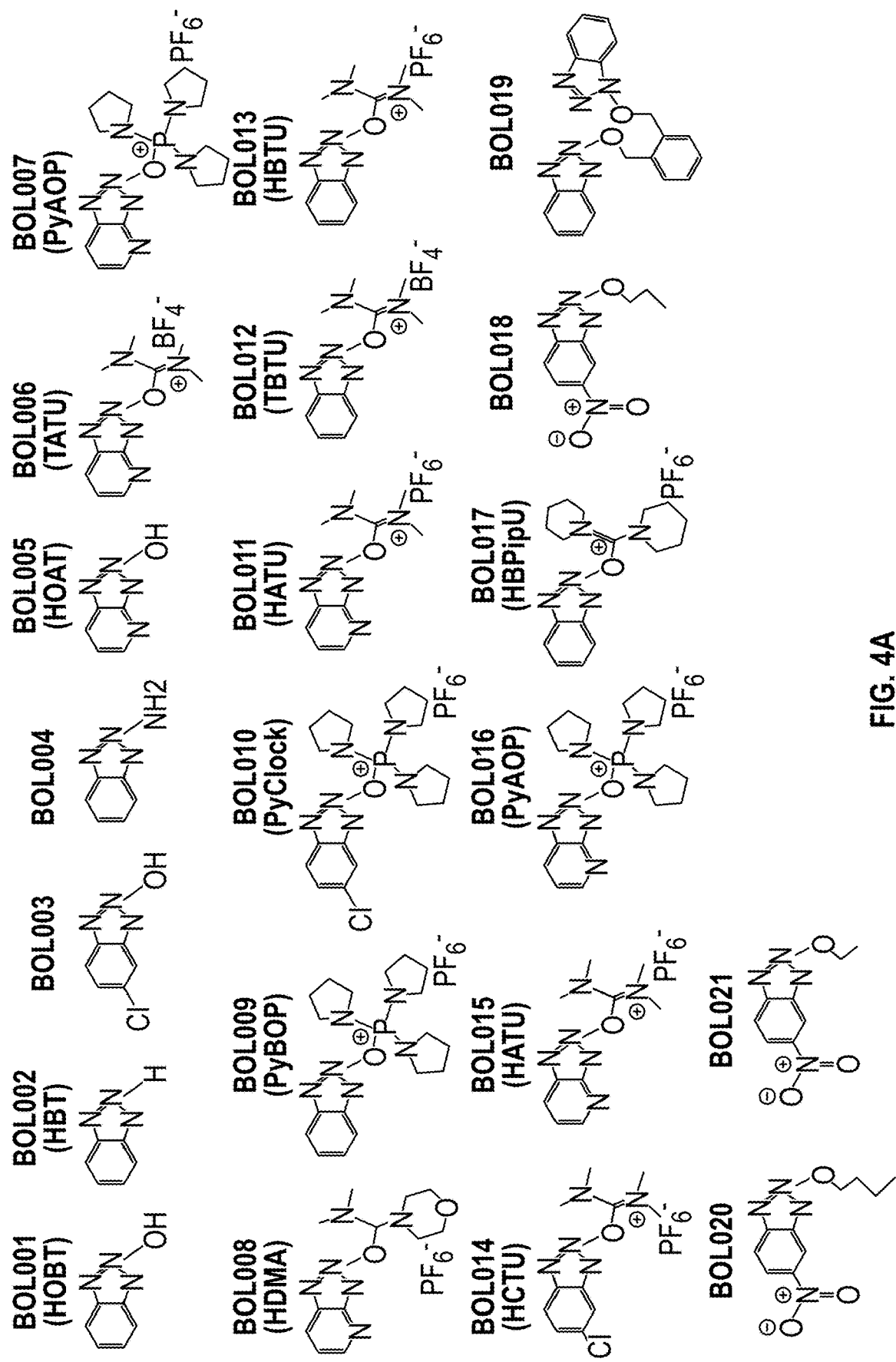
FIG. 4A depicts an image of the benzotriazole derivative compounds screened for increased transcriptional activity of STAT5 in primary human CD4 T cells.
Figure 4B:
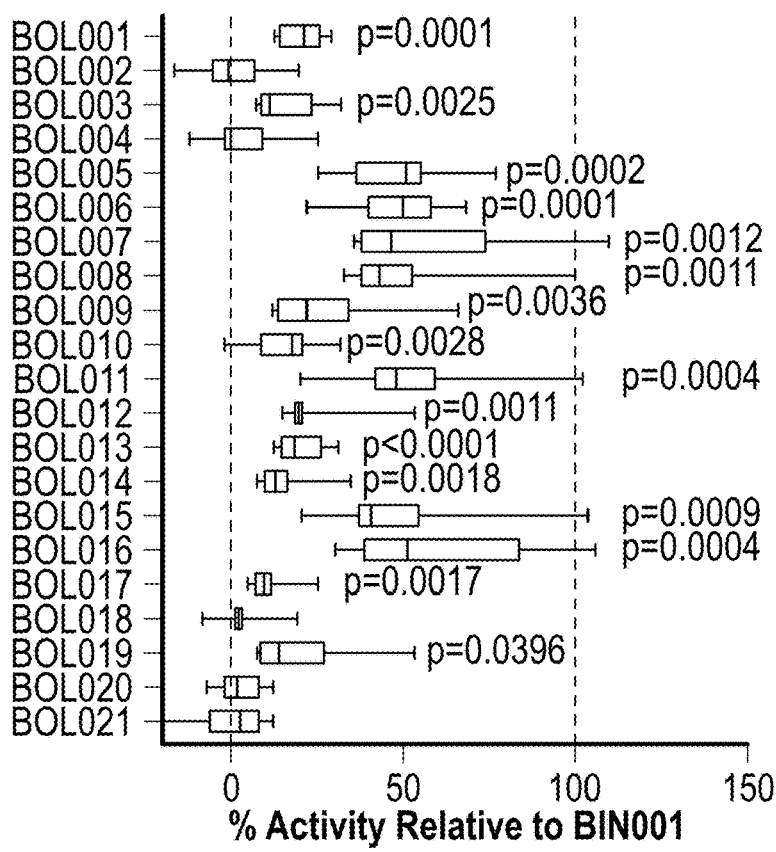
FIGS. 4B-4C depict graphs showing the percent STAT5 transcriptional activity of benzotriazole derivative compounds relative to HODHBt, the compound with the strongest activity primary human CD4 T cells (FIG. 4B), and the viability of primary human CD4 T cells in the presence of benzotriazole derivative compounds (FIG. 4C).
Figure 4C:
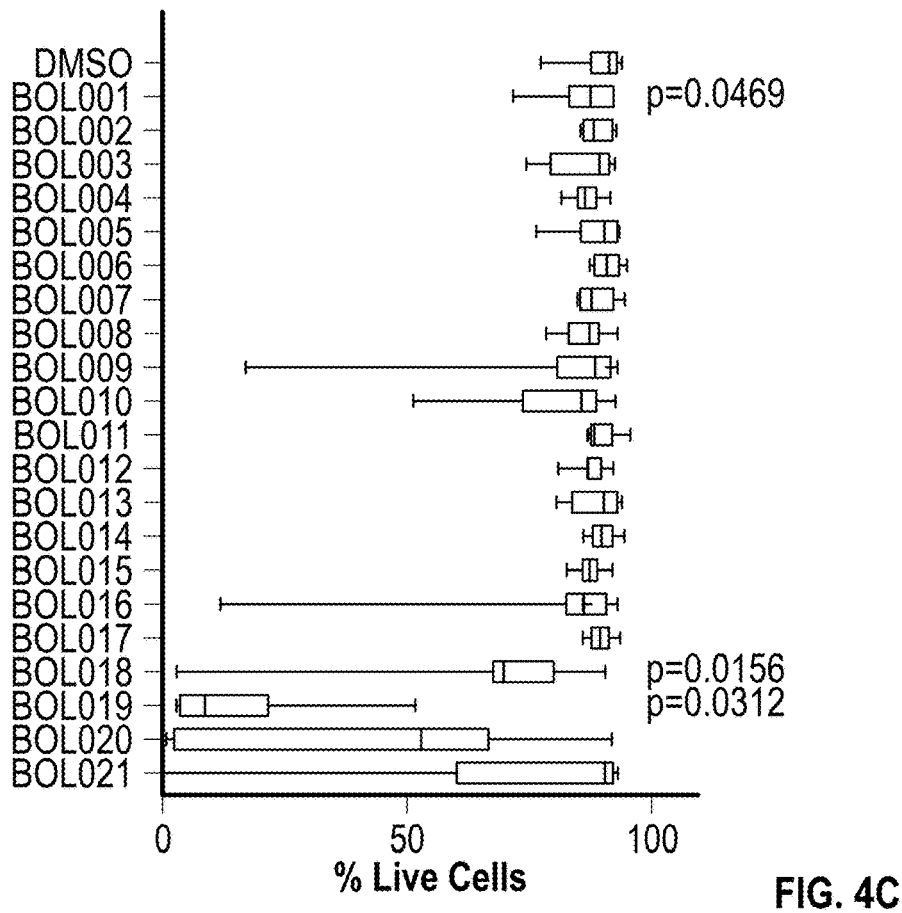

First, 24 benzotriazin derivatives were tested (FIG. 3A). As shown in FIG. 3B, only three derivatives maintain activity relative to the original compound HODHBt (BIN001). Only one, BIN024, had high levels of toxicity at the concentration tested (FIG. 3C). Second, 21 benzotriazole derivatives were tested (FIG. 4A). As shown in FIG. 4B, none of them have more activity than the original compound HODHBt (BIN001). All the amino-benzotriazole derivatives had more activity than the benzotriazole ones. None of the compounds with activity had a significant effect in the viability of the primary CD4 T cells (FIG. 4C).

Figure 5A:
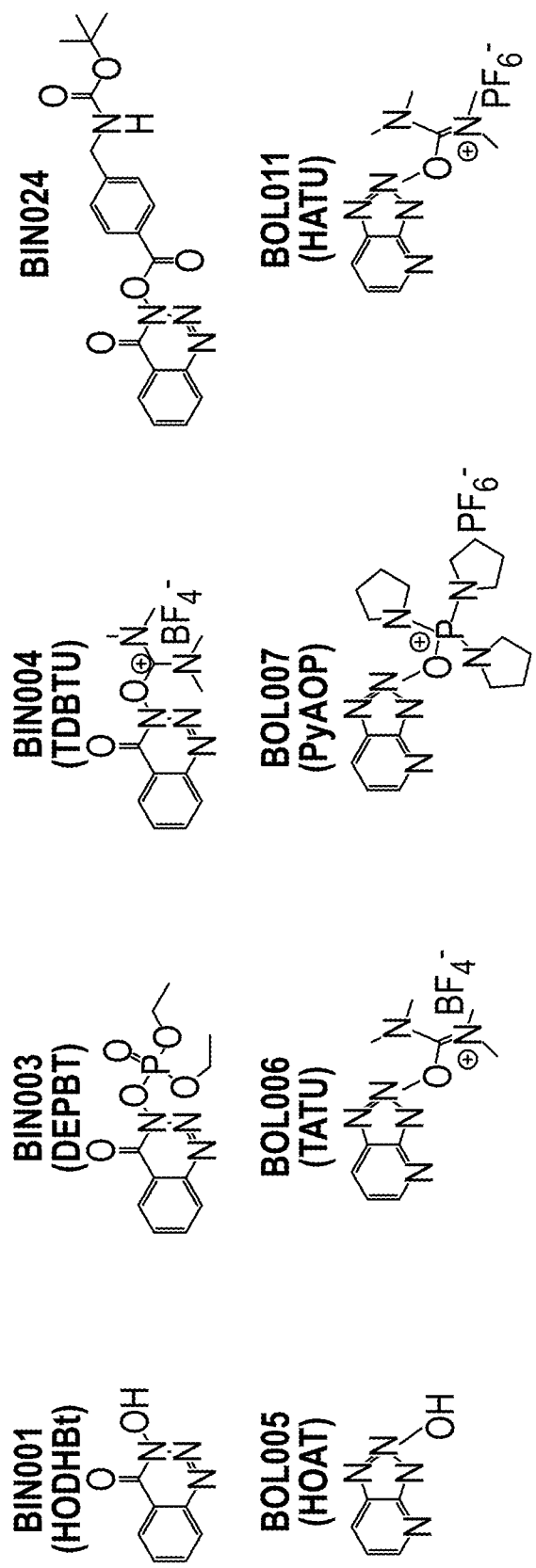
FIGS. 5A-5B depicts an image of benzotriazin and benzotriazole derivatives identified to have the strongest STAT5 transcriptional activity and cell viability levels (FIG. 5A), and an image of possible derivatives that may have enhanced activity based on the outcome of the screenings (FIG. 5B).
Figure 5B:
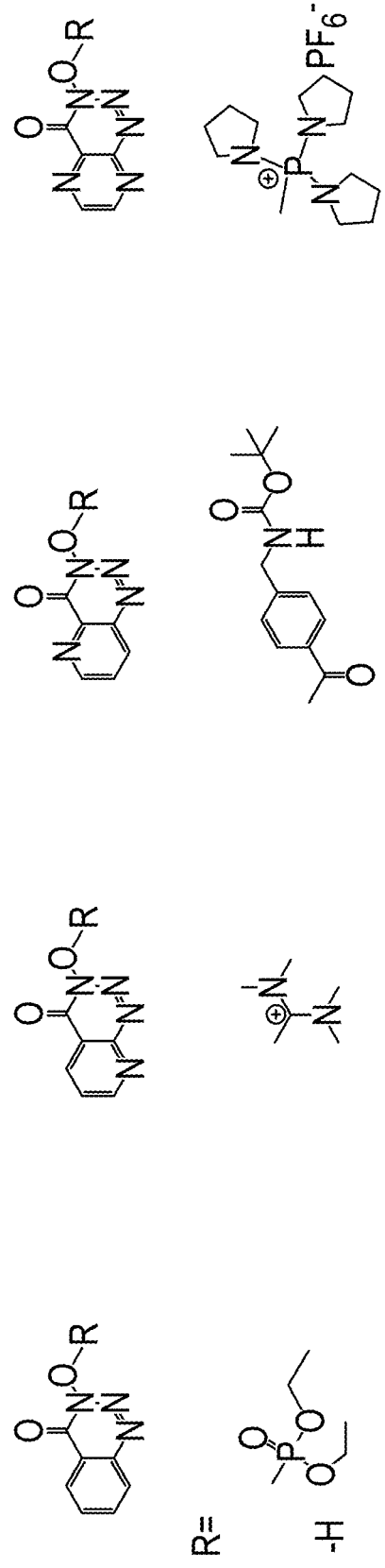

Several benzotriazin and benzotriazole derivatives with the desired activity were identified and possible derivatives that may have enhanced activity based on the screenings were proposed (FIGS. 5A-5B).

Example 2. Manipulation of STATs Phosphorylation with Benzotriazin Derivative HODHBt Mechanistic studies have showed that benzotriazole and/or benzotriazin derivatives can block SUMOylation of STAT5, increasing STAT5's transcriptional activity. See for example, U.S. Pat. No. 9,730,928, the disclosure of which is hereby incorporated by reference in its entirety. Specifically, manipulation of STAT5 SUMOylation with the benzotriazin derivative HODHBt was shown to enhance phosphorylation and the transcriptional activity of STAT5 in Bosque et al., CELL REP. 2017; 18(5):1324-1334, the disclosure of which is hereby incorporated by reference in its entirety.

Figure 6:
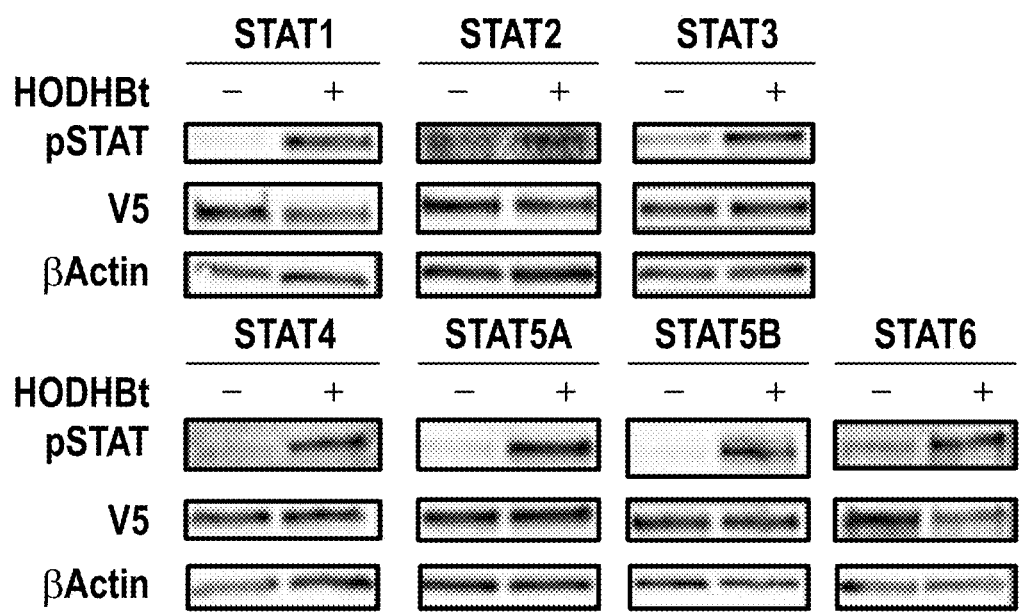
FIG. 6 depicts an image of representative Western blots of 293FT HEK cells transfected with V5-tag constructs of STAT1, STAT2, STAT3, STAT4, STAT5A, STAT5B, or STAT6, probed for STAT phosphorylation (pSTAT) and total STAT protein (V5 tag) where transfected cells were treated with either DMSO (−) or HODHBt (+). Western blots were normalized to a p-actin loading control.

To determine if HODHBt can also enhance phosphorylation of other STATs besides STAT5, 293FT HEK cells were transfected with constructs of each of the 7 STATs tagged with a small epitope of the V protein of the paramyxovirus of simian virus 5 (SV5) or V5 tag. Twenty-four hours after transfection, cells were incubated with either DMSO (vehicle) or HODHBt for 24 hours. Cells were then collected and subjected to Western blot analysis. Similar to STAT5, HODHBt also increased phosphorylation levels of all the other STATs (FIG. 6).

These results suggested that the mechanism of regulation by SUMOylation was conserved among all the STATs and further validated the use of HODHBt and other derivatives to study the role of SUMOylation in regulating STAT function in physiological and cellular responses.

Example 3. HODHBt Inhibits a Protein Required to Resolve STAT Dimerization

Figure 7A:
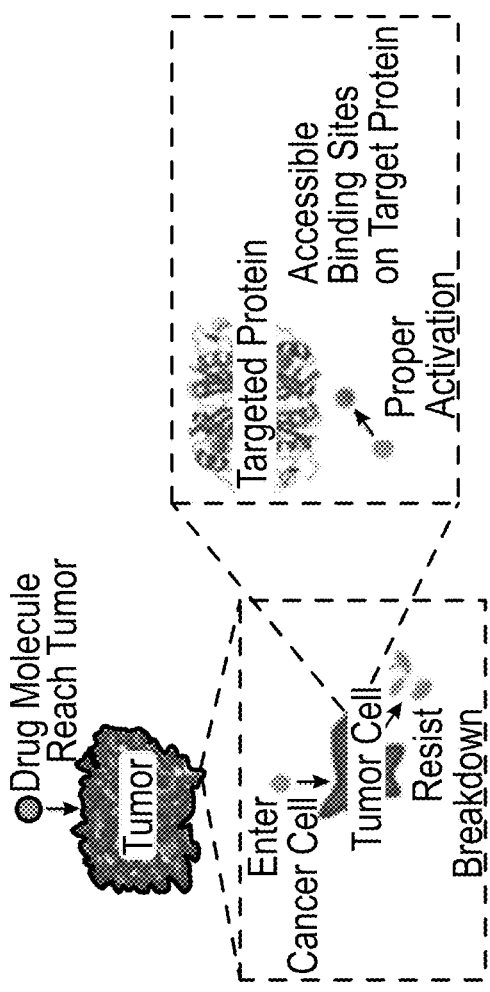
FIGS. 7A-7D depict images of the steps involved in a Cellular Thermal Shift Assay (CETSA). CETSA is used to identify drug targets using lysates, cells and tissues (FIG. 7A). After heating at different temperatures, the soluble fractions are analyzed for changes in the levels of the target protein (FIG. 7B). Binding of the compound can change the temperature at which the protein is denaturalized (FIG. 7C) leading to a change in the thermal melting curve (FIG. 7D).
Figure 7B:
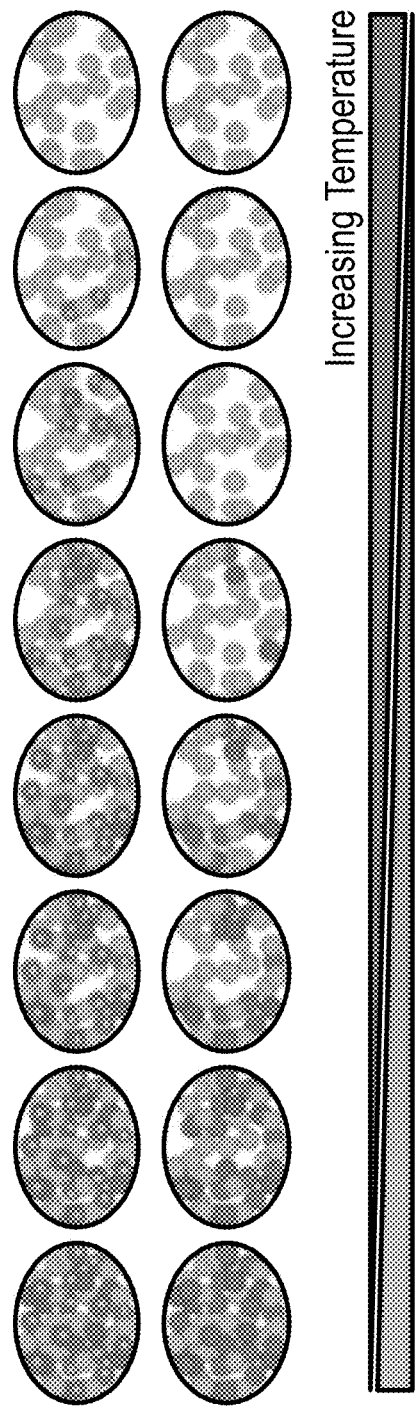
Figure 7C:
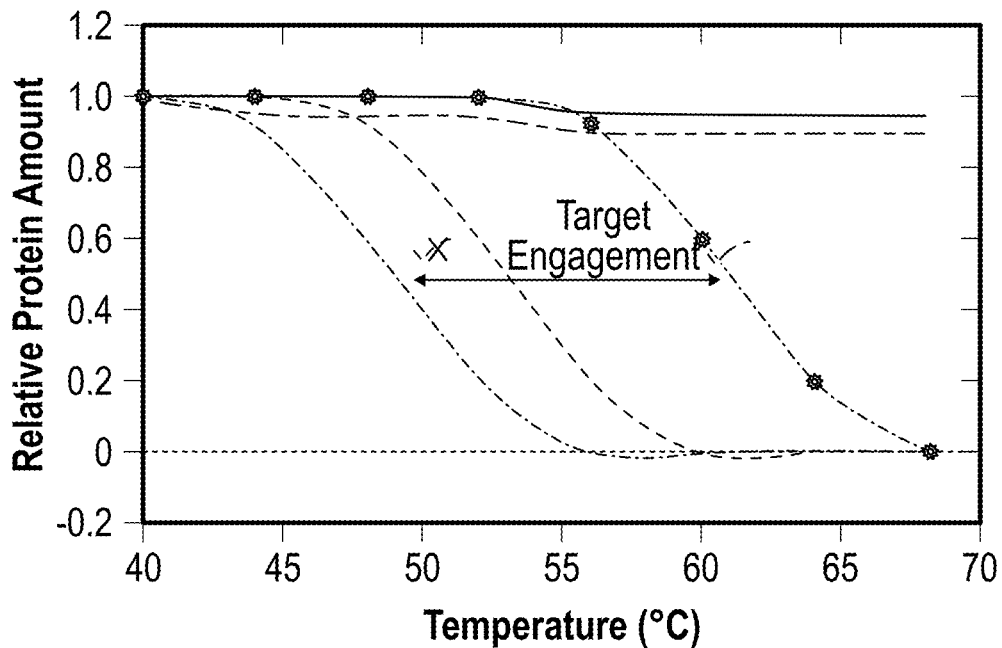
Figure 7D:
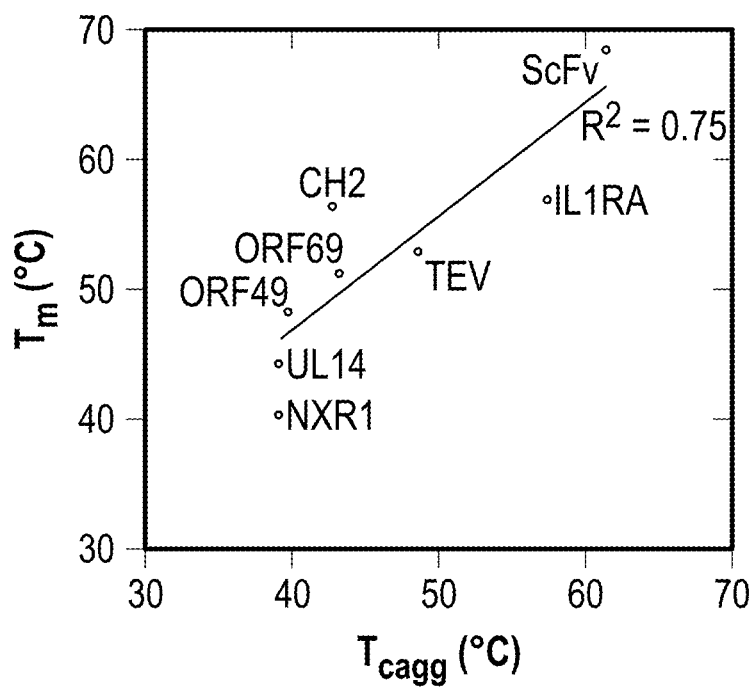

To evaluate whether HODHBt and its analogs were directly binding to STAT5, a recently developed assay, cellular thermal shift assay (CETSA), was used. CETSA is based on the biophysical principle of ligand-induced changes in thermal stability of target proteins. As detailed in Molina & Nordlund, ANNU REVPHARMACOL TOXICOL. 2016; 56:141-61, the disclosure of which is hereby incorporated by reference in its entirety, the CETSA assay has been extensively used to identify drug targets using lysates, cells and tissues (FIG. 7A). After heating at different temperatures, the soluble fractions are analyzed for changes in the levels of the target protein (FIG. 7B). Binding of the compound can change the temperature at which the protein is denaturalized (FIG. 7C) leading to a change in the thermal melting curve (FIG. 7D).

First, it was addressed whether HODHBt induced a thermal shift of STAT5 using cell lysates from 293FT-STAT5A. In this assay, high drug concentrations were used to perform CETSA in cell lysates (10,000-20,000 times the $IC_{50}$). In the primary cell screening method described in Example 1, HODHBt has an $EC_{50}$ of approximately 63 M so it was decided to use 5 mM as a starting concentration. Briefly, cell lysates were incubated with either DMSO or HODHBt for 30 minutes at 25° C. After incubation, lysates were heated from 40° C. to 75° C. in 5 degrees intervals and the insoluble fractions were eliminated by centrifugation.

Figure 8A:
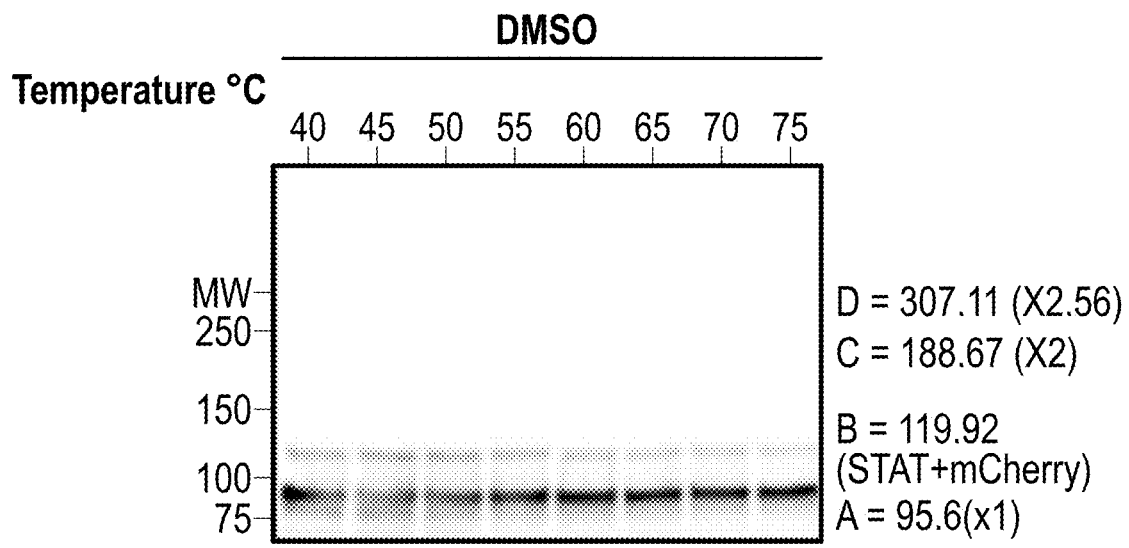
FIGS. 8A-8B depict images of Western blots that show the thermo-stability (as measured by CETSA) of soluble fractions of lysates from 293FT HEK cells expressing STAT5A treated with DMSO (FIG. 8A) or HODHBt (FIG. 8B).
Figure 8B:
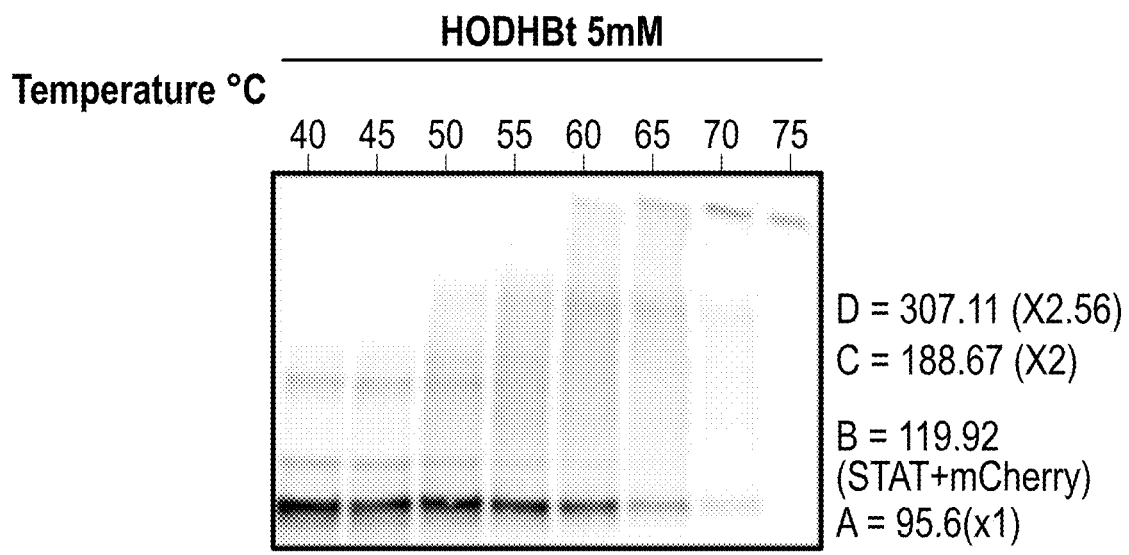
Figure 8C:
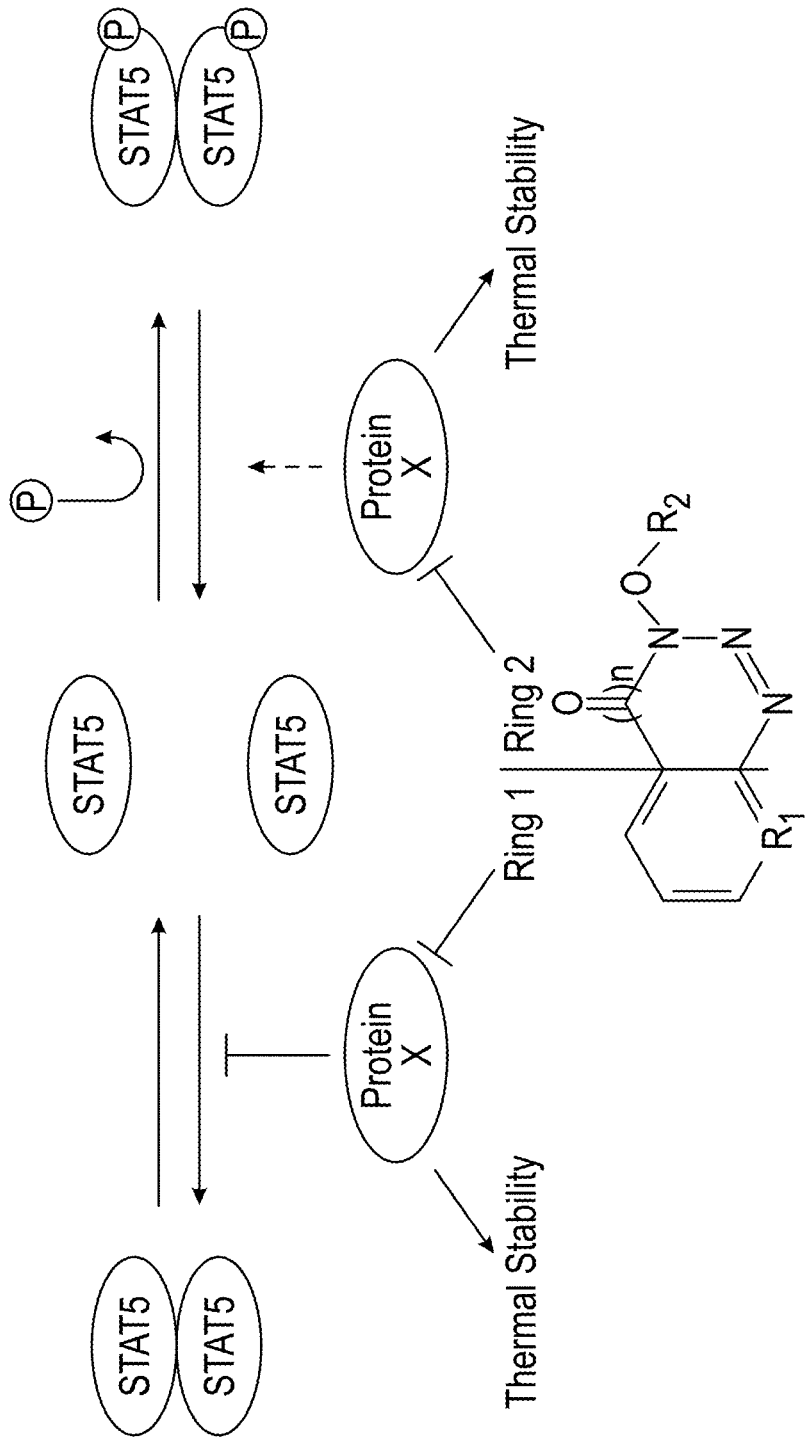
FIG. 8C depicts an image of a signaling cascade model where HODHBt inhibits Protein X and Protein X is required to resolve STAT dimerization and thermal stability of other cellular proteins.

The soluble fractions treated with DMSO (FIG. 8A) or HODHBt (FIG. 8B) were analyzed for the levels of STAT5 by Western blot. STAT5 was highly thermo-stable with minimal protein degradation to temperatures up to 75° C. Interestingly, incubation of lysates with HODHBt drastically changed the thermal melting curve of STAT5, promoting its degradation (FIG. 8B). Also, incubation with HODHBt generated a high molecular band of approximately 188 kDa (FIGS. 8B, B and C), corresponding to the size of STAT5 dimmer. These results suggested that HODHBt may inhibit a protein that it is required to resolve STAT dimerization and that this protein is also involved in thermal stability of proteins, as modeled in FIG. 8C.

Figure 9A:
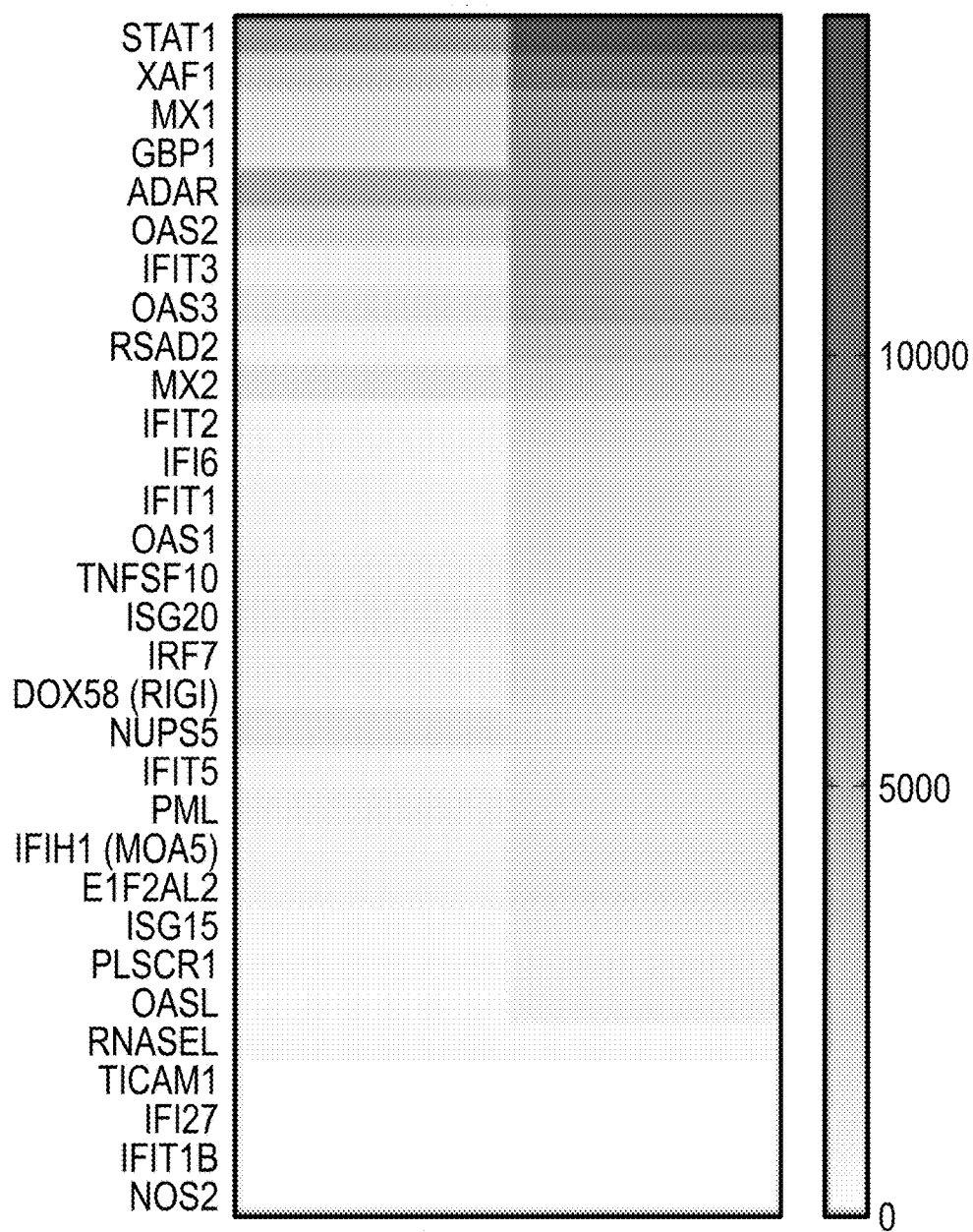
FIG. 9A depicts an image of RNASeq data showing the expression levels of Interferon Stimulated Genes (ISGs) induced in human primary CD4 T cells following treatment with IL-2 and DMSO or IL-2 and HODHBt.

Example 4. Targeted STAT TSUMOylation Increases the Level of Interferon Stimulated Genes RNASeq was performed in primary CD4 T cells treated with HODHBt following the method of Bosque et al., CELL REP. 2017; 18(5):1324-1334, the disclosure of which is hereby incorporated by reference in its entirety. The resulting RNASeq data showed induction of several Interferon Stimulated Genes (ISGs) (FIG. 9A).

Figure 9B:
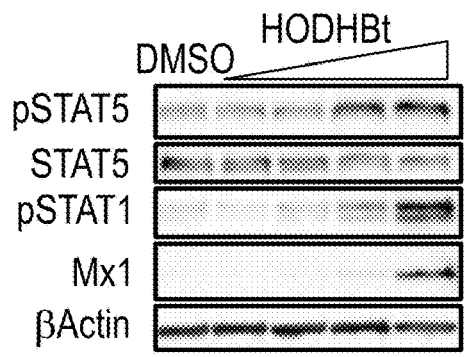
FIG. 9B depicts an image of a representative Western blot of human primary CD4 T cells treated with HODHBt in a dose dependent manner where the cells are probed for STAT 5 phosphorylation (pSTAT5), total STAT5 protein (STAT5), STAT 1 phosphorylation (pSTAT1), and myxovirus resistance 1 (Mx1). Western blots were normalized to a β-actin loading control.

The RNASeq data was confirmed by Western blotting of primary CD4 T cells treated with increased concentrations of HODHBt. As shown in FIG. 9B, increased concentrations of HODHBt increased the levels of phosphorylated STAT1 and STAT5 as well as the levels of the ISG, myxovirus resistance 1 (Mx1). These results supported the claim that targeting STAT SUMOylation can increase ISGs and promote an antiviral response in cells.

Example 5. HODHBt Increased Expansion of CD4 and CD8 T Cells

Expansion of CD4 and CD8 T cells is important when mounting an immune response against pathogens or tumoral cells. Hence, increasing the expansion of both CD4 and CD8 T cells can help fighting several diseases. As such, tests were performed to determine whether inhibition of STAT SUMOylation by HODHBt can enhance immune responses in vitro.

Figure 10A:
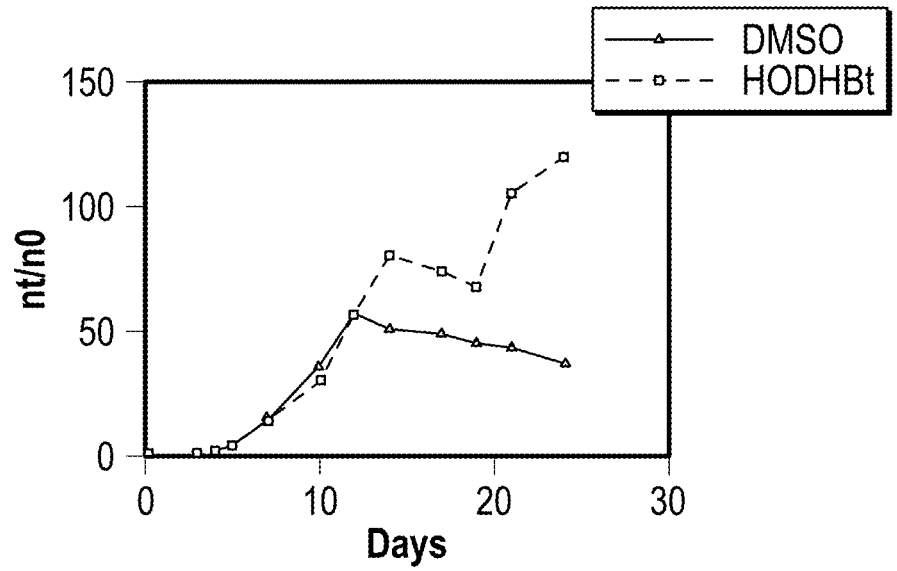
FIGS. 10A-10B depict graphs showing an enhanced rate of expansion of polyclonally activated CD4 (FIG. 10A) and CD8 (FIG. 10B) T cells following treatment with HODHBt (red) over the rate of DMSO-treated cells (blue).
Figure 10B:
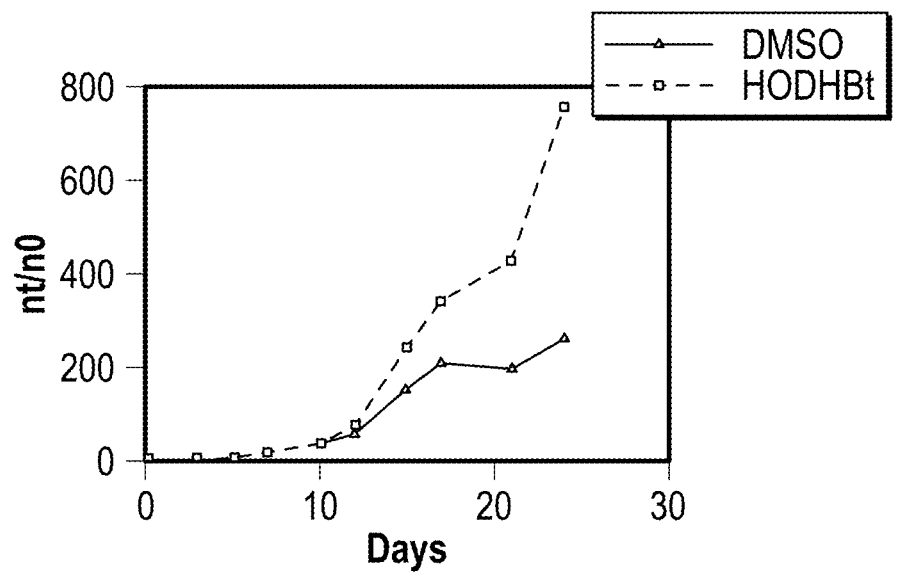

For these tests, human CD4 and CD8 T cells were activated in vitro and expanded with interleukin-2 (IL-2) in the presence of DMSO (control vehicle) or HODHBt. HODHBt increased expansion of both CD4 (FIG. 10A) and CD8 (FIG. 10B) T cells. Some immunotherapy strategies rely on the in vitro expansion of the own patient CD4 and CD8 T cells specific against a tumoral or a viral antigen. These data suggested that inhibiting SUMOylation of STATs with HODHBt or derivatives can enhance the proliferation of T cells, thus supporting methods of expansion of these cells for immunotherapy strategies.

Figure 11A:
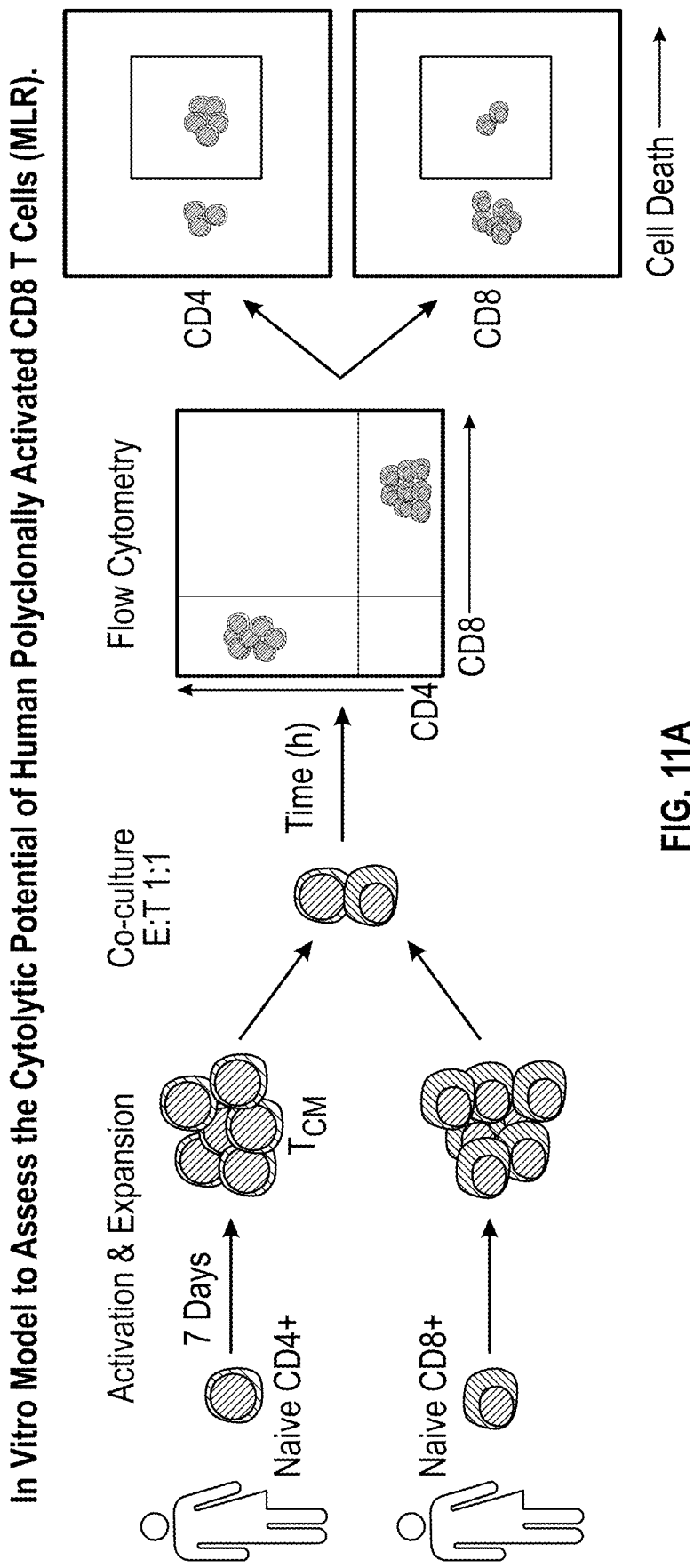
FIG. 11A depicts a schematic of an in vitro model used to assess the cytolytic potential of human polyclonally activated CD8 T cells.

An in vitro model to assess the cytolytic potential of human polyclonally activated CD8 T cells was developed. This model relied on the concept of a mix-lymphocyte reaction (MLR) in which CD8 T cells recognize CD4 T cells from a different donor as foreign and induced their killing (FIG. 11A). In this model, polyclonally activated CD8 T cells were co-cultured with polyclonally activated CD4 T cells from a different donor at an effector:target ratio (E:T) of 1:1. Cell death in both CD4 and CD8 subsets was measured at different time points using a fixable viability dye.

Figure 11B:
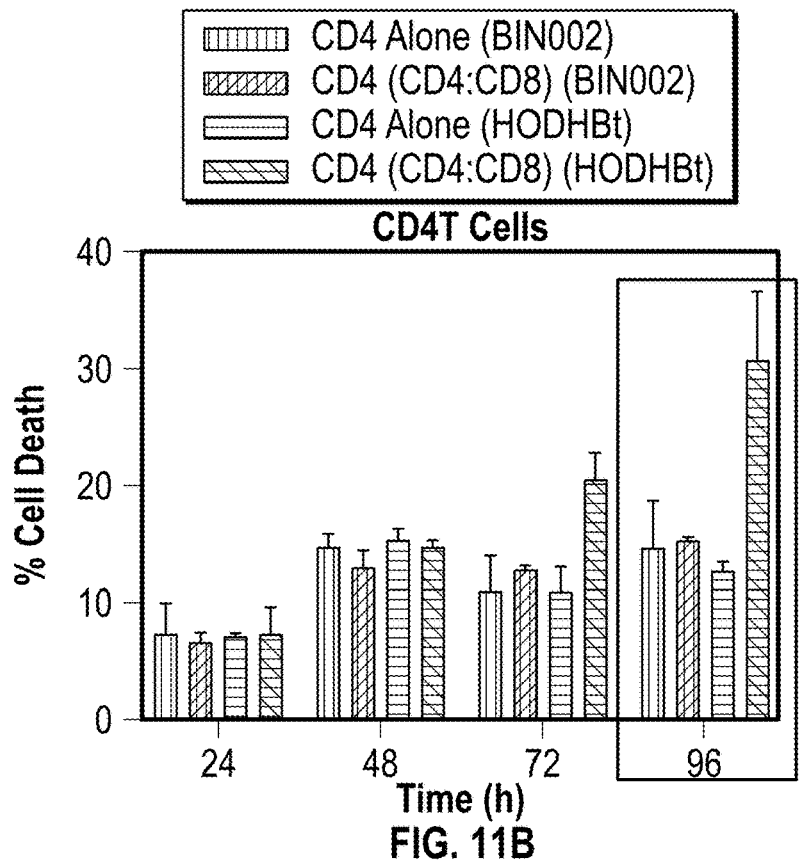
FIGS. 11B-11C depict bar graphs showing the percent cell death in human polyclonally activated CD4 T cells (FIG. 11B) and CD8 T cells (FIG. 11C) at increasing time intervals after treatment with BIN002, an inactive derivative of HODHBt, or HODHBt.
Figure 11C:
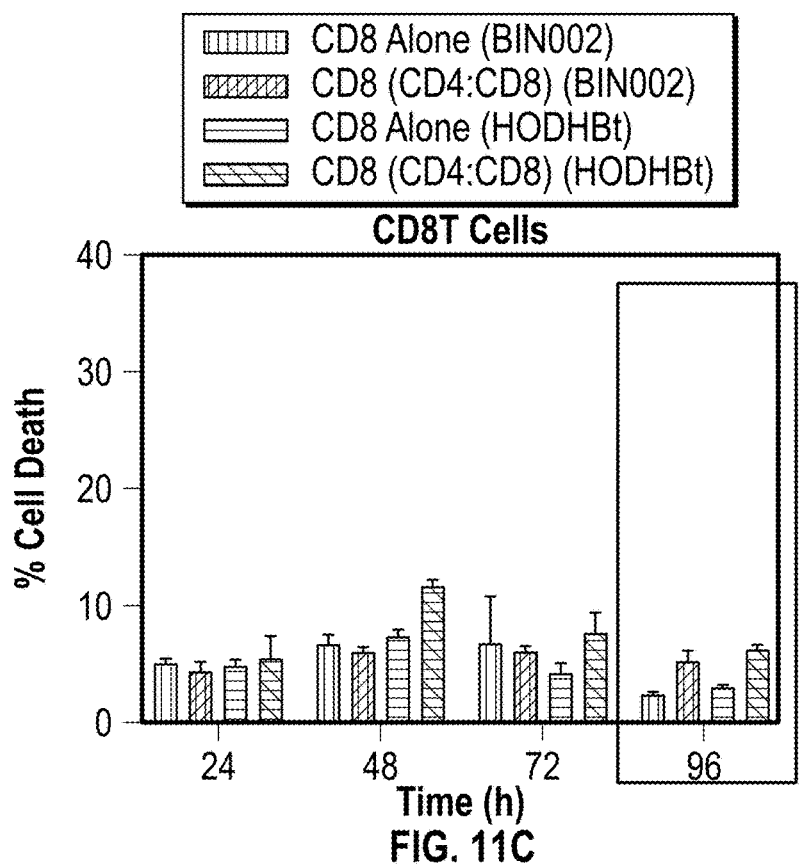

As shown in FIG. 11B, CD4 T cell death was detected only in the co-culture treated with HODHBt at 72 hours and 96 hours. Importantly, there was no increase in cell death in CD8 T cells in any of the experimental conditions (FIG. 11C). This result suggested that HODHBt and its analogs can enhance the expansion and cytotoxic activity of CD8T cells.

Figure 12:
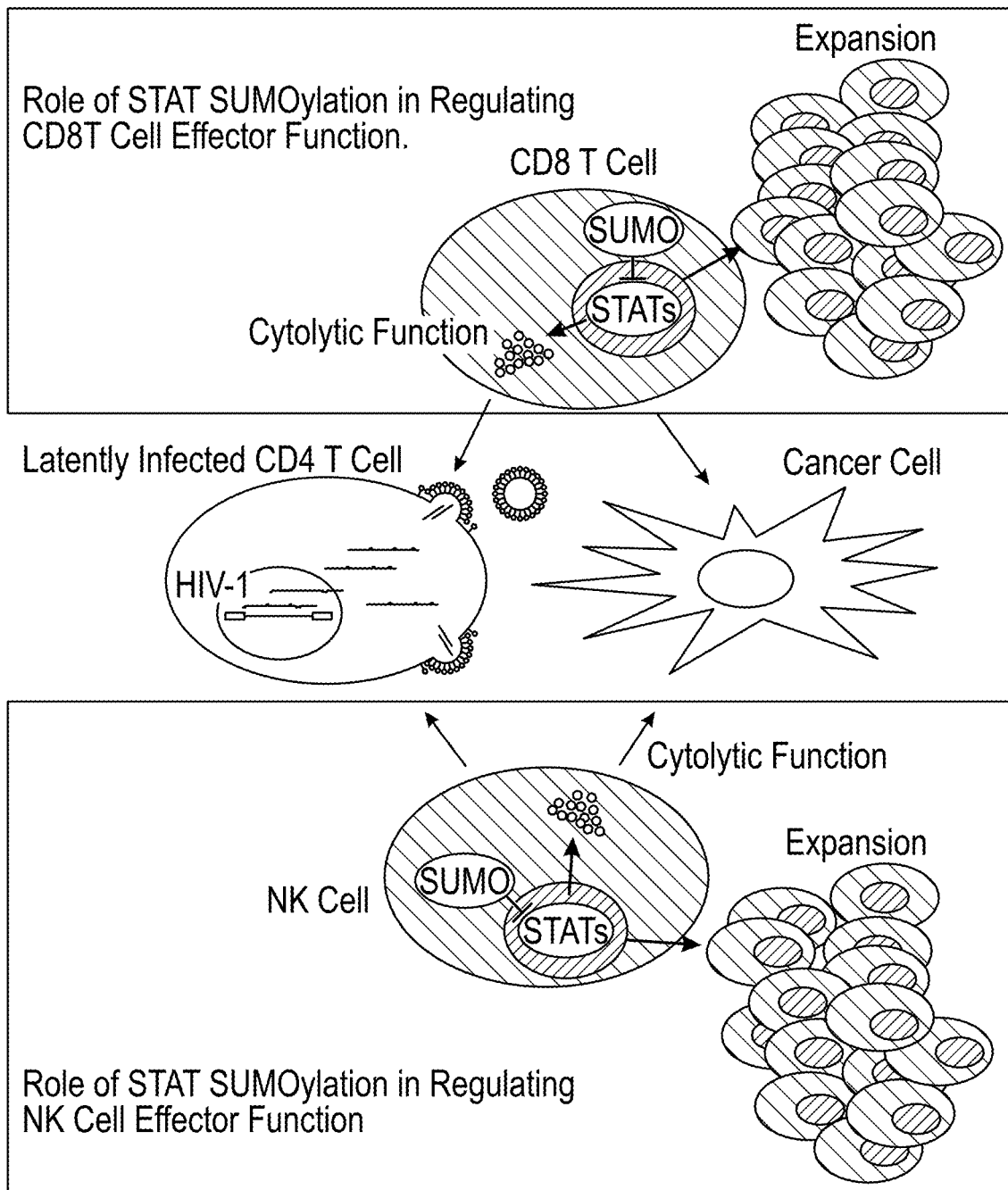
FIG. 12 depicts an image of a diagram outlining the roles of STAT SUMOylation in regulating the effector functions of CD8 T cells and NK cells.

Example 6. HODHBt Modulation of CD8 T Cell Responses Through Enhanced Gene Expression STATs playa major role in the control CD8 T cell responses (FIG. 12). Studies have shown that expression of a constitutively active form of STAT5 in murine CD8 T cells promoted the expression of genes controlling effector molecules, proliferation, tissue homing as well as transcription factors required for CD8 T cell function like T-bet and Eomes. In the context of HIV infection, several studies have shown a defect on STAT5 activation on HIV-infected patients. These results suggested that poor STAT5 activation in HIV patients may impact CD8 T cell responses in HIV infection and that increasing STAT5 activity by inhibiting STAT SUMOylation may overcome some of these defects.

Figure 13A:
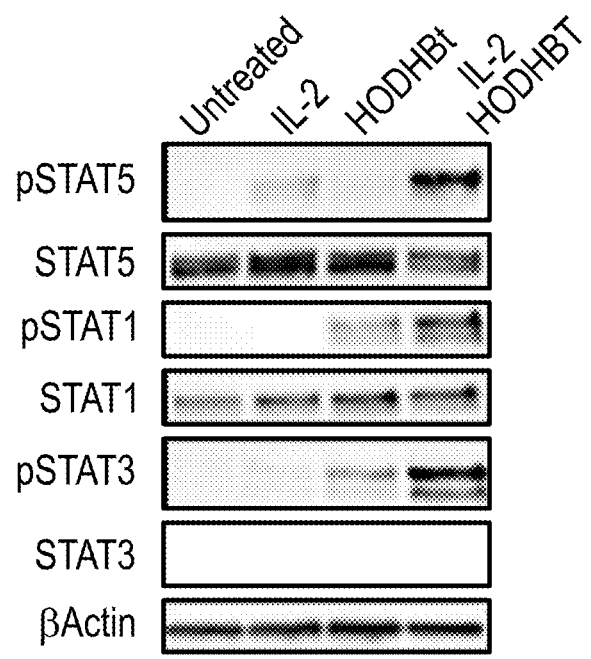
FIG. 13A depicts an image of a representative Western blot of polyclonally activated CD8 T cells cultured with IL-2 in the presence or absence of HODHBt probed for phosphorylated STAT5 (pSTAT5), total STAT5, phosphorylated STAT1 (pSTAT1), total STAT1, phosphorylated STAT3 (pSTAT3), and total STAT3. Western blots were normalized to a β-actin loading control.

To address whether SUMOylation controls STAT activation in human CD8 T cells, polyclonally activated CD8 T cells were cultured with IL-2 in the presence or absence of HODHBt and levels of phosphorylated STATs were measured by Western blot. As shown in FIG. 13A, HODHBt increased the levels of phosphorylation of STAT5 after IL-2 treatment. Furthermore, HODHBt alone increased the phosphorylation levels of both STAT1 and STAT3, and enhanced those induced by IL-2 (FIG. 13A). Proliferation of CD8 T cells is dependent on the activation and phosphorylation of STAT5. As shown in FIGS. 14A-14E, the presence of HODHBt enhanced the expansion of polyclonally activated CD8 T in 5 human donors.

Figure 13B:
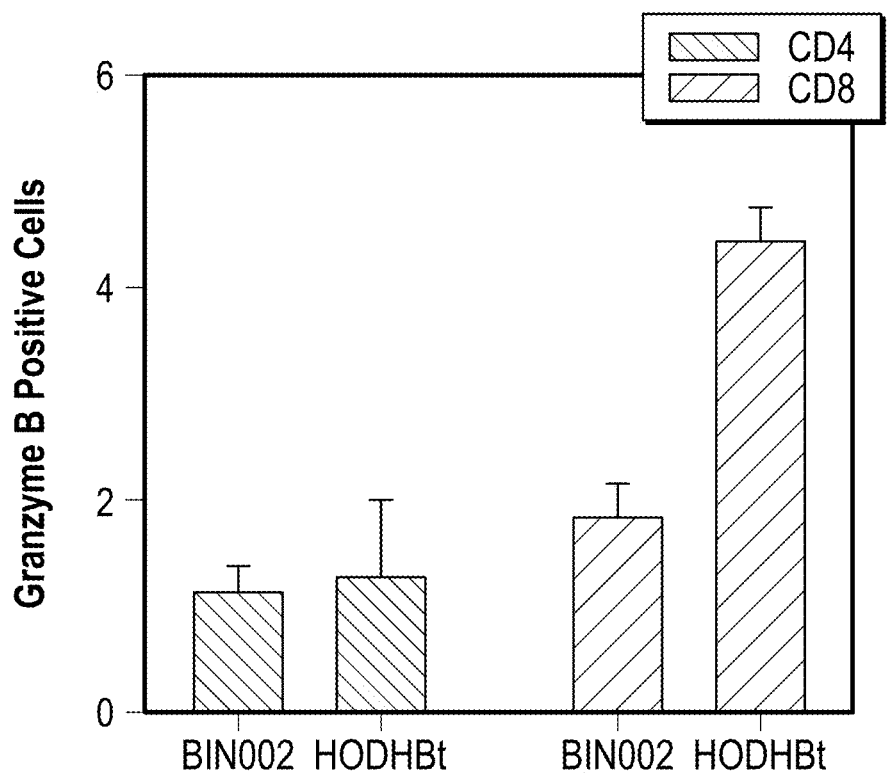
FIG. 13B depicts a bar graph showing the percentage of granzyme B (Gzm B) positive CD4 and CD8 T cells following treatment with HODHBt or BIN002, an inactive derivative of HODHBt.

Granzyme B (Gzm B) is a serine protease most commonly found in the granules of cytotoxic lymphocytes (CTLs), natural killer cells (NK cells) and cytotoxic T cells. It is secreted by these cells along with the pore forming protein perforin to mediate apoptosis in target cells (either infected or tumoral). The Gzm B promoter has STAT5 binding sites so it was hypothesized that inhibition of STAT SUMOylation may increase the levels of Gzm B in effector cells. As shown in FIG. 13B, treatment with HODHBt increased the levels of Gzm B in CD8 T cells but not in CD4 T cells. Further, treatment of CD8 T cells and CD4 T cells with BIN002, an inactive derivative of HODHBt, did not affect Gzm B levels (FIG. 13B).

Figure 13C:
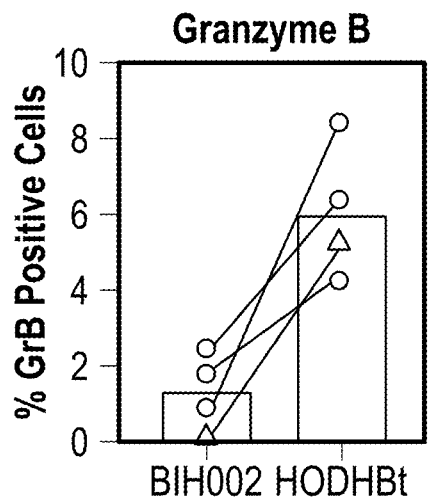
FIGS. 13C-13D depict graphs showing the percentage of Gzm B positive cells (FIG. 13C) and the amount of TRAIL (TNF-related apoptosis-inducing ligand) per cell (FIG. 13D) in activated CD8 T cells that were cultured for three days in the presence of HODHBt or BIN002, an inactive derivative of HODHBt.
Figure 13D:
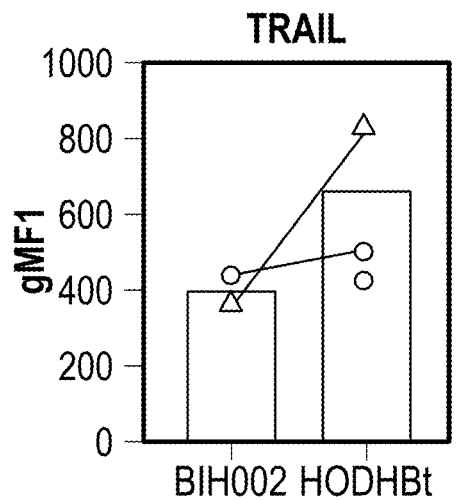
Figure 14A:
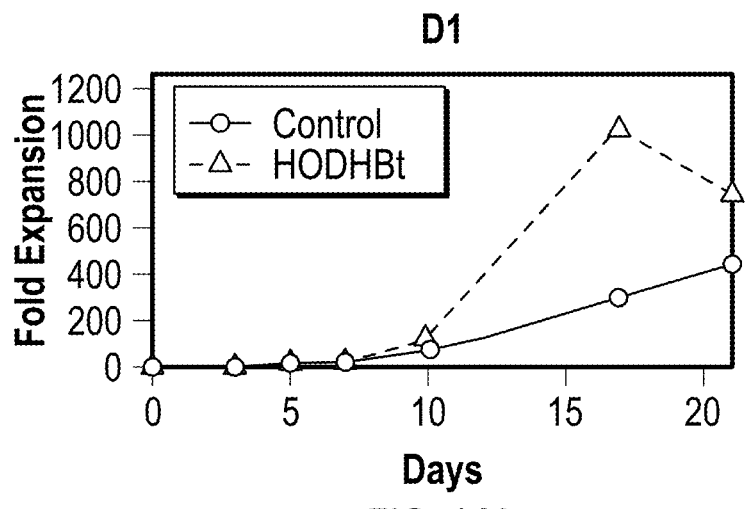
FIGS. 14A-14E depict graphs showing HODHBt-enhanced ex vivo expansion of polyclonally activated CD8 T cells harvested from human donor 1 (FIG. 14A), human donor 2 (FIG. 14B), human donor 3 (FIG. 14C), human donor 4 (FIG. 14D), and human donor 5 (FIG. 14E) as compared to untreated polyclonally activated CD8 T cells harvested from the respective human donor.
Figure 14B:
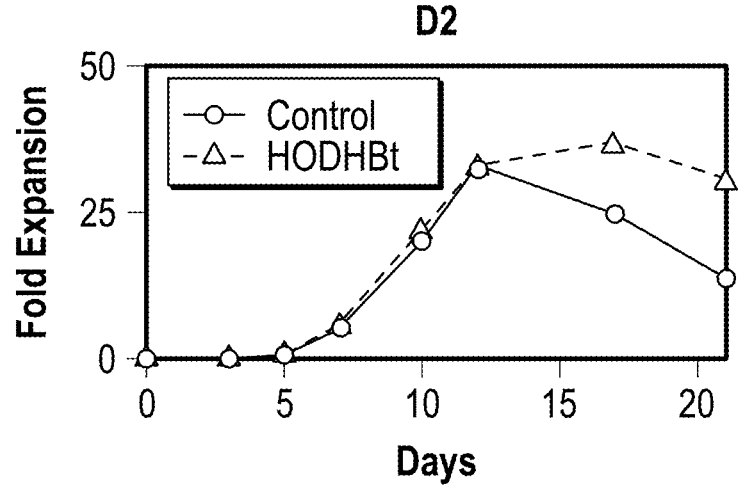
Figure 14C:
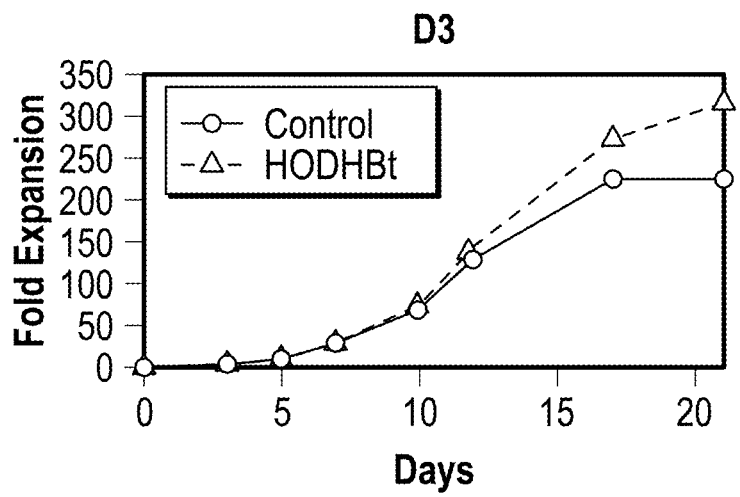
Figure 14D:
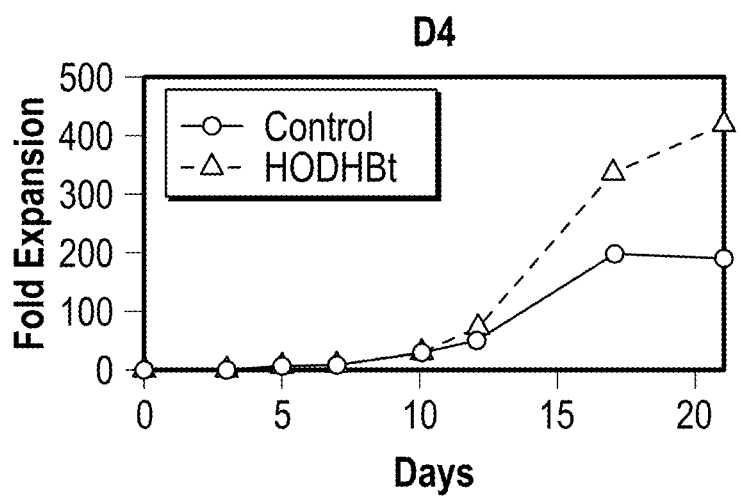
Figure 14E:
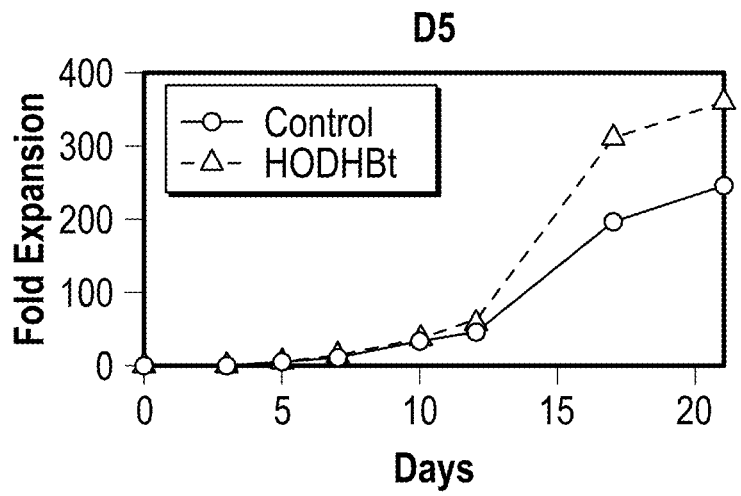

To test whether inhibiting STAT SUMOylation alters the expression of proteins involved in effector function, CD8 T cells were activated and cultured for three days in the presence of HODHBt or BIN002. The presence of HODHBt increased the levels of expression of the cytotoxic molecules Granzyme B (FIG. 13C) and TRAIL (TNF-related apoptosis-inducing ligand) (FIG. 13D) in agreement with the presence of STAT5 binding sites in their promoter.

Figure 15A:
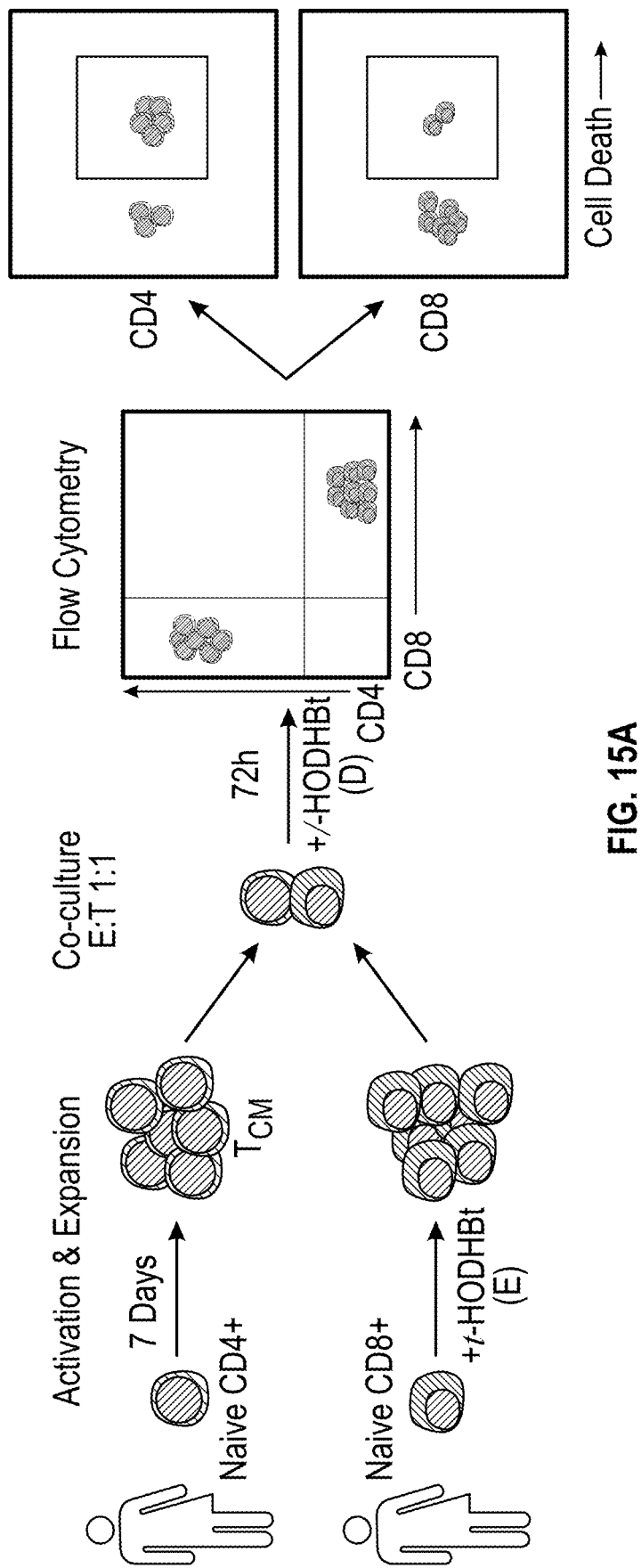
FIG. 15A depicts a schematic of an in vitro model used to assess the cytolytic potential of human CD8 T cells.
Figure 15B:
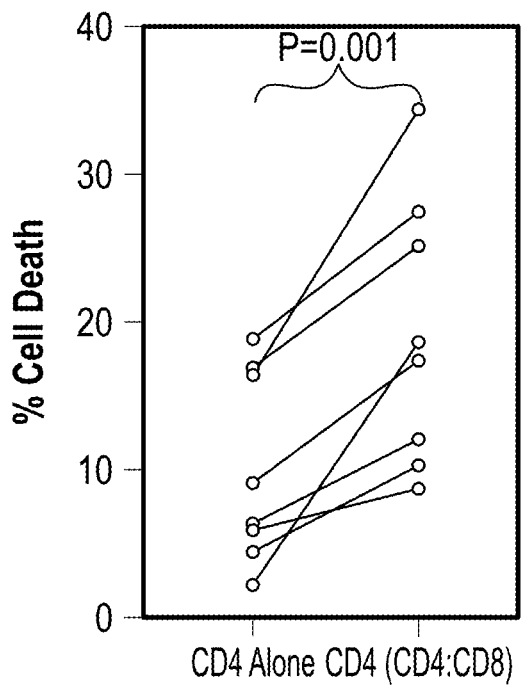
FIGS. 15B-15E depict graphs showing: CD4 T cell death in the presence of allogenic CD8 T cells (FIG. 15B); CD8 T cell death in the presence of allogenic CD4 T cells (FIG. 15C); the killing capacity of CD8 T cells over $T_{CM}$ cells treated with increasing concentrations of HODHBt (FIG. 15D); and CD8 T cell ex vivo expansion in the presence and absence of HODHBt (FIG. 15E).
Figure 15C:
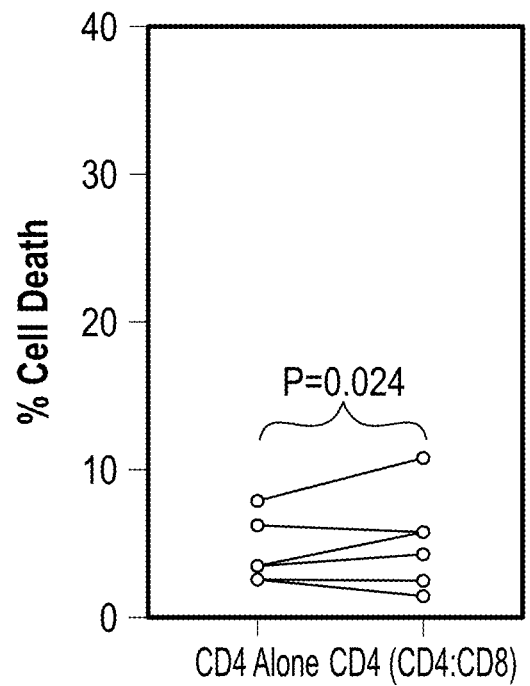
Figure 15D:
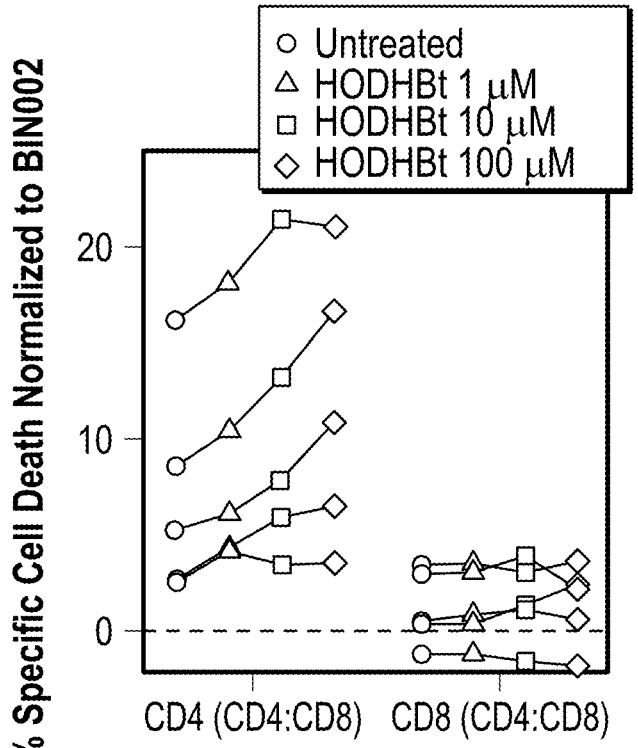

As inhibiting STAT SUMOylation increased the levels of two cytotoxic molecules, GZMB and TRAIL (FIGS. 13C and 13D), those results suggested that by inhibiting STAT SUMOylation, there will be an increase in the cytolytic function of CD8 T cells. To test this hypothesis, polyclonally activated CD8 T cells were co-cultured with polyclonally activated CD4 T cells from a different donor to resemble a mixed-lymphocyte reaction (MLR) at an effector:target ratio (E:T) 1:1 (FIG. 15A). CD4 T cells were activated in conditions that generate central memory CD4 T cells ($T_{CM}$) cells. CD4 $T_{CM}$ are more resistant to apoptosis than other subsets of CD4 T cells. Cell death in both CD4 and CD8 subsets was measured at 72 hours using a fixable viability dye. Specifically, polyclonally activated CD4 T cells and CD8 T cells were co-cultured and cell death was measured at 72 hours. As shown in FIG. 15B, CD4 T cell death increased in the presence of allogenic CD8 T cells in 10 out of the 10 donor-pairs tested (Compare CD4 Alone vs CD4 (CD4:CD8)). Although an increase in CD8 T cell death was observed during the co-culture with allogenic CD4 T cells, this was less pronounced and it was not observed in all the donor pairs (FIG. 15C). Using this assay, it was tested whether HODHBt increased the cytolytic capacity of CD8 T cells in two experimental set ups. In the first experimental set up, HODHBt was added during the MLR reaction, which shows the potential utility of the STAT SUMOylation inhibitor in "shock and kill" strategies. As shown in FIG. 15D, HODHBt increased the killing capacity of CD8 T cells over $T_{CM}$ cells in a dose dependent manner with no overt toxicity on CD8 T cells.

Figure 15E:
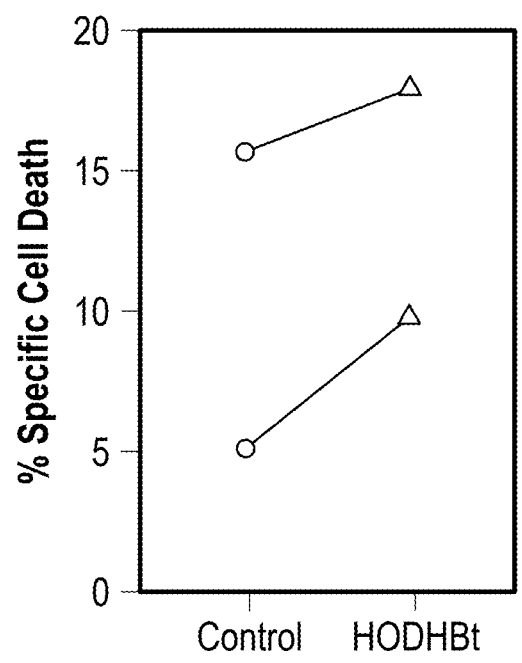

In the second experimental set up, CD8 T cells were expanded in the presence of HODHBt, showing the beneficial effects of the STAT SUMOylation inhibitor in potential "immunotherapy" approaches. The data suggested that HODHBt can condition CD8 T cells to have a higher killing capacity (FIG. 15E).

Example 7. HODHBt Modulation of NK Cell Responses Through Enhanced Gene Expression NK cells are part of the innate immune system and play important roles in controlling infections, for example HIV. Like in CD8 T cells, STAT proteins have been shown to play an important role in NK function. For example, STAT1 is required for NK-cell cytolytic function as well as IFN-γ production. STAT4 mediates IFN-γ induction after IL-12 treatment. STAT5 has been proposed as the NK-cell master regulator and plays a role NK-cell maturation, survival and cytotoxicity. However, how SUMOylation of STATs is controlling any of these functions in NK cells and whether inhibiting STAT SUMOylation may enhance NK activity against HIV infected cells were unknown.

Figure 16A:
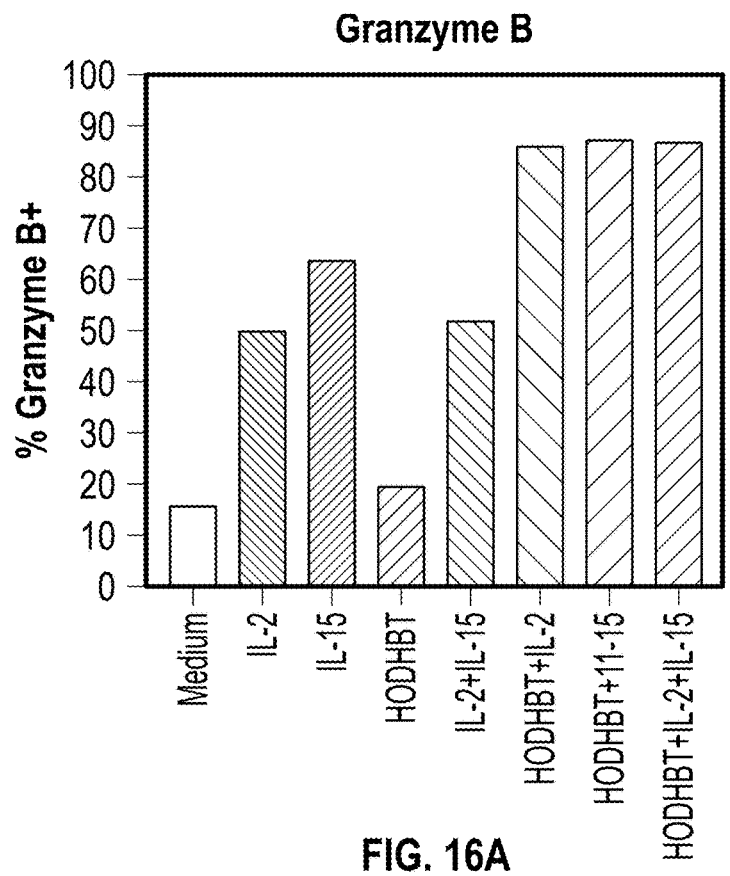
FIGS. 16A-16B depict bar graphs showing increased Gzm B expression in NK cells as a percentage of cells (FIG. 16A) and as the amount of granzyme per cell (MFI, FIG. 16B) after NK cells were isolated from a human donor and then incubated for 3 days with either IL-2, IL-15, HODHBt, IL-2+IL-15, HODHBt+IL-2, HODHBt+IL-15, or HODHBt+IL-2+IL-15.
Figure 16B:
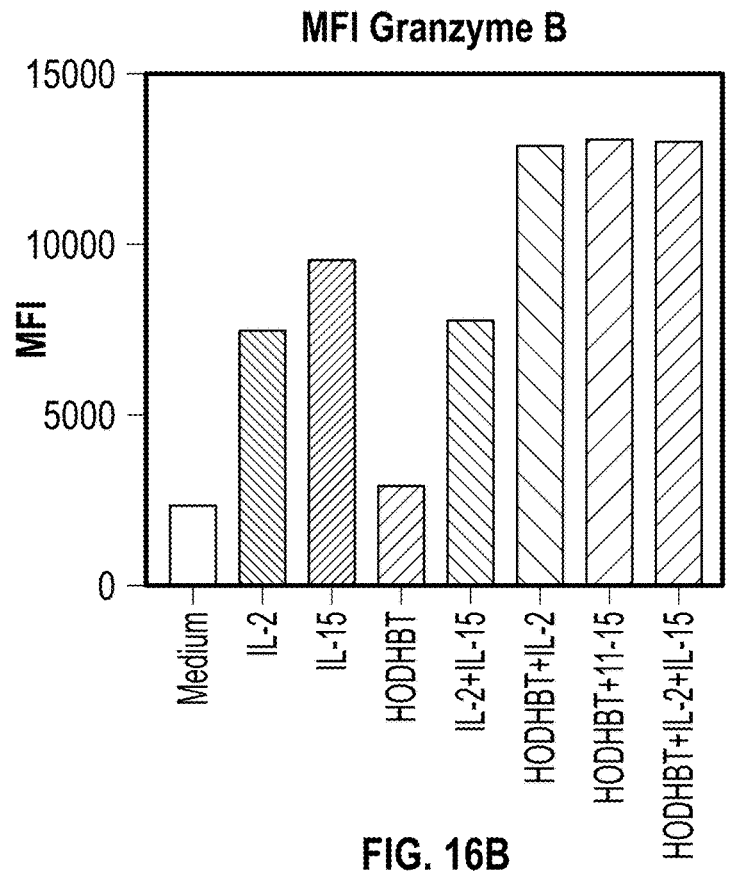

To determine if STAT SUMOylation increases Gzm B expression in NK cells, isolated human NK cells were analyzed after a 3-day incubation with either IL-2, IL-15, HODHBt, IL-2+IL-15, HODHBt+IL-2, HODHBt+IL-15, or HODHBt+IL-2+IL-15. As shown in FIGS. 16A and 16B, HODHBt increased Gzm B expression in NK cells treated with IL-2, IL-15 or a combination of both. The increased Gzm B expression in NK cells was observed as a percentage of cells (FIG. 16A) as well as the amount of granzyme per cell (MFI, FIG. 16B).

Figure 17A:
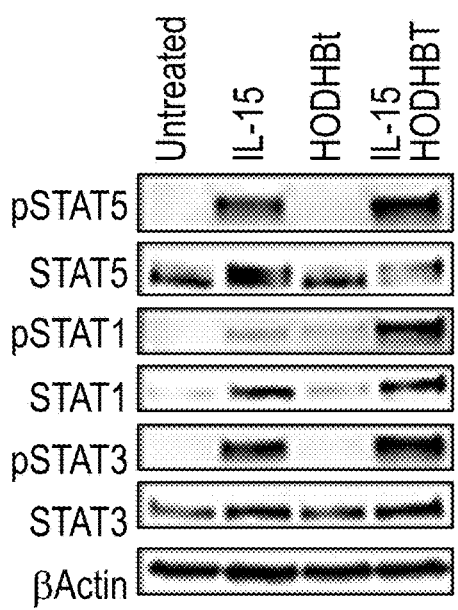
FIG. 17A depicts an image of a representative Western blot of NK cells cultured with or without IL-15 in the presence or absence of HODHBt probed for phosphorylated STAT5 (pSTAT5), total STAT5, phosphorylated STAT1 (pSTAT1), total STAT1, phosphorylated STAT3 (pSTAT3), and total STAT3. Western blots were normalized to a β-actin loading control.

Next, NK cells were cultured with IL-15 in the presence or absence of HODHBt and levels of phosphorylated STATs were measured by Western blot. As shown in FIG. 17A, HODHBt increased the levels of phosphorylation of STAT5 after IL-15 treatment. Furthermore, HODHBt alone increased the phosphorylation levels of STAT1, and enhanced the levels of phosphorylation of STAT1 and STAT3 induced by IL-15 (FIG. 17A).

Figure 17B:
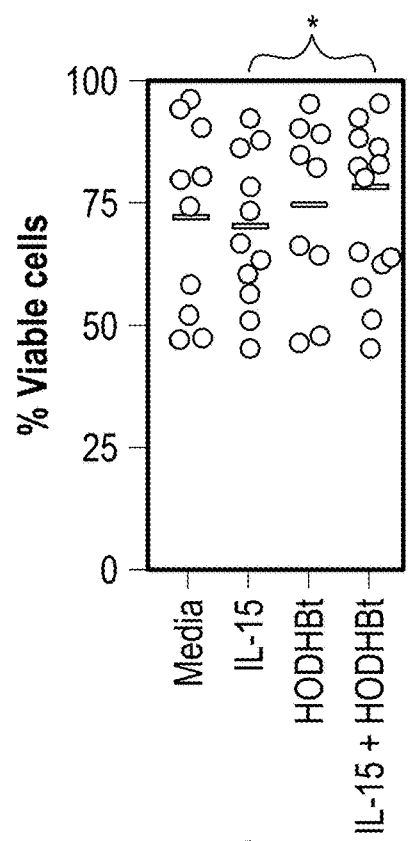
FIGS. 17B-17D depict graphs showing cell viability (FIG. 17B), percent of cells expressing CD69 (FIG. 17C), and percent of cells expressing CD25 (FIG. 17D) in NK cells that were isolated from a human donor and then incubated for 3 days with either medium, IL-15, HODHBt, or HODHBt+IL-15.
Figure 17C:
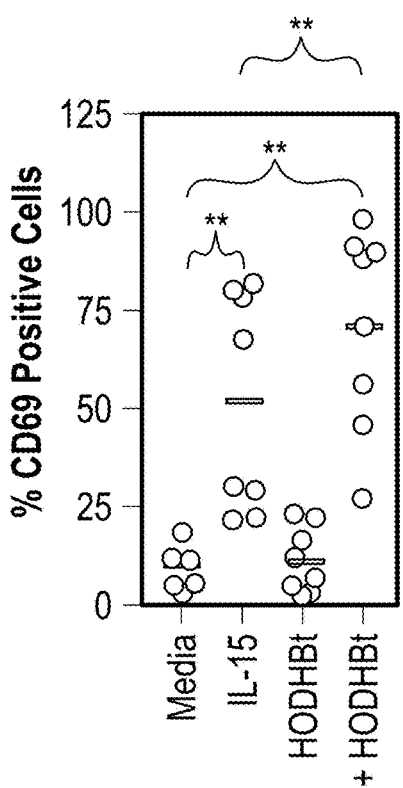
Figure 17D:
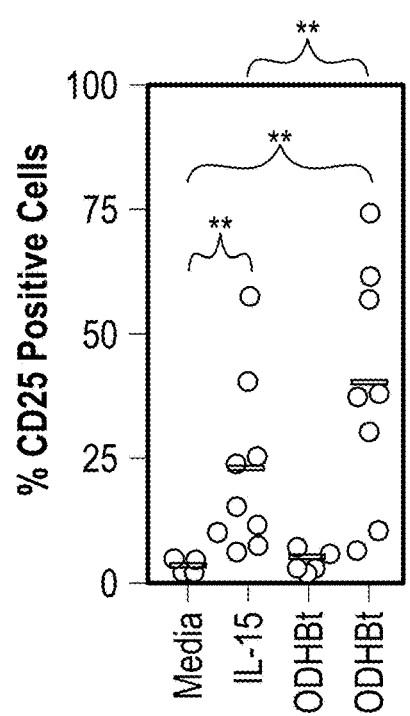
Figure 17E:
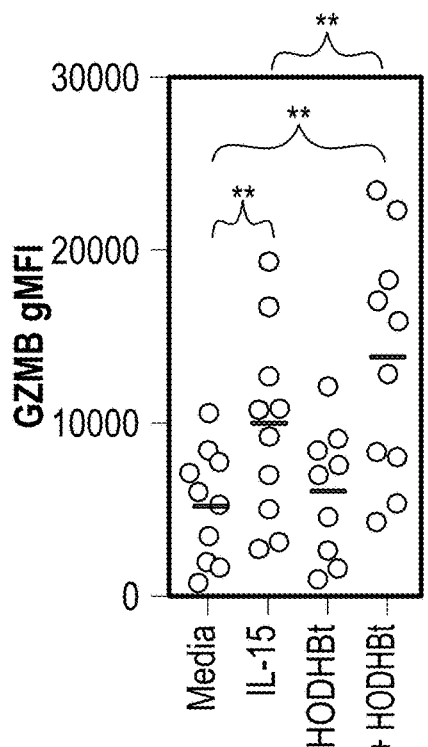
FIGS. 17E-17F depict graphs showing increased Gzm B expression in NK cells as the amount of granzyme per cell (MFI, FIG. 17E), and as a percentage of cells (FIG. 17F) after isolated human NK cells were incubated for 3 days with either medium, IL-15, HODHBt, or HODHBt+IL-15.
Figure 17F:
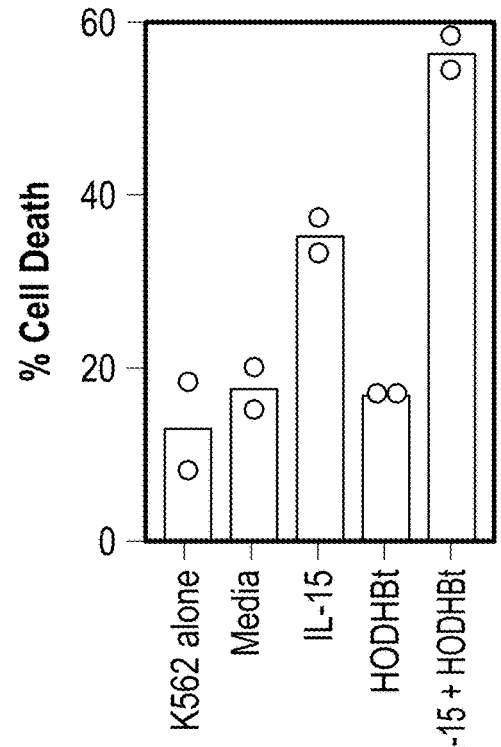

To further characterize the effects of STAT SUMOylation inhibition in NK cell function, primary human NK cells were isolated and cultured with IL-15 in the presence or absence of HODHBt. 48 hours later, cells were phenotyped by flow cytometry. First, it was observed that HODHBt did not affect the viability of NK cells either alone or in combination with IL-15 (FIG. 17B). Second, CD69 and CD25, activation markers known to be upregulated in NK cells after IL-15 treatment and are important for the cytotoxic activity of NK cells, were stained for. As expected, IL-15 induced the surface expression of CD69 (FIG. 17C) and to a lesser extent CD25 (FIG. 17D). HODHBt alone did not change the surface expression of CD69 (FIG. 17C) or CD25 (FIG. 17D). HODHBt in combination with IL-15 enhanced the expression of both surface markers over IL-15 alone (FIGS. 17C and 17D). Further, IL-15 increased the expression of GZMB, while HODHBt alone did not have any effect over media control (FIG. 17E). The combination of IL-15 and HODHBt greatly increased the expression of GZMB (FIG. 17E). In sum, HODHBt enhanced IL-15-induced expression of cytotoxic and activation markers, suggesting that inhibition of STAT SUMOylation enhances the cytolytic function of NK cells.

To characterize the induction of other proteins known to be important for the cytolytic activity of NK cells, primary human NK cells were isolated from 6 male and 6 female donors and cultured with IL-15 in the presence or absence of HODHBt. 48 hours later, levels of Granzyme A (FIG. 18A), Perforin (FIG. 18B), Granulysin (FIG. 18C), TRAIL (FIG. 18D) and Fas ligand (FASL) (FIG. 18E) were analyzed by flow cytometry. IL-15 induced the expression of all these genes and the combination of IL-15 and HODHBt enhanced gene expression above IL-15 control (FIGS. 18A-18E). These results supported the hypothesis that HODHBt enhances the cytolytic capacity of NK cells by increasing the expression of different proteins involved in this process.

Figure 17G:
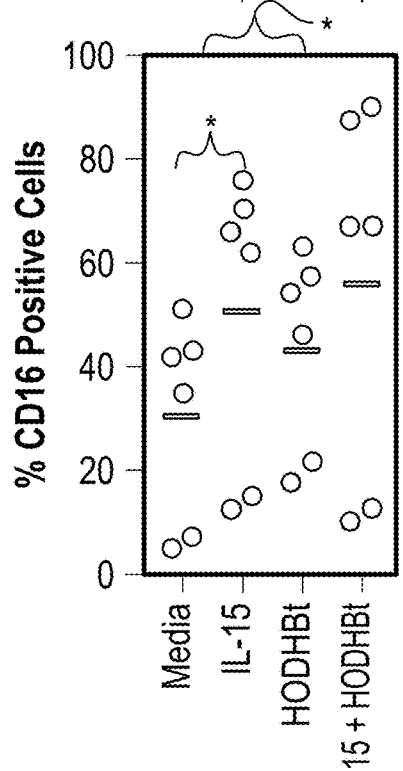
FIGS. 17G-17H depict graphs showing the amount of CD16 (FIG. 17G) and surface expression of CXCR5 (FIG. 17H), as measured by flow cytometry, of isolated human NK cells that were incubated for 3 days with either medium, IL-15, HODHBt, or HODHBt+IL-15.

Antibody-dependent cell-mediated cytotoxicity (ADCC) is mediated by the recognition of an antibody bound to a cell through an Fc receptor present in NK cells, mostly CD16 (FCGR3A). To address whether inhibiting STAT SUMOylation alters CD16 expression in the surface of NK cells, freshly isolated NK cells were treated with either IL-15, HODHBt or a combination of both for 48 hours and surface expression of CD16 was measured by flow cytometry. Interestingly, HODHBt was sufficient to increase the levels of CD16 expression in NK cells independent of the presence of IL-15 (FIG. 17G). Based on these data, it can be expected that inhibiting SUMOylation with HODHBt enhances, for example, human primary NK killing of both cancer cells as well as HIV-infected CD4 T cells by ADCC.

Figure 17H:
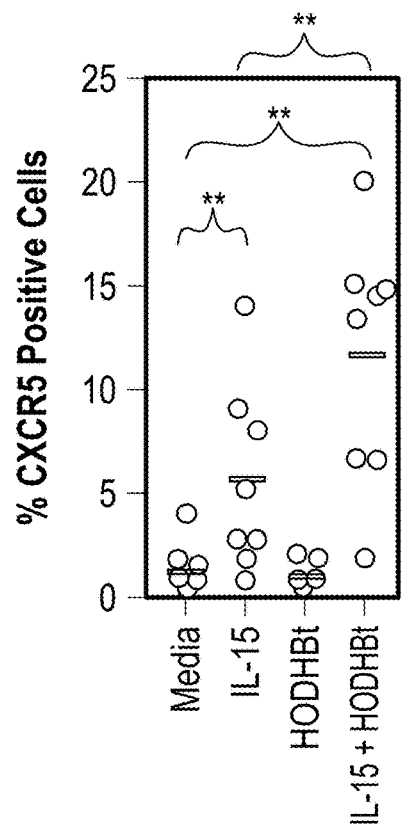
Figure 18D:
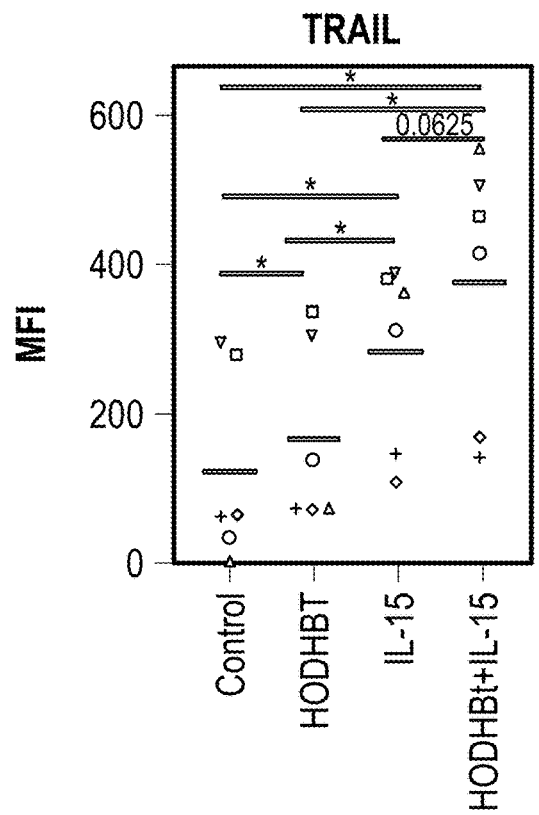
Figure 18E:
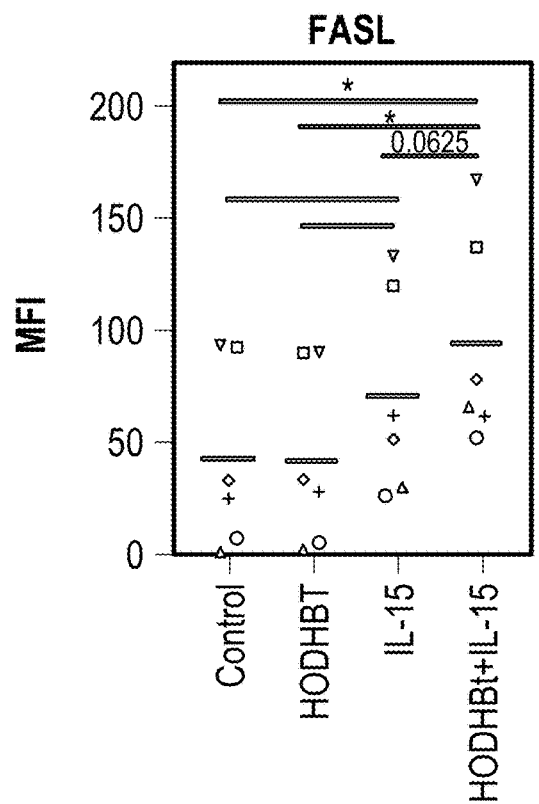

Since IL-15 activated STATs, it was hypothesized that STATs, and in particular STAT1, was controlling expression of CXCR5 (C—X—C Motif Chemokine Receptor 5) and that inhibiting STAT SUMOylation enhances CXCR5 expression and promotes migration towards a CXCL13 (C—X—C Motif Chemokine Ligand 13) gradient. CXCL13 controls homing of lymphocytes to follicles in lymph nodes; however whether this mechanism of regulation exists in human NK cells and whether IL-15 controls expression were unknown. To address which one of the two scenarios was potentially playing a role in the presence of NK cells within the follicles, human NK cells were treated with IL-15, HODHBt or a combination of both for 48 hours. Surface expression of CXCR5 and viability were next measured by flow cytometry. IL-15 alone did not enhance the survival of isolated NK cells (FIG. 17B). On the other hand, IL-15 induced surface expression of CXCR5 and this expression was dramatically increased in the presence of HODHBt (FIG. 17H).

These data suggest that inhibiting STAT SUMOylation may increase the cytolytic activity of NK cells. In fact, IL-15 has been shown to stimulate NK cells and promote a reduction of the HIV latent reservoir ex vivo. It was therefore hypothesized that inhibiting STAT SUMOylation may enhance the ability of IL-15 stimulated NK cells to clear the HIV latent reservoir. To test the hypothesis, NK cells were treated with DMSO, IL-15-stimulated, treated with HODHBt or IL-15-stimulated and treated with HODHBt.

Figure 19A:
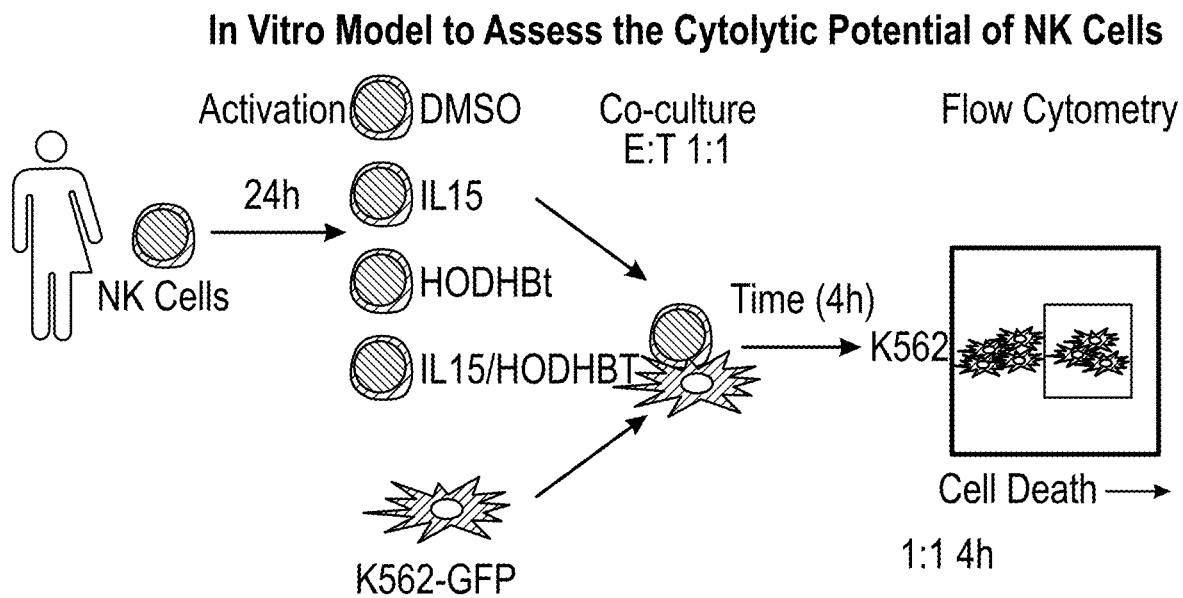
FIG. 19A depicts a schematic of a model used to assess cytolytic capacity of NK cells where the NK cells from two donors were co-cultured with K562 cells (a human immortalized myelogenous leukemia cell line) at an E:T ratio of 1:1 for 4 hours.
Figure 19B:
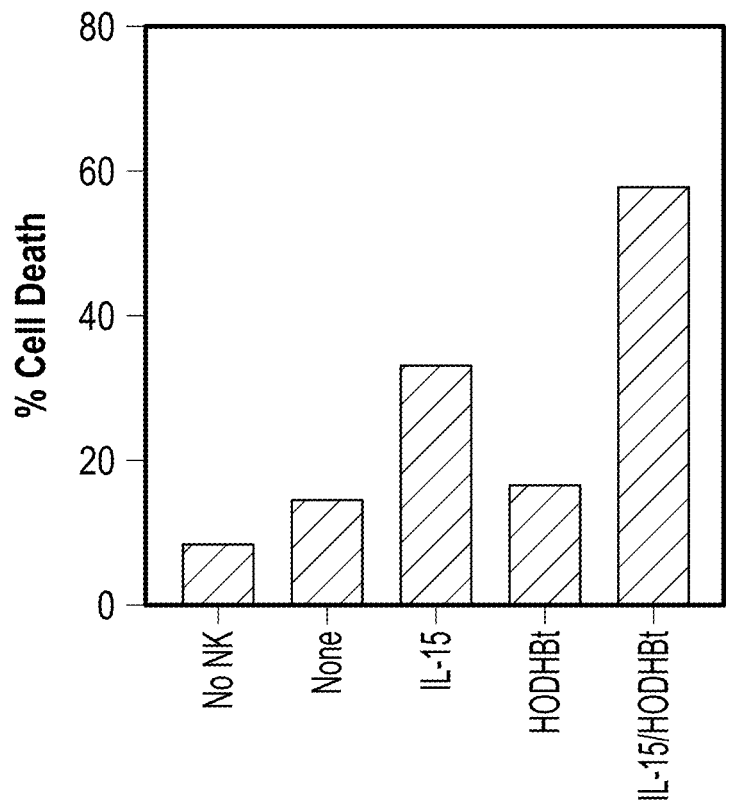
FIG. 19B depicts a bar graph showing the percent cell death of K562 cells after the K562 cells were co-cultured with NK cells wherein the NK cells were pretreated with IL-15, HODHBt, or a combination of both.

Cells were then tested in their ability to kill the erythroleukemia cell line K562, which lack MHC-I. In an experiment, the NK cells from two donors were co-cultured with K562 at an E:T ratio of 1:1 for 4 hours (FIG. 19A). NK cells were pretreated with IL-15, HODHBt, or a combination of both. As shown in FIG. 19B, pretreatment of NK cells with IL-15 induced increase killing of K562 over a 4-hour period. Interestingly, pretreatment with a combination of IL-15 and HODHBt showed a drastic increase in the cytolytic capacity of NK cells.

Example 8. HODHBt Modulation of STATS Enhances Expansion of NK Cells

Figure 20A:
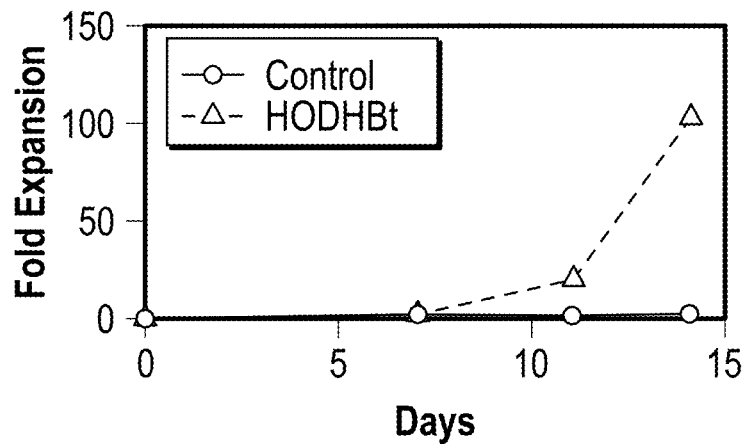
FIGS. 20A-20B depict graphs showing the rate of expansion (by fold) over time in NK cells isolated from human donor one (FIG. 20A) and human donor two (FIG. 20B) treated with IL-2 in the absence or presence of HODHBt.
Figure 20B:
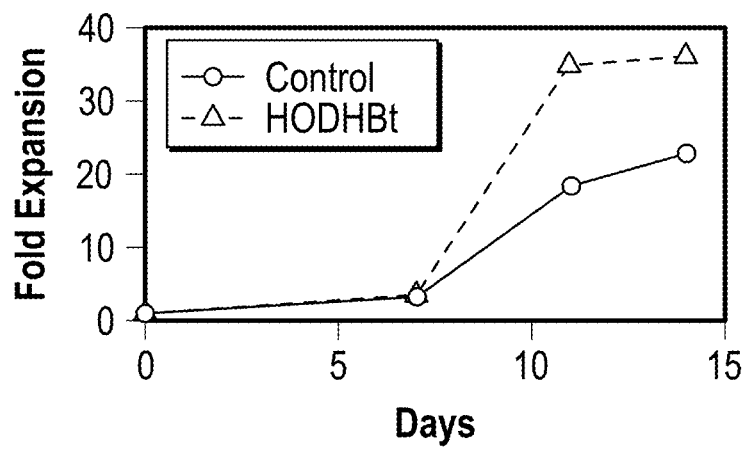
Figure 20C:
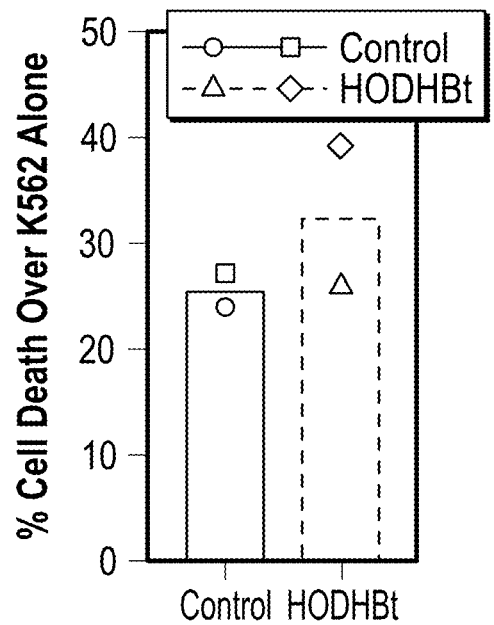
FIG. 20C depicts a bar graph showing the percent of cell death of K562 cells co-cultured with expanded NK cells isolated from human donor one (FIG. 20A) and human donor two (FIG. 20B) treated with IL-2 in the absence or presence of HODHBt.

As for CD8 T cells, STATS play an important role in the expansion of NK cells. As such, it was hypothesized that inhibiting STAT SUMOylation may enhance the expansion of NK cells. This has important implications for adoptive cell immunotherapies as NK cells are increasingly becoming an attractive alternative to T cell therapies. In order to address whether inhibiting STAT SUMOylation may enhance NK proliferation in vitro, NK cells were isolated from two human HIV-negative donors and expanded using Miltenyi Biotec NK MACS Medium in the presence of 500 IU/ml of IL-2 and in the presence or absence of HODHBt. HODHBt enhanced NK cell expansion in vitro in donor one (FIG. 20A) and donor two (FIG. 20B). Furthermore, expanded cells retained the ability to kill the target cell line K562 (FIG. 20C) as well as HIV-infected cultured $T_{CM}$ cells from the same donor (FIGS. 20D-20G).

Methods Used in Examples 1-8

(a) RNA-Seq

Total RNA was extracted from cells using Trizol (Invitrogen 15596), polyadenylated RNA was enriched using NEXTflex Poly(A) Beads (Bioo Scientific 512980), and stranded libraries were prepared using a NEXTflex Rapid Directional qRNA-Seq Kit (Bioo Scientific 5130-02D). Sequencing was performed by the Iowa Institute of Human Genetics Genomics Division on an Illumina HiSeq 2500 using 125 base pair (bp) paired-end reads. Raw paired sequences were first trimmed to remove Illumina sequencing adapters and Bioo Scientific randomized 8-mer molecular indexes using Trim Galore! 0.4.1 (—quality 0—illumina—paired—clip_R1 9—clip_R2 9—three_prime_clipR1 9—three_prime_clipR2 9), and then aligned to the UCSC hg19 genome assembly using TopHat 2.1.0(—library-type fr-firststrand—no-discordant—no-mixed) (Kim et al., 2013). A custom script was then used to remove PCR duplicates by searching for identical fragments with identical randomized 8-mer molecular indexes. For RNA-Seq tracks, reads were then compiled using the genomecov (-split) function of bedtools 2.25.0, normalized by dividing the number of hg19-mapped reads within each sample by the average number of hg19-mapped reads across all nine samples, combined across donors, and visualized on the UCSC Genome Browser. For differential expression analysis, reads were counted over UCSC hg19 genes (26,364 entries) using the featureCounts (-p -B -C -M) function of Subread 1.5.0 (Liao et al., 2014). These feature counts were imported into R and normalized using both EDASeq 2.4.1 (Risso et al., 2014), which reduces variability from different sequencing depths between replicates, and RUVSeq 1.4.0 (Risso et al., 2014), which when given a list of all genes to use for normalization (RUVr method) further reduces variability from batch effects in an unbiased manner. Differential expression analysis was then performed using DESeq2 1.10.1 (test="Wald", fitType="parametric", betaPrior=TRUE, and pAdjustMethod="fdr")(Love et al., 2014) using settings which prevented additional normalization. GEO number is GSE84197.

(b) Western Blotting

In general, samples are prepared and loaded on to a gel and during the electrophoresis the negatively charged proteins move toward the positively charged anode. In order to further analyze the proteins, they are transferred onto a membrane in a procedure called blotting. After the transfer, the membrane is blocked in order to prevent unwanted membrane-protein interaction in the following steps. To visualize the protein of interest the membrane is commonly first probed using a primary protein-specific antibody followed by a labeled secondary antibody used for detection. An image is taken of the membrane and the result is analyzed.

(c) CETSA

In practice, a typical CETSA experiment involves the following steps: 1) Drug treatment of the cellular system of choice (lysate, whole cells or tissue samples); 2) Transient heating of the cells to thermally denature and precipitate proteins that are not stabilized by ligand; 3) Controlled cooling and lysis of the cells; 4) Removal of precipitated proteins (if necessary); 5) Detection of remaining soluble protein in the supernatant/soluble fraction. Based on the nature of the studied target protein and the cellular system chosen, experimental aspects of these steps will vary. Examples of possible variations include the choice of protein source (cell lysate, intact cells, biopsies or tissue homogenates), the length and means of sample treatment with ligand before heating, the heating time and temperature range applied and the procedure used for cell lysis (if applicable). The need for sample workup, such as the separation of the remaining stabilized protein from the denatured and precipitated material, as well as the ways to do so, is directly linked to the choice of detection method. This, in turn, depends on the demands for sample throughput, as well as prior knowledge and instrumentation available in the laboratory.

(d) Flow Cytometry Analysis

To phenotype the cells, $1\times10^5$ cells were stained with a viability dye (Fixable Viability Dye eFluor 450, Affymetrix, eBioscience, San Diego, CA) and the surface marker-specific mAb specific for human: PE-anti-CD25 (Caltag, Burlingame, CA) and PE-anti-CD69 (Caltag, Burlingame, CA) followed by flow cytometric analysis in a BD FACScanto II flow cytometer using the FACSDiva software (Becton Dickinson, Mountain View, CA) and analyzed using FlowJo (Tree Star Inc., Ashland, OR).

To analyze cytokine release, PBMCs from healthy donors were cultured at $3\times10^6$ cells/ml in the presence of absence of 100 M HODHBT or 50 ng/ml PMA plus 1 M Ionomycin. Supernatants were collected 72 hours after and assessed for 13 cytokines using the LEGENDplex™ Human Th Cytokine panel kit according to the manufacturer's protocol (Biolegend, San Diego, CA). Briefly, 25 µl supernatant or kit standards were mixed with 25 µl mixed-capture beads and 25 µl detection antibodies and incubated for 2 hours. Then, 25 µl SA-PE was added to the samples and after 30 minutes incubation the samples were washed and read using a FACScantoII™ (BD Biosciences). Data analysis was performed using Biolegend's LEGENDplex™ Data Analysis provided with the kit.

To analyze pSTAT5, $1\times10^5$ cells were first stained with a viability dye (Fixable Viability Dye eFluor 450, Affymetrix, eBioscience, San Diego, CA) for 10 minutes at 4° C. Cells were then fixed with 100 of pre-warm (37° C.) Fix Buffer I (Becton Dickinson, Mountain View, CA) for 10 minutes at 37° C. Cells were washed once with 1 ml of PBS+3% FBS. Cells were then permeabilized while vortexing with 100 of Perm Buffer III (Becton Dickinson, Mountain View, CA) and incubated for 30 minutes on ice. Cells were washed once with 1 ml of PBS+3% FBS and stained with 2 µl of pSTAT5-Alexa Fluor 488 (Becton Dickinson, Mountain View, CA) in 100 of PBS+3% FBS for 1 hour at room temperature in the dark. Finally, cells were washed once with 1 ml of PBS+3% FBS and pSTAT5 was measured by flow cytometric analysis in a BD FACScanto II flow cytometer using the FACSDiva software (Becton Dickinson, Mountain View, CA) and analyzed using FlowJo (Tree Star Inc., Ashland, OR).

The invention claimed is:

1. A method of treating a subject having cancer, the method comprising:

contacting for a pre-determined time one or more isolated immune cells with a compound consisting of

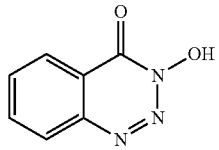

VI and administering to a subject having cancer a therapeutically effective amount of the one or more isolated immune cells contacted with the compound.

2. The method of claim 1, wherein the pre-determined time comprises about 1 week to about 6 weeks.

3. The method of claim 1, further comprising isolating the one or more immune cells from the subject.

4. The method of claim 3, wherein the one or more immune cells are isolated from allogeneic peripheral blood, umbilical cord blood, bone marrow, PBMCs, leukapheresis sample, tumor-infiltrated lymphocytes, tissue-infiltrated lymphocytes, lymph nodes, thymus, and/or secondary lymphoid organs.

5. The method of claim 3, wherein the one or more immune cells are natural killer (NK) cells, CD4 T cells, or CD8 T cells.

6. The method of claim 1, wherein the one or more isolated immune cells contacted with the compound have modulated expression of one or more genes, and wherein the one or more genes having modulated expression comprise genes that increase an immune effector process.

7. The method of claim 1, wherein the one or more isolated immune cells contacted with the compound have modulated expression of one or more genes, and wherein the one or more genes having modulated expression comprise Fas Ligand (FasL), perforin, granzyme, myxovirus resistance 1 (Mx1), TNF-related apoptosis-inducing ligand (TRAIL), granulysin, or any combination thereof.

8. The method of claim 6, wherein the immune effector process comprises phagocytosis, cytolysis, chemotaxis, opsonization, immune clearance, or inflammation.

* * * * *